US012569960B2

(12) United States Patent
Sheckells et al.

(10) Patent No.: US 12,569,960 B2

(45) Date of Patent: Mar. 10, 2026

(54) IMPACT TOOL

(71) Applicant: Black & Decker Inc., New Britain, CT (US)

(72) Inventors: Spencer J. Sheckells, Parkville, MD (US); Austin L. Ganzermiller, Reisterstown, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/904,395

(22) Filed: Oct. 2, 2024

(65) Prior Publication Data

US 2025/0018541 A1 Jan. 16, 2025

Related U.S. Application Data

(63) Continuation-in-part of application No. PCT/US2024/026533, filed on Apr. 26, 2024, and a (Continued)

(51) Int. Cl.

*B25B 21/02* (2006.01)

*B25D 17/04* (2006.01)

(Continued)

(52) U.S. Cl.

CPC .............. *B25B 21/02* (2013.01); *B25D 17/04* (2013.01); *B25D 17/06* (2013.01); *B25D 17/24* (2013.01)

(58) Field of Classification Search

CPC ........ B25B 21/02; B25D 17/04; B25D 17/06; B25D 17/24; H02K 16/00

See application file for complete search history.

(56) References Cited

U.S. PATENT DOCUMENTS 2,440,033 A 4/1948 West 2,463,349 A * 3/1949 Baner ........................ F16H 1/22 74/421 A (Continued)

FOREIGN PATENT DOCUMENTS

CN 102407731 A 4/2012

CN 204858871 U 12/2015

(Continued)

OTHER PUBLICATIONS

International Search Report and Written Opinion for PCT Application No. PCT/US2024/026533, mailed on Oct. 28, 2024, 25 pages.

(Continued)

*Primary Examiner* — Stephen F. Gerrity

*Assistant Examiner* — David G Shutty

(74) *Attorney, Agent, or Firm* — Brake Hughes Bellermann LLP

(57) ABSTRACT

A power-driven impact tool is provided. The impact tool includes a motor, a transmission, and a rotary impact mechanism received in a housing. The transmission may be a planetary transmission that reduces a speed of a rotary force output by the motor. The impact tool may be a cordless impact tool, receiving power from a battery back that is removably coupled in a battery receptacle of the housing. First and second handles on the housing may provide for user stability and control during operation of the impact tool. A plurality of user selection devices, including a trigger, a forward/reverse switch, and a mode selector, may be provided on one of the handles for user control of the impact tool.

19 Claims, 51 Drawing Sheets

Related U.S. Application Data continuation-in-part of application No. 18/647,665, filed on Apr. 26, 2024.

(60) Provisional application No. 63/662,818, filed on Jun. 21, 2024, provisional application No. 63/498,443, filed on Apr. 26, 2023.

(51) Int. Cl.
*B25D 17/06* (2006.01)
*B25D 17/24* (2006.01)

(56) References Cited

U.S. PATENT DOCUMENTS

| | | | | |
|---|---|---|---|---|
| 2,578,015 | A * | 12/1951 | Reinhard | F16H 37/00 475/5 |
| 3,168,665 | A * | 2/1965 | Holper | H02K 7/125 310/83 |
| 4,219,764 | A | 8/1980 | Terada et al. | |
| 4,323,828 | A * | 4/1982 | Terada | H02P 1/56 318/63 |
| 4,516,612 | A | 5/1985 | Wiley | |
| 4,555,849 | A | 12/1985 | Ando et al. | |
| 4,803,390 | A * | 2/1989 | Bertram | H02K 16/00 74/661 |
| 5,534,737 | A * | 7/1996 | Nishimura | H02K 23/60 310/156.01 |
| 5,856,715 | A | 1/1999 | Peot et al. | |
| 5,979,525 | A | 11/1999 | Durney | |
| 6,557,656 | B2 | 5/2003 | Haniu et al. | |
| 6,895,835 | B2 * | 5/2005 | Cordeiro | F16H 1/222 74/665 A |
| 6,998,723 | B2 | 2/2006 | Kong et al. | |
| 7,252,027 | B2 | 8/2007 | Meredith et al. | |
| 7,823,256 | B2 | 11/2010 | Engelfried et al. | |
| 9,515,597 | B2 * | 12/2016 | O'Donnell | H02P 5/747 |
| 9,707,633 | B2 | 7/2017 | Agan et al. | |
| 10,894,339 | B2 | 1/2021 | Ruffner | |
| 10,940,751 | B2 | 3/2021 | Matsuda et al. | |
| 2003/0192400 | A1 | 10/2003 | Cordeiro | |
| 2005/0178260 | A1 | 8/2005 | Bokelaar et al. | |
| 2007/0209162 | A1 | 9/2007 | McRoberts et al. | |
| 2008/0127795 | A1 | 6/2008 | Fukinuki | |
| 2008/0276773 | A1 | 11/2008 | Togare | |
| 2008/0295663 | A1 | 12/2008 | Hsieh et al. | |
| 2009/0120258 | A1 | 5/2009 | Meredith et al. | |
| 2012/0068525 | A1 | 3/2012 | Moller | |
| 2013/0055873 | A1 | 3/2013 | Cox | |
| 2019/0255687 | A1 * | 8/2019 | Schneider | B25B 21/02 |
| 2020/0180124 | A1 * | 6/2020 | Ellice | B25F 5/026 |
| 2020/0198100 | A1 * | 6/2020 | Schneider | B25B 21/02 |
| 2021/0060756 | A1 | 3/2021 | Turner et al. | |
| 2021/0060757 | A1 | 3/2021 | Swaminathan et al. | |
| 2021/0187707 | A1 | 6/2021 | Smith et al. | |
| 2021/0316608 | A1 | 10/2021 | Marechal et al. | |
| 2022/0023962 | A1 | 1/2022 | Menze et al. | |
| 2022/0158289 | A1 | 5/2022 | Almqvist et al. | |
| 2022/0193878 | A1 * | 6/2022 | Tomayko | B25B 21/02 |
| 2023/0158658 | A1 | 5/2023 | Ghouse et al. | |
| 2023/0202022 | A1 * | 6/2023 | Ellice | B25B 21/02 173/217 |
| 2023/0219410 | A1 | 7/2023 | Lemaire et al. | |
| 2023/0241694 | A1 | 8/2023 | Suzuki et al. | |
| 2024/0364185 | A1 * | 10/2024 | Ganzermiller | B23D 45/16 |

FOREIGN PATENT DOCUMENTS

| | | | |
|---|---|---|---|
| CN | 205811767 | U | 12/2016 |
| CN | 105610277 | B | 12/2018 |
| CN | 109812274 | A | 5/2019 |
| CN | 110394856 | A | 11/2019 |
| CN | 111318756 | A | 6/2020 |
| CN | 213743302 | U | 7/2021 |
| CN | 113824238 | A | 12/2021 |
| DE | 102005061006 | A1 | 6/2007 |
| EP | 2997647 | B1 | 11/2019 |
| JP | 2013039628 | A | 2/2013 |
| JP | 6421495 | B2 | 10/2018 |
| KR | 100750309 | B1 | 8/2007 |
| WO | 2017154522 | A1 | 9/2017 |
| WO | 2019114777 | A1 | 6/2019 |
| WO | 2021123149 | A1 | 6/2021 |

OTHER PUBLICATIONS

International Search Report and Written Opinion for PCT Application No. PCT/US2024/026548, mailed on Nov. 26, 2024, 14 pages.
International Search Report and Written Opinion for PCT Application No. PCT/US2024/053699, mailed on Feb. 20, 2025, 18 pages.
Invitation to Pay Additional Fees for PCT Application No. PCT/US2024/049722, mailed on Feb. 7, 2025, 28 pages.
International Search Report and Written Opinion for PCT Application No. PCT/US2024/026551, mailed on Aug. 26, 2024, 21 pages.
Invitation to Pay Additional Fees for PCT Application No. PCT/US2024/026533, mailed on Sep. 5, 2024, 21 pages.
International Search Report and Written Opinion for PCT Application No. PCT/US2024/053550, mailed on Mar. 25, 2025, 17 pages.
International Search Report and Written Opinion for PCT Application No. PCT/US2024/049722, mailed on Mar. 28, 2025, 31 pages.

* cited by examiner

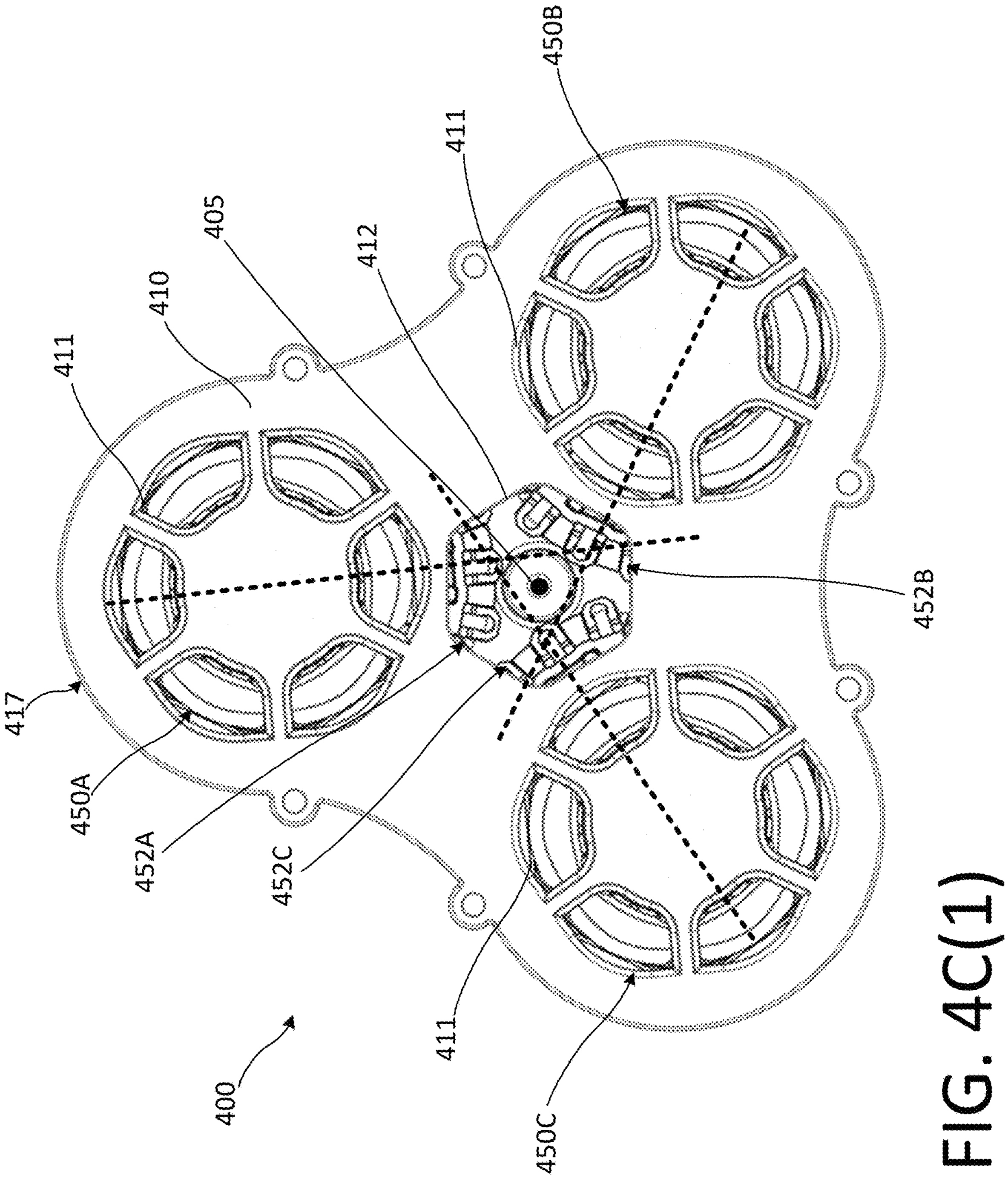
FIG. 4C(1)

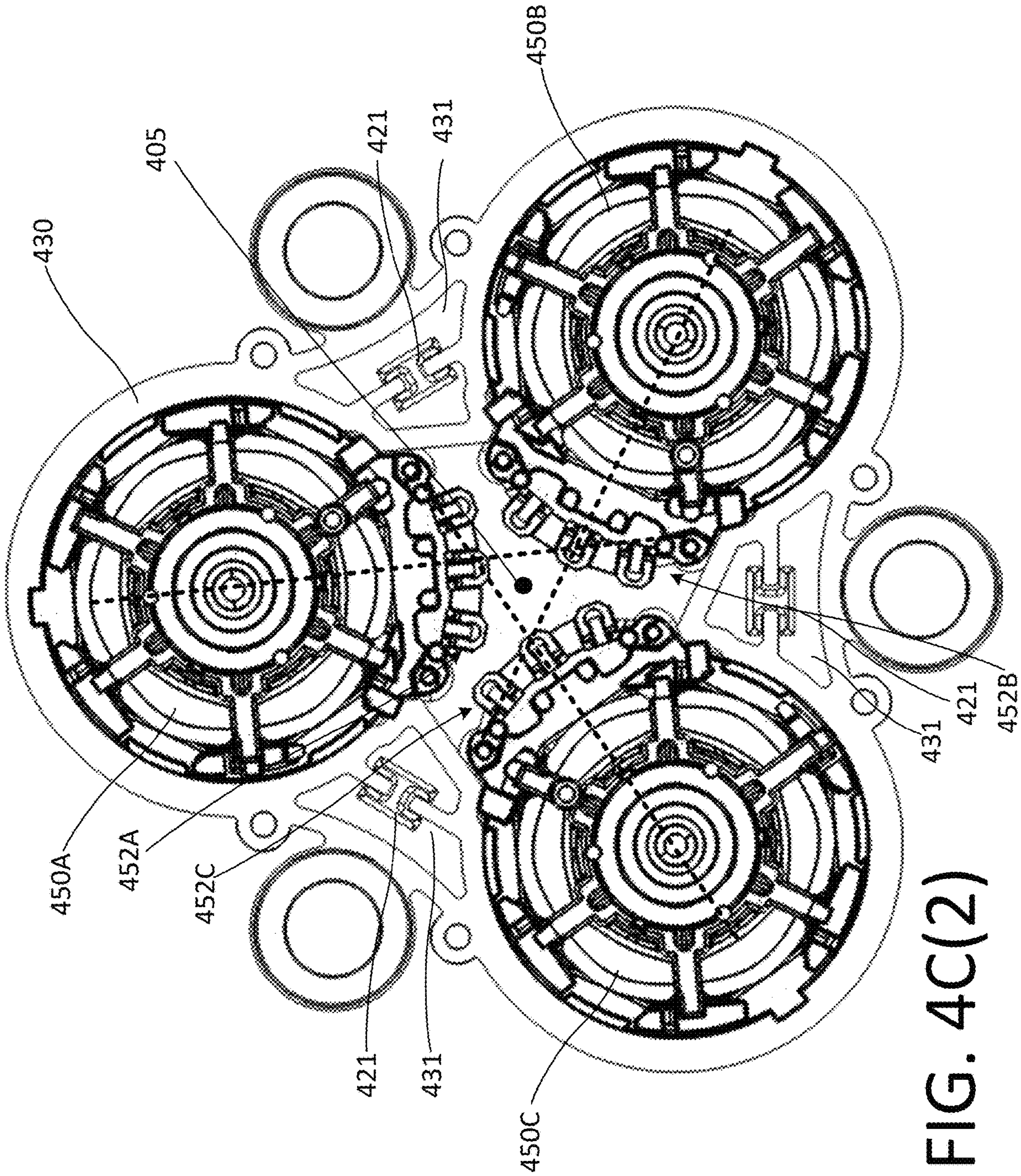
FIG. 4C(2)

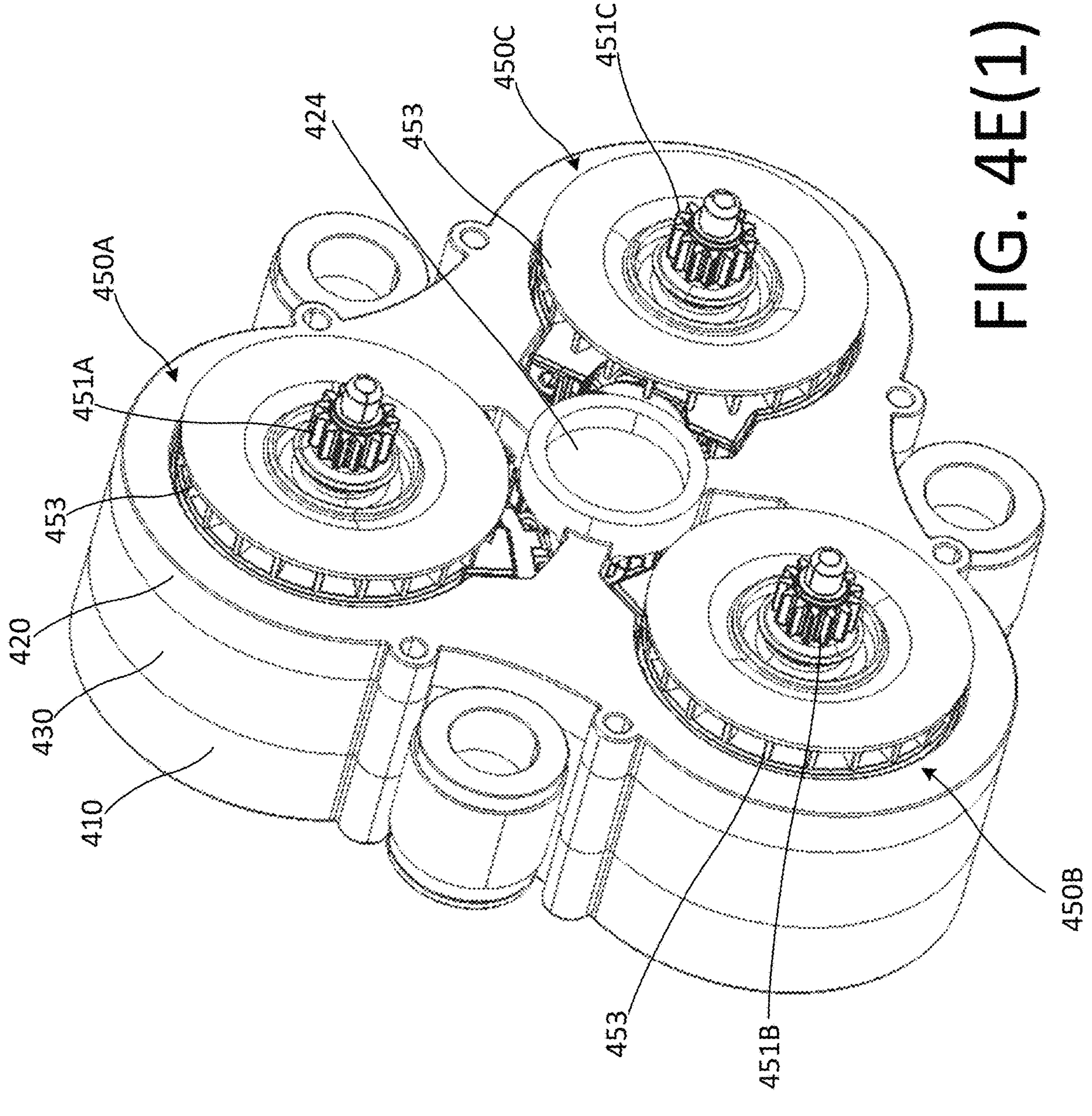
FIG. 4E(1)

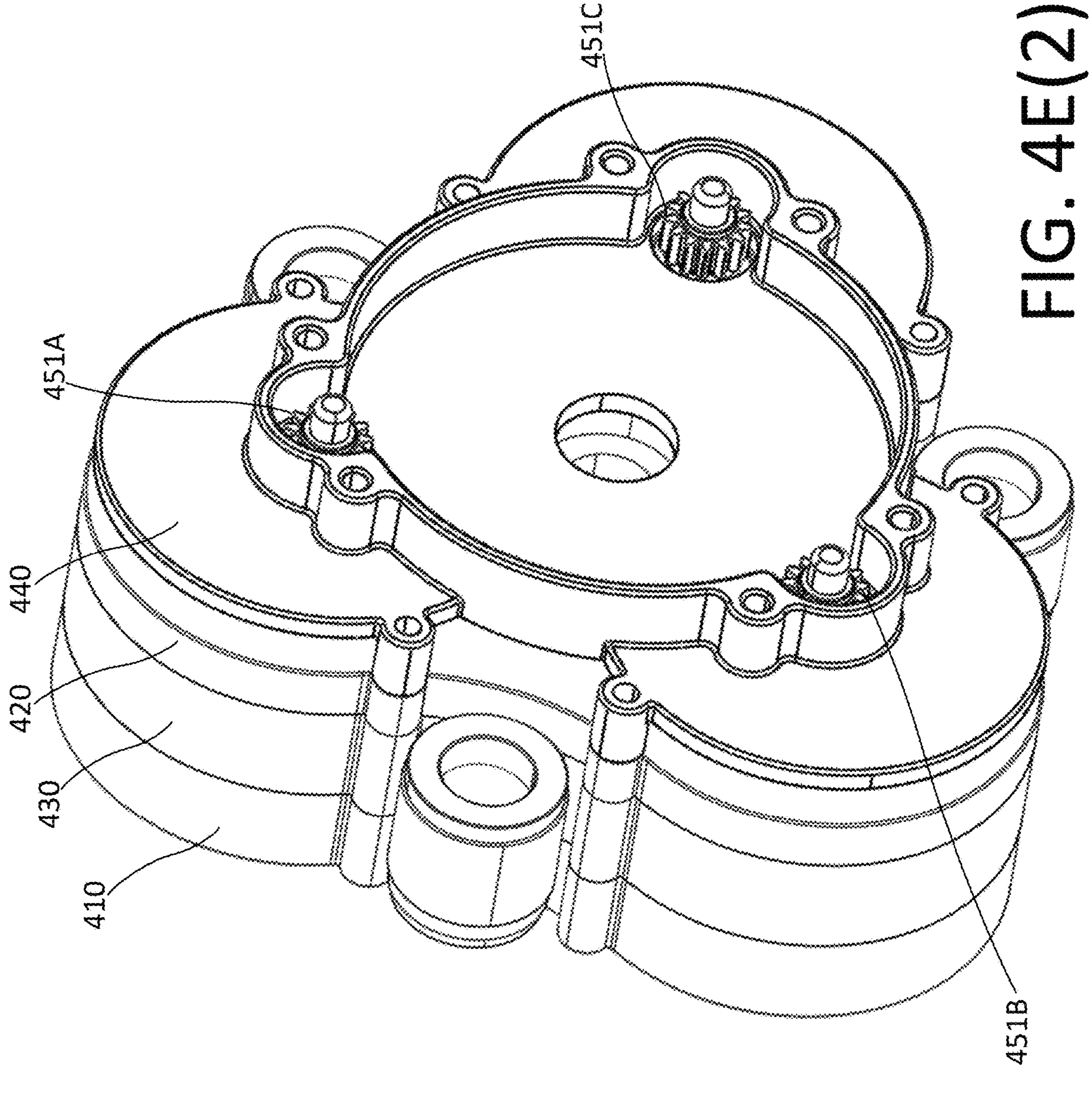
FIG. 4E(2)

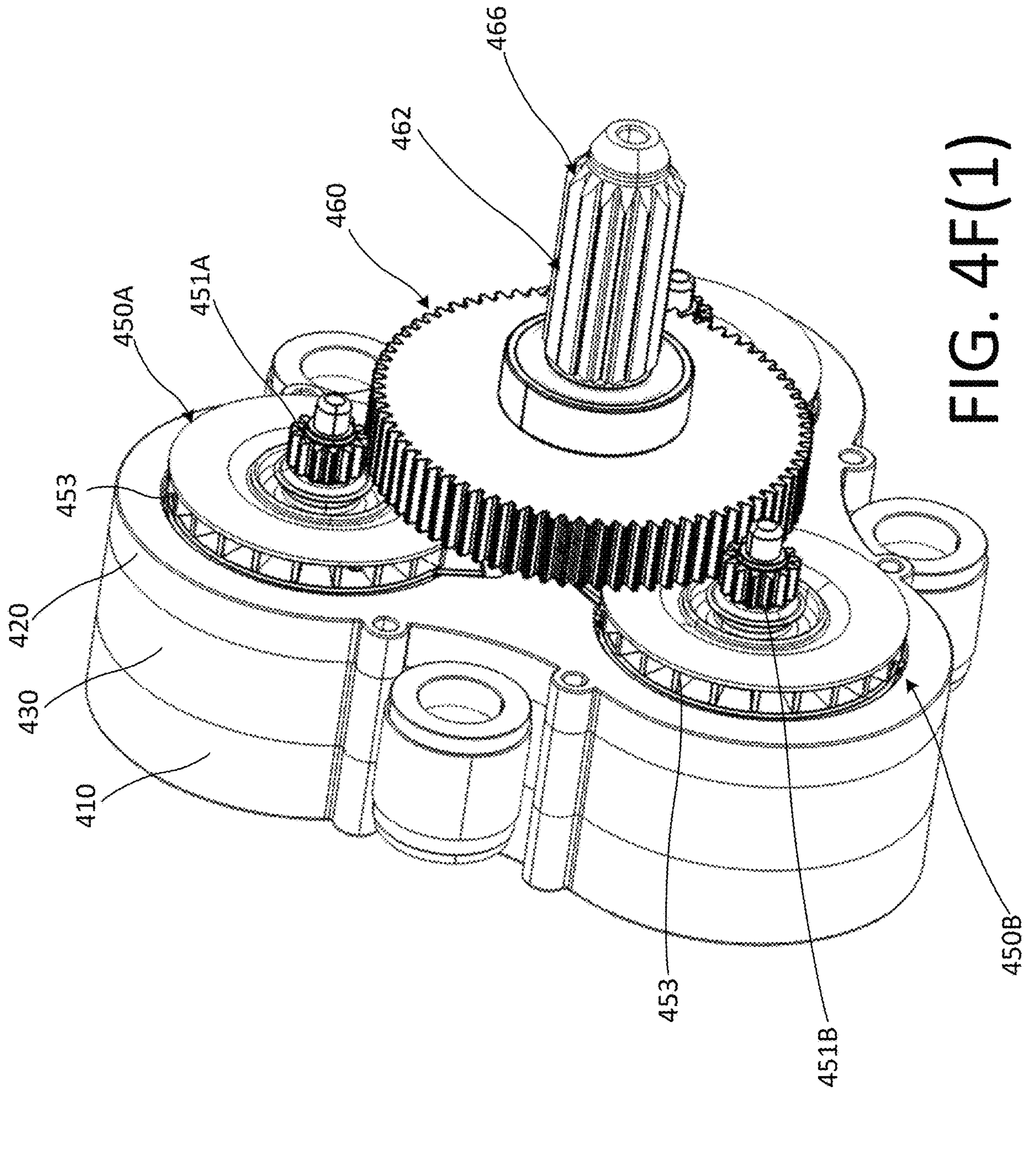
FIG. 4F(1)

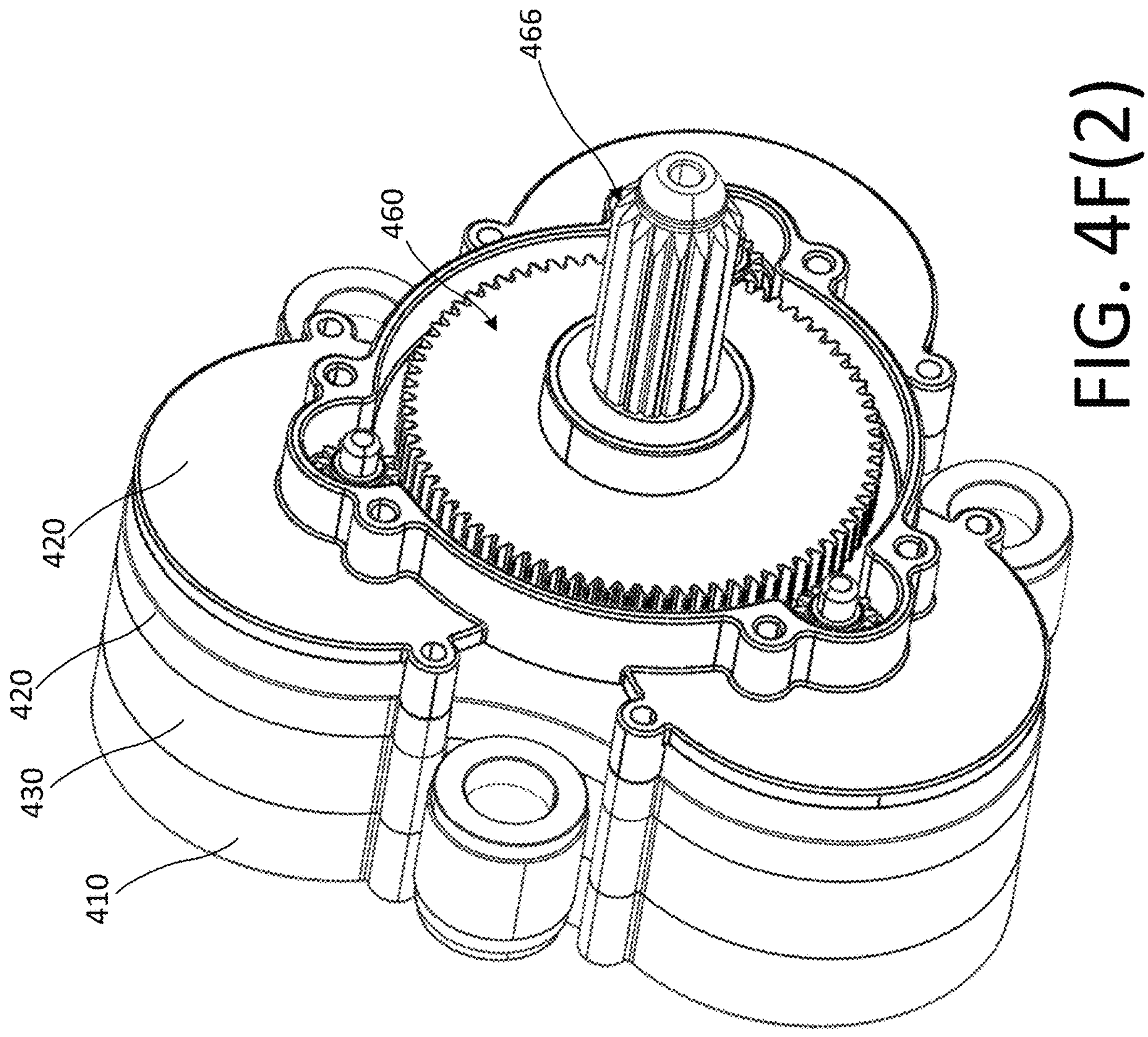
FIG. 4F(2)

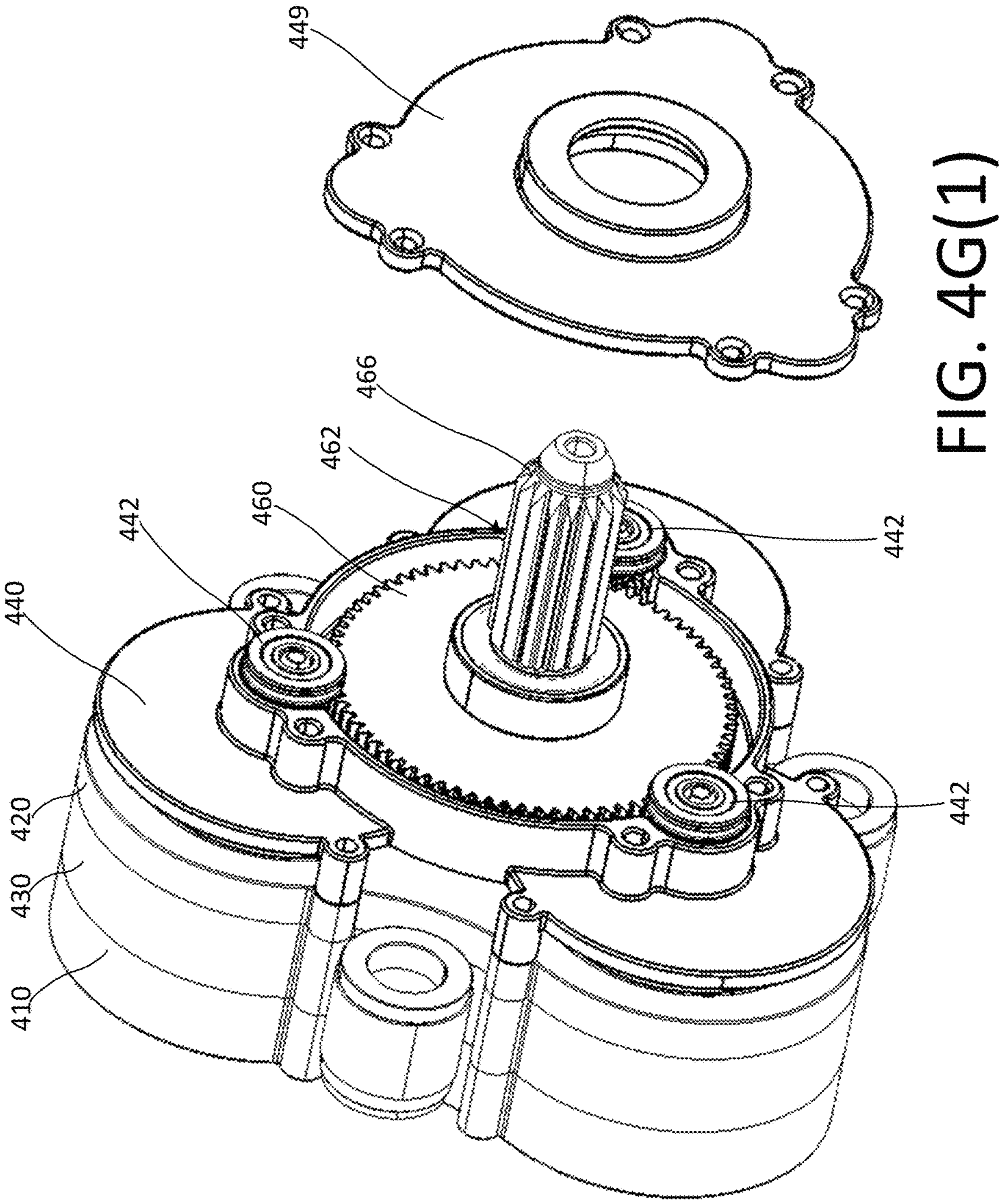
FIG. 4G(1)

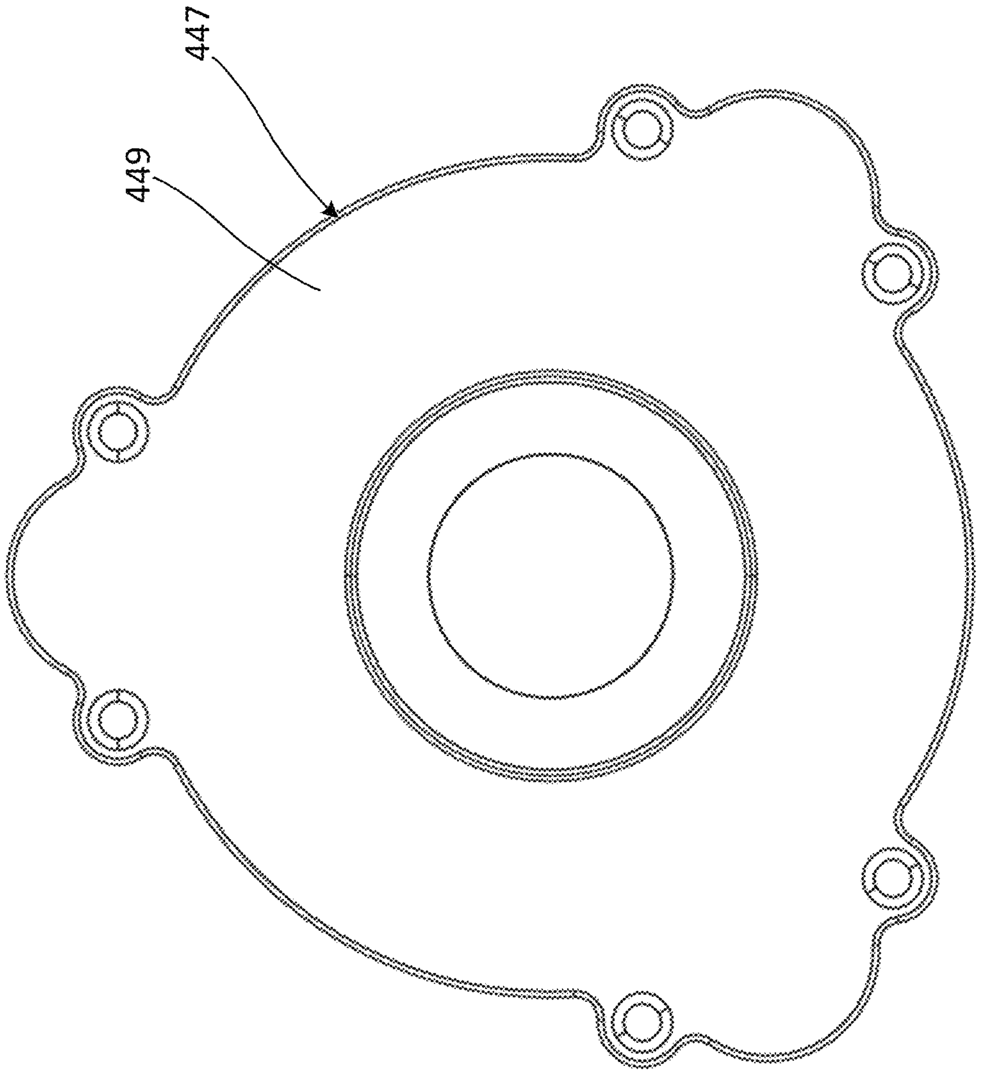
FIG. 4G(2)

IMPACT TOOL

CROSS-REFERENCE TO RELATED APPLICATIONS

This application is a continuation-in-part of U.S. Non-Provisional application Ser. No. 18/647,665, filed on Apr. 26, 2024, titled "Multi-Motor Drive System," which claims priority to U.S. Provisional Application No. 63/498,443, filed on Apr. 26, 2023, titled "Multi-Motor Drive System," and is also a continuation-in-part of PCT Application No. PCT/US24/26533, filed on Apr. 26, 2024, titled "Multi-Motor Drive Unit," the disclosures of which are incorporated by reference herein in their entireties.

FIELD

This document relates, generally, to power tool, and in particular, to a powered rotary impact tool.

BACKGROUND

A power-driven tool may output a torque generated by a driving system of the tool to perform an operation on a workpiece. Some power-driven tools include an impact mechanism that augments an output torque generated by the power-driven tool. A power-driven tool including a rotary impact mechanism, such as, for example, an impact driver or an impact wrench, may include a motor and a transmission driving an output spindle, with the impact mechanism coupled between the transmission and the output spindle. The impact mechanism may include a cam shaft coupled to the transmission, a hammer received over the cam shaft for rotational and axial movement relative to the cam shaft, an anvil coupled to the output spindle, and a spring that biases the hammer toward the spindle. When a relatively low amount of torque is applied to the output spindle, the hammer remains engaged with the anvil and transmits rotational motion from the transmission to the output spindle. When a relatively high amount of torque is applied to the output spindle, the hammer disengages from the anvil and transmits rotary impacts to the anvil and the output spindle.

SUMMARY

In some aspects, the techniques described herein relate to a powered rotary impact tool, including: a housing; a handle coupled to a first end portion of the housing; an output shaft at least partially received in the housing and oriented along a longitudinal axis; a rotary impact mechanism received in a second end portion of the housing, the rotary impact mechanism including a hammer and an anvil coupled to the output shaft; and a multi-motor drive unit received in the housing, the multi-motor drive unit including a plurality of motors configured to cooperatively drive the impact mechanism, wherein in response to a torque at the output shaft that is less than or equal to a threshold torque value, the hammer continuously engages the anvil such that the hammer and the anvil rotate together, and wherein in response to a torque at the output shaft that is greater than the threshold torque value, the hammer applies intermittent rotational impacts to the anvil.

In some aspects, the techniques described herein relate to a powered rotary impact tool, wherein the multi-motor drive unit and the rotary impact mechanism are configured to generate an output torque enabling a tool holder coupled to the output shaft to tighten a threaded fastener to a fastening torque of greater than or equal to approximately 3600 ft-lbs. within approximately 10 seconds of initiation of application of rotational impacts on the anvil by the hammer.

In some aspects, the techniques described herein relate to a powered rotary impact tool, wherein the multi-motor drive unit and the rotary impact mechanism are configured to generate an output torque enabling the tool holder to tighten a threaded fastener to a fastening torque of greater than or equal to approximately 3600 ft-lbs. within approximately 5 seconds of initiation of application of rotational impacts on the anvil by the hammer.

In some aspects, the techniques described herein relate to a powered rotary impact tool, wherein the multi-motor drive unit and the rotary impact mechanism are configured to generate an output torque enabling the tool holder to loosen a fastener with a breakaway torque of greater than or equal to approximately 4000 ft lbs.

In some aspects, the techniques described herein relate to a powered rotary impact tool, wherein a length of the multi-motor drive unit along the longitudinal axis is less than or equal to approximately 70 mm, and a cross-sectional area of the multi-motor drive unit in a plane transverse to the longitudinal axis, substantially orthogonal to the longitudinal axis, is less than or equal to approximately 130 cm^2.

In some aspects, the techniques described herein relate to a powered rotary impact tool, wherein the length of the multi-motor drive unit along the longitudinal axis is between approximately 57 mm and approximately 70 mm, and the cross-sectional area of the multi-motor drive unit in the plane transverse to the longitudinal axis, is between approximately 91 cm^2 mm and approximately 130 cm^2.

In some aspects, the techniques described herein relate to a powered rotary impact tool, wherein the multi-motor drive unit and the rotary impact mechanism are configured to generate an output torque enabling a tool holder coupled to the output shaft to tighten a threaded fastener to a fastening torque of between approximately 3600 ft-lbs. and approximately 5400 ft-lbs. within approximately 10 seconds of initiation of application of rotational impacts on the anvil by the hammer.

In some aspects, the techniques described herein relate to a powered rotary impact tool, wherein the multi-motor drive unit and the rotary impact mechanism are configured to generate an output torque enabling the tool holder to tighten a threaded fastener to a fastening torque of between approximately 3600 ft-lbs. and approximately 4800 ft-lbs. within approximately 5 seconds of the initiation of the application of rotational impacts on the anvil by the hammer.

In some aspects, the techniques described herein relate to a powered rotary impact tool, wherein a length of the multi-motor drive unit along the longitudinal axis is less than or equal to approximately 70 mm and a cross-sectional area of the multi-motor drive unit in a plane transverse to the longitudinal axis is less than or equal to approximately 130 cm^2.

In some aspects, the techniques described herein relate to a powered rotary impact tool, wherein the length of the multi-motor drive unit along the longitudinal axis is between approximately 57 mm and approximately 70 mm, and the cross-sectional area of the multi-motor drive unit in the plane transverse axis to the longitudinal axis is between approximately 91 cm^2 and approximately 130 cm^2.

In some aspects, the techniques described herein relate to a powered rotary impact tool, wherein a maximum fastening torque to length ratio of the multi-motor drive unit and the impact mechanism is at least approximately 50 ft-lbs/mm.

In some aspects, the techniques described herein relate to a powered rotary impact tool, wherein a maximum fastening torque to length ratio of the multi-motor drive unit and the impact mechanism is between approximately 50 ft-lbs/mm and approximately 100 ft-lbs/mm.

In some aspects, the techniques described herein relate to a powered rotary impact tool, further including a transmission operably coupled between the multi-motor drive unit and the impact mechanism, the transmission being configured to reduce a speed output by the multi-motor drive unit transmitted to the impact mechanism.

In some aspects, the techniques described herein relate to a powered rotary impact tool, wherein the transmission includes a planetary transmission.

In some aspects, the techniques described herein relate to a powered rotary impact tool, wherein a speed reduction ratio of the transmission is between approximately 3:1 and approximately 13:1 while the impact mechanism provides a fastening torque of greater than or equal to approximately 3600 ft-lbs.

In some aspects, the techniques described herein relate to a powered rotary impact tool, wherein the multi-motor drive unit also includes: a plurality of pinion gears, a pinion gear of the plurality of pinion gears being provided on and driven by each of the plurality of motors; and a master gear that engages the plurality of pinion gears to provide a first speed reduction.

In some aspects, the techniques described herein relate to a powered rotary impact tool, further including a speed reducing transmission between an output of the multi-motor drive unit and the impact mechanism, wherein the speed reducing transmission is configured to provide a second speed reduction.

In some aspects, the techniques described herein relate to a powered rotary impact tool, wherein the first speed reduction is between approximately 1:1 and approximately 8:1 and the second speed reduction is between approximately 3:1 and approximately 13:1.

In some aspects, the techniques described herein relate to a powered rotary impact tool, wherein the multi-motor drive unit includes: a rear plate; a front plate; an intermediate plate coupled between the rear plate and the front plate; and an output shaft driven by the master gear; wherein the plurality of motors are mounted in the intermediate plate, and wherein the front plate is disposed between the master gear and the plurality of motors mounted in the intermediate plate, such that the front plate is configured to pilot and support the master gear and a front axial end portion of the plurality of motors.

In some aspects, the techniques described herein relate to a powered rotary impact tool, further including a central opening formed in the rear plate, wherein each of the plurality of motors includes terminals that are located radially inward of a periphery of the central opening.

In some aspects, the techniques described herein relate to a powered rotary impact tool, wherein the rear plate includes a plurality of air intakes disposed equidistantly around the central opening.

In some aspects, the techniques described herein relate to a powered rotary impact tool, wherein each of the plurality of motors has substantially the same size and structure.

In some aspects, the techniques described herein relate to a powered rotary impact tool, wherein: each of the plurality of motors includes a fan disposed on a distal end of a rotor shaft of each of the plurality of motors; and each of the plurality of motors is disposed and positioned in a respective air intake of the plurality of air intakes such that the fan of each of the plurality of motors generates airflow through the respective air intake.

In some aspects, the techniques described herein relate to a powered rotary impact tool, wherein the front plate is disposed between the intermediate plate and the master gear, the front plate including a set of outwardly-projecting arms extending at least partially between the fan of each of the plurality of motors to redirect airflow expelled from the fan of each of the plurality of motors in a generally radial direction.

In some aspects, the techniques described herein relate to a powered rotary impact tool, wherein the front plate is configured to generate a circumferential exhaust path extending around the multi-motor drive unit.

In some aspects, the techniques described herein relate to a powered rotary impact tool, wherein the intermediate plate includes a plurality of arms in spaces between adjacent motors of the plurality of motors, wherein each of the plurality of arms is in contact with at least a portion of one of the plurality of motors.

In some aspects, the techniques described herein relate to a powered rotary impact tool, further including a sleeve surrounding the plurality of motors, the sleeve being disposed between the rear plate and the front plate.

In some aspects, the techniques described herein relate to a powered rotary impact tool, wherein the sleeve includes a thermally conductive material to remove heat from the plurality of motors.

In some aspects, the techniques described herein relate to a powered rotary impact tool, wherein the sleeve includes radially extending features that increase a cooling capacity of the sleeve.

In some aspects, the techniques described herein relate to a powered rotary impact tool, wherein the sleeve includes a plurality of arms positioned in spaces formed between adjacent motors of the plurality of motors, wherein each of the plurality of arms engages at least a portion of one of the plurality of motors to radially align and secure the plurality of motors.

In some aspects, the techniques described herein relate to a powered rotary impact tool, wherein the front plate forms a master bearing that pilots and supports the master gear, wherein the master bearing is radially aligned with the pinion of each of the plurality of motors.

In some aspects, the techniques described herein relate to a powered rotary impact tool, wherein a power to mass ratio of the multi-motor drive unit is in a range of approximately 3 W/g to approximately 10 W/g.

In some aspects, the techniques described herein relate to a powered rotary impact tool, wherein a magnetic interface boundary to cross section ratio of the multi-motor drive unit is in a range of approximately 1.5 mm/cm2 to approximately 3 mm/cm^2.

In some aspects, the techniques described herein relate to a powered rotary impact tool, wherein the magnetic interface boundary of the multi-motor drive unit is a sum of an electro-magnetic boundary of each of the plurality of motors.

In some aspects, the techniques described herein relate to a powered rotary impact tool, wherein a power to volume ratio of the multi-motor drive unit is in a range of approximately 5 W/cm3 to approximately 25 W/cm3.

In some aspects, the techniques described herein relate to a powered rotary impact tool, further including: a single set of position sensors disposed in proximity to a rotor of one of the plurality of motors; and a motor control unit that is electrically connected to the plurality of motors, wherein the motor control unit uses the single set of position sensors to control the plurality of motors.

In some aspects, the techniques described herein relate to a powered rotary impact tool, wherein the motor control unit includes: controller; a single gate driver that is electrically connected to the controller; and a single inverter circuit that is electrically connected the controller, the single gate driver, and the plurality of motors, wherein the controller is configured to receive positional information from the single set of position sensors and to control the plurality of motors using the single gate driver and the single inverter circuit.

In some aspects, the techniques described herein relate to a powered rotary impact tool, wherein the controller generates a set of common commutation drive signals; and the single inverter circuit synchronously drives the plurality of motors using the set of common commutation drive signals.

In some aspects, the techniques described herein relate to a powered rotary impact tool, wherein the motor control unit includes a plurality of inverters.

In some aspects, the techniques described herein relate to a powered rotary impact tool, wherein the impact mechanism includes a cam shaft extending along the longitudinal axis and configured to be rotatably driven in response to actuation of the multi-motor drive unit.

In some aspects, the techniques described herein relate to a powered rotary impact tool, wherein: the cam shaft includes a first cam groove on an outer surface of the cam shaft; the hammer includes a second cam groove on an inner surface of the hammer; and the hammer is received over the cam shaft, with a ball riding in the first cam groove and the second cam groove providing for axial and rotational movement of the hammer relative to the cam shaft.

In some aspects, the techniques described herein relate to a powered rotary impact tool, further including a spring biasing the hammer toward the anvil, wherein in response to a torque on the output shaft that is less than or equal to a threshold torque value, the spring maintains the hammer in a forwardmost position relative to the cam shaft so that the hammer engages the anvil to rotate together as a unit, and in response to an increase in the torque on the output shaft that exceeds the threshold torque value, the ball moves along the first and second cam grooves so that the hammer moves rotatably and axially rearward away from the anvil, and in response to a spring force of the spring overcoming the torque on the output shaft, the spring drives the hammer rotationally and axially forward to rotationally strike the anvil to impart a rotational impact to the anvil.

In some aspects, the techniques described herein relate to a powered rotary impact tool, wherein a ratio of a fastening torque output by the rotary impact tool to a displacement volume of the multi-motor drive unit is between approximately 3 ft-lbs/cm^3 and approximately 14 ft-lbs/cm^3.

In some aspects, the techniques described herein relate to a powered rotary impact tool, including: a housing; a handle coupled to a first end portion of the housing; an output spindle at least partially received in the housing and extending along a longitudinal axis; a tool holder coupled to and configured to rotate with the output spindle; a motor drive unit disposed in the housing and including an output shaft extending along a motor axis; a transmission coupled to the output shaft; and a rotary impact mechanism including: a cam shaft rotatably driven by an output member of the transmission, the cam shaft extending along a transmission axis and including a first cam groove; a hammer received over the cam shaft and having a second cam groove; a ball movably disposed in the first cam groove and the second cam groove; an anvil coupled to the output spindle; and a spring biasing the hammer toward the anvil, wherein, in response to a torque on the output spindle is less than or equal to a threshold torque value, the hammer continuously engages the anvil so that the hammer and the anvil rotate together, and in response to a torque on the output spindle is greater than the threshold torque value, the hammer applies intermittent rotational impacts to the anvil, and wherein a length of the motor drive unit along the motor axis is less than approximately 70 mm, a cross-sectional area of the motor drive unit in a plane transverse to the motor axis is less than approximately 130 cm^2, and a length of the transmission along the transmission axis is less than approximately 10 mm, the transmission providing a speed reduction within a range of approximately 1:1 to approximately 8:1, and wherein the motor drive unit, the transmission, and the impact mechanism are configured to generate an output torque enabling the tool holder to tighten a threaded fastener to a fastening torque of greater than or equal to approximately 3600 ft-lbs. within approximately 10 seconds of initiation of rotational impacts imparted on the anvil by the hammer.

In some aspects, the techniques described herein relate to a powered rotary impact tool, wherein the motor drive unit, the transmission, and the impact mechanism are configured to generate an output torque enabling the tool holder to tighten a threaded fastener to a fastening torque of between approximately 3600 ft-lbs. and approximately 5400 ft-lbs. within approximately 10 seconds of initiation of application of rotational impacts on the anvil by the hammer.

In some aspects, the techniques described herein relate to a powered rotary impact tool, wherein the motor drive unit, the transmission, and the impact mechanism are configured to generate an output torque enabling the tool holder to tighten a threaded fastener to a fastening torque of greater than or equal to approximately 3600 ft-lbs. within approximately 5 seconds of the initiation of application of rotational impacts on the anvil by the hammer.

In some aspects, the techniques described herein relate to a powered rotary impact tool, the motor drive unit, the transmission, and the impact mechanism are configured to generate an output torque enabling the tool holder to tighten a threaded fastener to a fastening torque of between approximately 3600 ft-lbs. and approximately 4800 ft-lbs. within approximately 5 seconds of initiation of application of rotational impacts on the anvil by the hammer.

In some aspects, the techniques described herein relate to a powered rotary impact tool, wherein the motor drive unit, the transmission, and the impact mechanism are configured to generate an output torque enabling the tool holder to loosen a fastener with a breakaway torque of greater than or equal to approximately 4000 ft lbs.

In some aspects, the techniques described herein relate to a powered rotary impact tool, wherein a maximum fastening torque to length ratio of the motor drive unit is at least approximately 50 ft-lbs/mm.

In some aspects, the techniques described herein relate to a powered rotary impact tool, wherein a maximum fastening torque to length ratio of the motor drive unit is between approximately 50 ft-lbs/mm and approximately 100 ft-lbs/mm.

In some aspects, the techniques described herein relate to the powered rotary impact tool, wherein the transmission includes a planetary transmission.

In some aspects, the techniques described herein relate to a powered rotary impact tool, wherein the motor drive unit includes a plurality of motors configured to cooperatively drive the transmission.

In some aspects, the techniques described herein relate to a powered rotary impact tool, wherein the motor drive unit also includes: a plurality of pinion gears, a pinion gear of the plurality of pinion gears being provided on and driven by each of the plurality of motors; and a master gear that engages the plurality of pinion gears to provide an additional speed reduction.

In some aspects, the techniques described herein relate to a powered rotary impact tool, wherein the additional speed reduction is between approximately 1:1 and approximately 8:1, and the speed reduction provided by the transmission is between approximately 3:1 and approximately 13:1.

In some aspects, the techniques described herein relate to a powered rotary impact tool, wherein the motor drive unit includes: a rear plate; a front plate; an intermediate plate coupled between the rear plate and the front plate; and an output shaft driven by the master gear; wherein the plurality of motors are mounted in the intermediate plate, and wherein the front plate is disposed between the master gear and the plurality of motors mounted in the intermediate plate, such that the front plate is configured to pilot and support the master gear and a front axial end portion of the plurality of motors.

In some aspects, the techniques described herein relate to a powered rotary impact tool, wherein a ratio of a fastening torque output by the rotary impact tool to a displacement volume of the motor drive unit is between approximately 3 ft-lbs/cm^3 and approximately 14 ft-lbs/cm^3.

In some aspects, the techniques described herein relate to a powered rotary impact tool, including: a housing; a handle coupled to the housing; an output spindle at least partially received in the housing and extending along an output axis; a tool holder coupled to the output spindle and configured to rotate in response to rotation of the output spindle; a motor drive unit disposed in the housing, the motor drive unit having a first axial length along a motor axis and a first width transverse to the motor axis; a transmission coupled to the motor drive unit and configured to provide a speed reduction, the transmission having a second axial length along a transmission axis and a second width transverse to the transmission axis; and a rotary impact mechanism, including: a cam shaft rotatably driven by an output member of the transmission, the cam shaft extending along a cam shaft axis and including a first cam groove; a hammer received over the cam shaft, the hammer having a second cam groove; a ball movably disposed in the first cam groove and the second cam groove; an anvil coupled to the output spindle; and a spring biasing the hammer toward the anvil, wherein, in response to a torque on the output spindle is less than or equal to a threshold torque value, the hammer continuously engages the anvil so that the hammer and the anvil rotate together, and in response to a torque on the output spindle that is greater than the threshold torque value, the hammer applies intermittent rotational impacts to the anvil, the hammer having a moment of inertia; wherein the motor drive unit, the transmission, and the impact mechanism are configured to generate an output torque enabling the tool holder to tighten a threaded fastener to a fastening torque within approximately 10 seconds of initiation of rotational impacts imparted on the anvil by the hammer, and wherein a ratio of the fastening torque to a product of the first axial length of the motor drive unit and cross-sectional area of the motor drive unit transverse to the motor axis is between approximately 4 ft-lbs/cm^3 and approximately 11 ft-lbs/cm^3.

In some aspects, the techniques described herein relate to a powered rotary impact tool, wherein a ratio of the fastening torque to product of the second axial length of the transmission and a cross-sectional area of the transmission is between approximately 24 ft-lbs/cm^3 and approximately 64 ft-lbs/cm^3.

In some aspects, the techniques described herein relate to a powered rotary impact tool, wherein the hammer has a moment of inertia and a ratio of the fastening torque to the moment of inertia is between approximately 0.5 kg-mm^2/ft-lbs and approximately 2 kg-mm^2/ft-lbs.

In some aspects, the techniques described herein relate to a powered rotary impact tool, wherein the fastening torque is at least 3600 ft-lbs within approximately 10 seconds of initiation of application of rotational impacts on the anvil by the hammer In some aspects, the techniques described herein relate to a powered rotary impact tool, wherein the fastening torque is between approximately 3600 ft-lbs. and approximately 5400 ft-lbs. within approximately 10 seconds of initiation of application of rotational impacts on the anvil by the hammer.

In some aspects, the techniques described herein relate to a powered rotary impact tool, wherein the motor drive unit, the transmission, and the impact mechanism are configured to generate an output torque enabling the tool holder to tighten a threaded fastener to a fastening torque of greater than or equal to approximately 3600 ft-lbs. within approximately 5 seconds of the initiation of application of rotational impacts on the anvil by the hammer.

In some aspects, the techniques described herein relate to a powered rotary impact tool, the motor drive unit, the transmission, and the impact mechanism are configured to generate an output torque enabling the tool holder to tighten a threaded fastener to a fastening torque of between approximately 3600 ft-lbs. and approximately 4800 ft-lbs. within approximately 5 seconds of initiation of application of rotational impacts on the anvil by the hammer.

In some aspects, the techniques described herein relate to a powered rotary impact tool, wherein the motor drive unit, the transmission, and the impact mechanism are configured to generate an output torque enabling the tool holder to loosen a fastener with a breakaway torque, wherein a ratio of the breakaway torque to a product of the first axial length of the motor drive unit and a cross-sectional area of the motor drive unit is between approximately 4 ft-lbs/cm^3 and approximately 12 ft-lbs/cm^3.

In some aspects, the techniques described herein relate to a powered rotary impact tool wherein the motor drive unit, the transmission, and the impact mechanism are configured to generate an output torque enabling the tool holder to loosen a fastener with a breakaway torque, wherein a ratio of the breakaway torque to a product of the second axial length of the transmission and a cross-sectional area of the transmission to the breakaway torque is between approximately 26 ft-lbs/cm^3 and approximately 71 ft-lbs/cm^3.

In some aspects, the techniques described herein relate to a powered rotary impact tool, wherein the transmission includes a planetary transmission.

In some aspects, the techniques described herein relate to a powered rotary impact tool, wherein the motor drive unit includes a plurality of motors configured to cooperatively drive the transmission.

In some aspects, the techniques described herein relate to a powered rotary impact tool, wherein the motor drive unit also includes: a plurality of pinion gears, a pinion gear of the plurality of pinion gears being provided on and driven by each of the plurality of motors; and a master gear that engages the plurality of pinion gears.

In some aspects, the techniques described herein relate to a powered rotary impact tool, wherein the plurality of pinion gears and the master gear provide a first speed reduction between approximately 1:1 and approximately 8:1, and the transmission provides a second speed reduction between approximately 3:1 and approximately 13:1.

In some aspects, the techniques described herein relate to a powered rotary impact tool, wherein the motor drive unit includes: a rear plate; a front plate; an intermediate plate coupled between the rear plate and the front plate; and an output shaft driven by the master gear; wherein the plurality of motors are mounted in the intermediate plate, and wherein the front plate is disposed between the master gear and the plurality of motors mounted in the intermediate plate, such that the front plate is configured to pilot and support the master gear and a front axial end portion of the plurality of motors.

In some aspects, the techniques described herein relate to a powered rotary impact tool, including: a housing; a handle coupled to the housing; an output spindle at least partially received in the housing and extending along an output axis; a tool holder coupled to the output spindle and configured to rotate in response to rotation of the output spindle; a motor drive unit disposed in the housing, the motor drive unit having a first axial length along a motor axis and a first cross-sectional area transverse to the motor axis; a transmission coupled to the motor drive unit and configured to provide a speed reduction, the transmission having a second axial length along a transmission axis and a second cross-sectional area transverse to the transmission axis; and a rotary impact mechanism, including: a cam shaft rotatably driven by an output member of the transmission, the cam shaft extending along a cam shaft axis and including a first cam groove; a hammer received over the cam shaft, the hammer having a second cam groove; a ball movably disposed in the first cam groove and the second cam groove; an anvil coupled to the output spindle; and a spring biasing the hammer toward the anvil, wherein, in response to a torque on the output spindle is less than or equal to a threshold torque value, the hammer continuously engages the anvil so that the hammer and the anvil rotate together, and in response to a torque on the output spindle that is greater than the threshold torque value, the hammer applies intermittent rotational impacts to the anvil, the hammer having a moment of inertia; wherein the motor drive unit, the transmission, and the impact mechanism are configured to generate an output torque enabling the tool holder to tighten a threaded fastener to a fastening torque within approximately 10 seconds of initiation of rotational impacts imparted on the anvil by the hammer, and wherein a ratio of the fastening torque to a displacement volume of the motor drive unit is between approximately 3 ft-lbs/cm^3 and approximately 14 ft-lbs/cm^3.

In some aspects, the techniques described herein relate to a powered rotary impact tool, wherein a ratio of the fastening torque to a product of an axial length of the transmission and the second cross-sectional area of the transmission is between approximately 24 ft-lbs/cm^3 and approximately 64 ft/lbs/cm^3.

In some aspects, the techniques described herein relate to a powered rotary impact tool, wherein the hammer has a moment of inertia and a ratio of the fastening torque to the moment of inertia is between approximately 0.5 kg-mm^2/ft-lbs and approximately 2 kg-mm^2/ft-lbs.

In some aspects, the techniques described herein relate to a powered rotary impact tool, wherein the fastening torque is at least 3600 ft-lbs within approximately 10 seconds of initiation of application of rotational impacts on the anvil by the hammer In some aspects, the techniques described herein relate to a powered rotary impact tool, wherein the fastening torque is between approximately 3600 ft-lbs. and approximately 5400 ft-lbs. within approximately 10 seconds of initiation of application of rotational impacts on the anvil by the hammer.

In some aspects, the techniques described herein relate to a powered rotary impact tool, wherein the motor drive unit, the transmission, and the impact mechanism are configured to generate an output torque enabling the tool holder to tighten a threaded fastener to a fastening torque of greater than or equal to approximately 3600 ft-lbs. within approximately 5 seconds of the initiation of application of rotational impacts on the anvil by the hammer.

In some aspects, the techniques described herein relate to a powered rotary impact tool, the motor drive unit, the transmission, and the impact mechanism are configured to generate an output torque enabling the tool holder to tighten a threaded fastener to a fastening torque of between approximately 3600 ft-lbs. and approximately 4800 ft-lbs. within approximately 5 seconds of initiation of application of rotational impacts on the anvil by the hammer.

In some aspects, the techniques described herein relate to a powered rotary impact tool, wherein the motor drive unit, the transmission, and the impact mechanism are configured to generate an output torque enabling the tool holder to loosen a fastener with a breakaway torque, wherein a ratio of the breakaway torque to a product of the first axial length of the motor drive unit and the first cross-sectional area of the motor drive unit is between approximately 3 ft-lbs/cm^3 and approximately 14 ft-lbs/cm^3.

In some aspects, the techniques described herein relate to a powered rotary impact tool, wherein the motor drive unit, the transmission, and the impact mechanism are configured to generate an output torque enabling the tool holder to loosen a fastener with a breakaway torque, wherein a ratio of the breakaway torque to a product of the axial length of the transmission and the second cross-sectional area of the transmission to the breakaway torque is between approximately 26 ft-lbs/cm^3 and approximately 71 ft-lbs/cm^3.

In some aspects, the techniques described herein relate to a powered rotary impact tool, wherein the transmission includes a planetary transmission.

In some aspects, the techniques described herein relate to a powered rotary impact tool, wherein the motor drive unit includes a plurality of motors configured to cooperatively drive the transmission.

In some aspects, the techniques described herein relate to a powered rotary impact tool, wherein the motor drive unit also includes: a plurality of pinion gears, a pinion gear of the plurality of pinion gears being provided on and driven by each of the plurality of motors; and a master gear that engages the plurality of pinion gears.

In some aspects, the techniques described herein relate to a powered rotary impact tool, wherein the plurality of pinion gears and the master gear provide a first speed reduction between approximately 1:1 and approximately 8:1, and the transmission provides a second speed reduction between approximately 3:1 and approximately 13:1.

In some aspects, the techniques described herein relate to a powered rotary impact tool, including: a housing extending along a tool axis, the housing including: a rear handle at a first end portion of the housing; a battery receptacle portion axially forward of the rear handle, the battery receptacle portion including a cavity configured to removably receive a battery pack along an insertion axis that is substantially orthogonal to the tool axis, wherein the battery receptacle portion substantially surrounds five sides of the battery pack having a rectangular prismatic shape; a motor housing portion axially forward of the battery receptacle portion; a transmission housing portion axially forward of the motor housing portion; and an impact mechanism housing portion axially forward of the transmission housing portion; an output spindle at least partially received in the impact mechanism housing portion and coupled to a tool holder at a second end portion of the housing; a motor drive unit disposed in the motor housing portion; a transmission disposed in the transmission housing portion, the transmission receiving rotary torque output by a motor drive output shaft of the motor drive unit, the transmission being configured to provide a speed reduction; and a rotary impact mechanism disposed in the impact mechanism housing portion, the rotary impact mechanism including: a hammer; and an anvil coupled to the output spindle, wherein, in response to a torque on the output spindle that is less than or equal to a threshold torque value, the hammer continuously engages the anvil so that the hammer and the anvil rotate together, and in response to a torque on the output spindle that is greater than the threshold torque value, the hammer applies intermittent rotational impacts to the anvil.

In some aspects, the techniques described herein relate to a powered rotary impact tool, wherein the rear handle is D-shaped.

In some aspects, the techniques described herein relate to a powered rotary impact tool, further including: a trigger coupled to the rear handle, wherein the motor drive unit is actuated in response to actuation of the trigger; and a mode control interface coupled to the rear handle for selecting a mode of operation of the rotary impact tool.

In some aspects, the techniques described herein relate to a powered rotary impact tool 84-86, further including a front handle coupled to one of the transmission housing portion, the impact mechanism housing portion, or between the transmission housing portion and the impact mechanism housing portion.

In some aspects, the techniques described herein relate to a powered rotary impact tool, wherein the front handle is rotatable relative to the housing.

In some aspects, the techniques described herein relate to a powered rotary impact tool, wherein the front handle is pivotable about a handle axis that is transverse to the tool axis.

In some aspects, the techniques described herein relate to a powered rotary impact tool, further including a light assembly coupled to a front end portion of the impact mechanism housing portion, generally surrounding a portion of the output spindle extending out of the second end portion of the housing.

In some aspects, the techniques described herein relate to a powered rotary impact tool, wherein the light assembly includes a plurality of lights mounted on one or more circuit boards.

In some aspects, the techniques described herein relate to a powered rotary impact tool, further including a plurality of wires routed from at least one of the one or more circuit boards, under the impact mechanism, the transmission, and the motor drive unit, to a control board located adjacent the battery receptacle portion.

In some aspects, the techniques described herein relate to a powered rotary impact tool, further including a wire harness molded with the light assembly and extending beneath the impact mechanism housing portion to support the plurality of wires.

In some aspects, the techniques described herein relate to a powered rotary impact tool, further including a terminal block provided in the battery receptacle portion, extending in an insertion direction.

In some aspects, the techniques described herein relate to a powered rotary impact tool, further including a control module adjacent the battery receptacle portion and extending in a direction that is parallel to tool axis.

In some aspects, the techniques described herein relate to a powered rotary impact tool, further including a first vibration isolator positioned between the terminal block and the housing.

In some aspects, the techniques described herein relate to a powered rotary impact tool, further including a second vibration isolator positioned between the control module and the housing.

In some aspects, the techniques described herein relate to a powered rotary impact tool, wherein a ratio of a fastening torque output by the rotary impact tool to a displacement volume of the motor drive unit is between approximately 3 ft-lbs/cm^3 and approximately 14 ft-lbs/cm^3.

In some aspects, the techniques described herein relate to a powered rotary impact tool, including: a housing; an output spindle at least partially received in the housing and extending along a tool axis; a motor drive unit disposed in the housing and including a motor drive output shaft; a planetary transmission rotatably driven by the motor drive output shaft and configured to provide a speed reduction, the planetary transmission including a sun gear, a plurality of planet gears meshed with the sun gear, a stationary ring gear in meshed engagement with the plurality of planet gears, and a carrier to which the plurality of planet gears are mounted; a rotary impact mechanism, including: a cam shaft rotatably driven by the carrier, the cam shaft including a first cam groove; a hammer received over the cam shaft, the hammer including a second cam groove; a ball movably disposed in the first cam groove and the second cam groove; an anvil coupled to the output spindle; and a spring biasing the hammer toward the anvil, wherein, in response to a torque on the output spindle that is less than or equal to a threshold torque value, the hammer continuously engages the anvil so that the hammer and the anvil rotate together, and in response to a torque on the output spindle that is greater than the threshold torque value, the hammer applies moves axially rearward and then axially forward to apply intermittent rotational impacts to the anvil, wherein, in a rearmost position of the hammer, at least a portion of the ring gear is nested inside at least a portion of the hammer.

In some aspects, the techniques described herein relate to a powered rotary impact tool, wherein a ratio of a fastening torque output by the rotary impact tool to a displacement volume of the motor drive unit is between approximately 3 ft-lbs/cm^3 and approximately 14 ft-lbs/cm^3.

In some aspects, the techniques described herein relate to a powered rotary impact tool, including: a housing; an output shaft at least partially received in the housing and extending along a tool axis; a tool holder coupled to the output shaft so as to rotate with the output shaft; a rotary impact mechanism, including a hammer and an anvil coupled to the output shaft, wherein, in response to a torque on the output shaft that is less than or equal to a threshold torque value, the hammer continuously engages the anvil so that the hammer and the anvil rotate together, and in response to a torque on the output shaft that is greater than the threshold torque value, the hammer applies intermittent rotational impacts to the anvil; a motor drive unit configured to provide torque to the rotary impact mechanism; and a control module configured to control power delivery to the motor drive unit, wherein the control module is configured to control the motor drive unit to output a first power when installing a fastener to achieve a fastening torque of less than approximately 1700 ft-lbs, and is configured to control the motor drive unit to output a second power that is greater than the first power when removing a fastener to achieve a breakaway torque of greater than or equal to approximately 3600 ft-lbs.

In some aspects, the techniques described herein relate to a powered rotary impact tool, wherein a ratio of a fastening torque output by the rotary impact tool to a displacement volume of the motor drive unit is between approximately 3 ft-lbs/cm^3 and approximately 14 ft-lbs/cm^3. The details of one or more implementations are set forth in the accompanying drawings and the description below. Other features will be apparent from the description and drawings.

BRIEF DESCRIPTION OF THE DRAWINGS

FIG. 4C(1) is a plan view of the motor drive unit shown in FIGS. 4A and 4B.

FIG. 4C(2) is a plan view of the motor drive unit shown in FIGS. 4A-4C(1), with the first plate removed.

FIGS. 4E(1) and 4E(2) are perspective views of the motor drive unit shown in FIGS. 4A-4D, from a second side of the motor drive unit.

FIGS. 4F(1) and 4F(2) are perspective views of the motor drive unit shown in FIGS. 4A-4E, from a second side of the motor drive unit.

FIG. 4G(1) is a partially exploded view of the motor drive unit shown in FIGS. 4A-4F, including a transmission cap couplable to the second side of the motor drive unit.

FIG. 4G(2) is an axial end view of the transmission cap

DETAILED DESCRIPTION

Figure 1A:
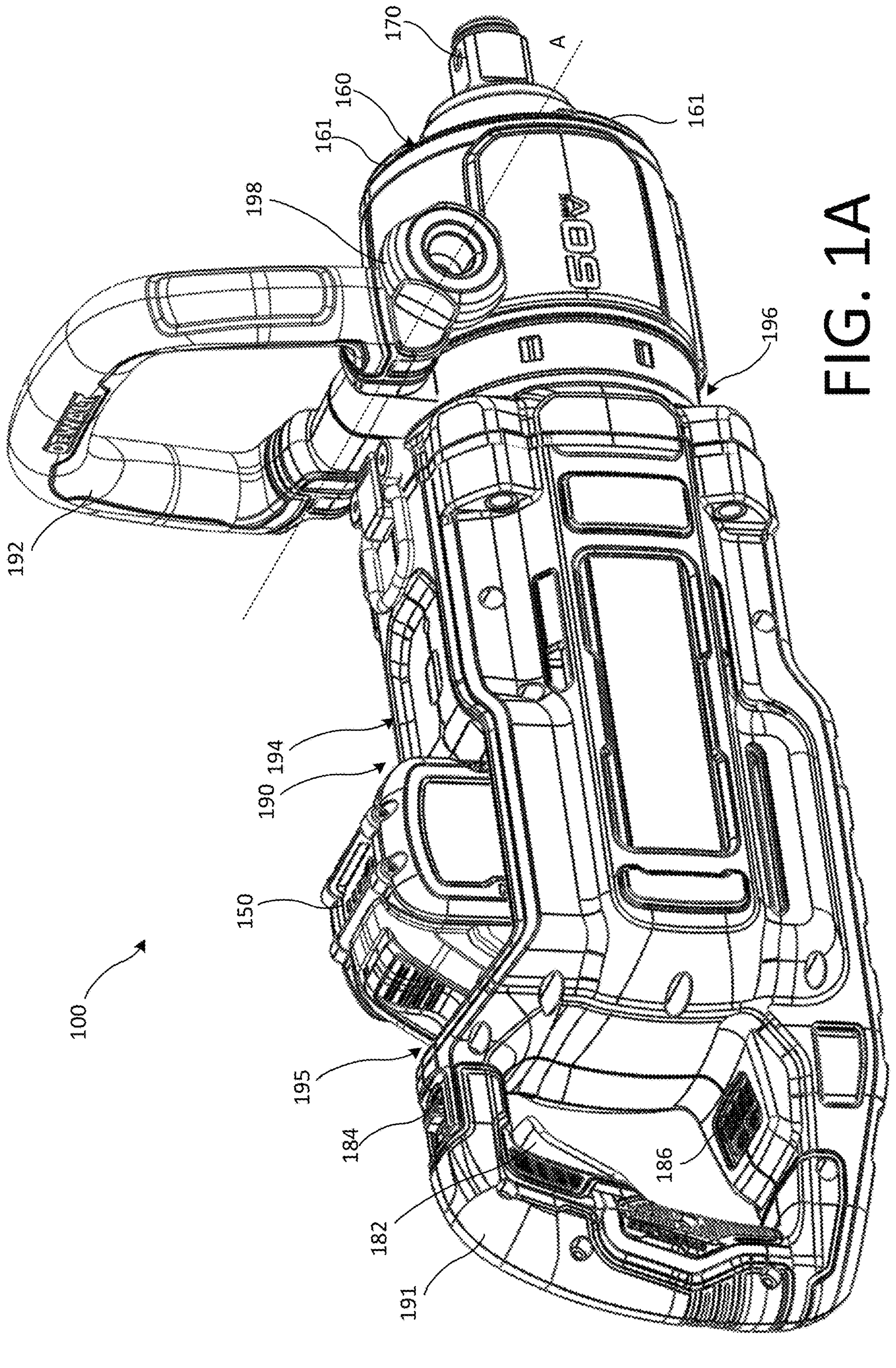
FIG. 1A is a first perspective view of an example power-driven tool including an impact mechanism.
Figure 1B:
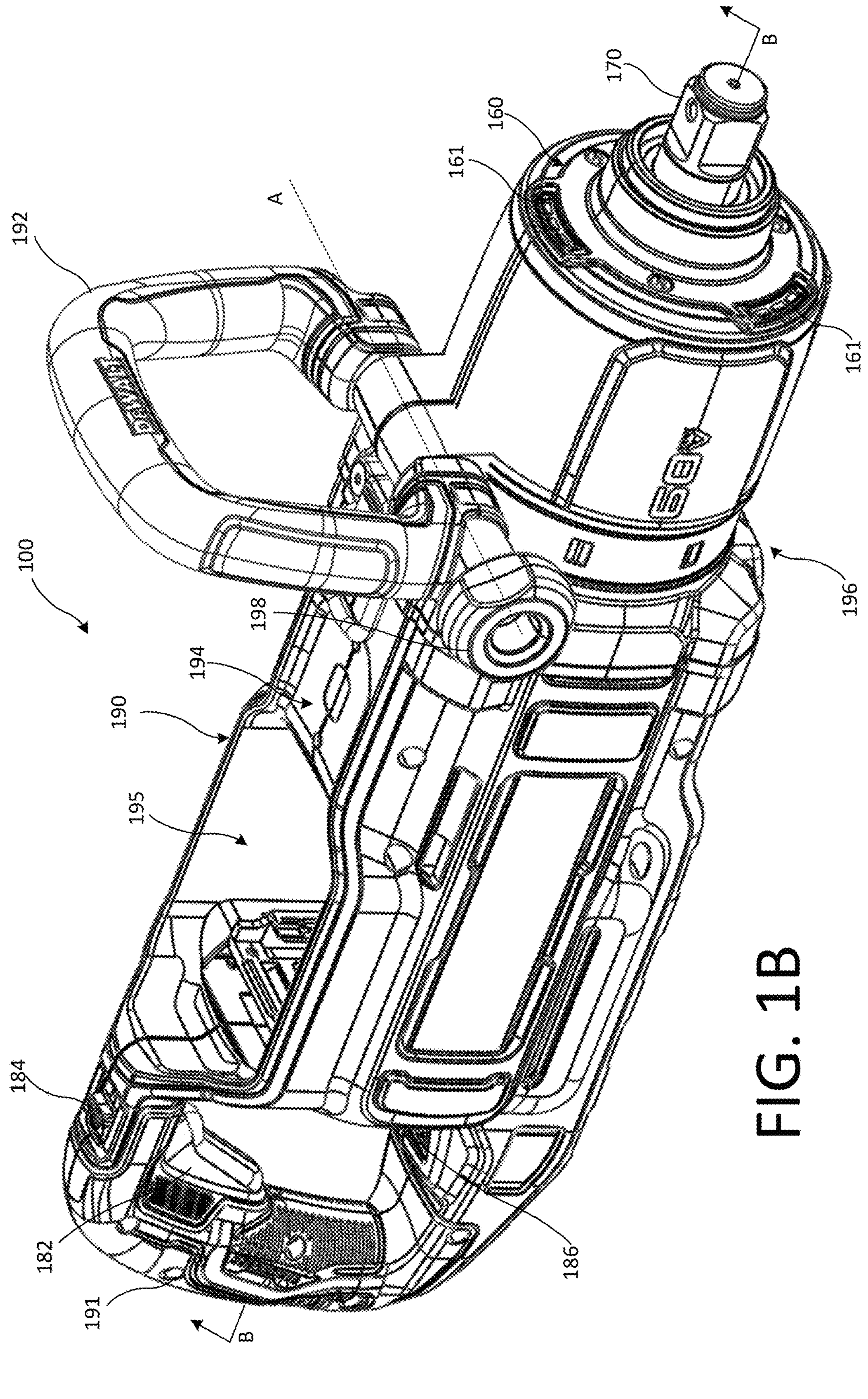
FIG. 1B is a second perspective view of the example power-driven tool shown in FIG. 1A, with a power storage device removed.
Figure 1C:
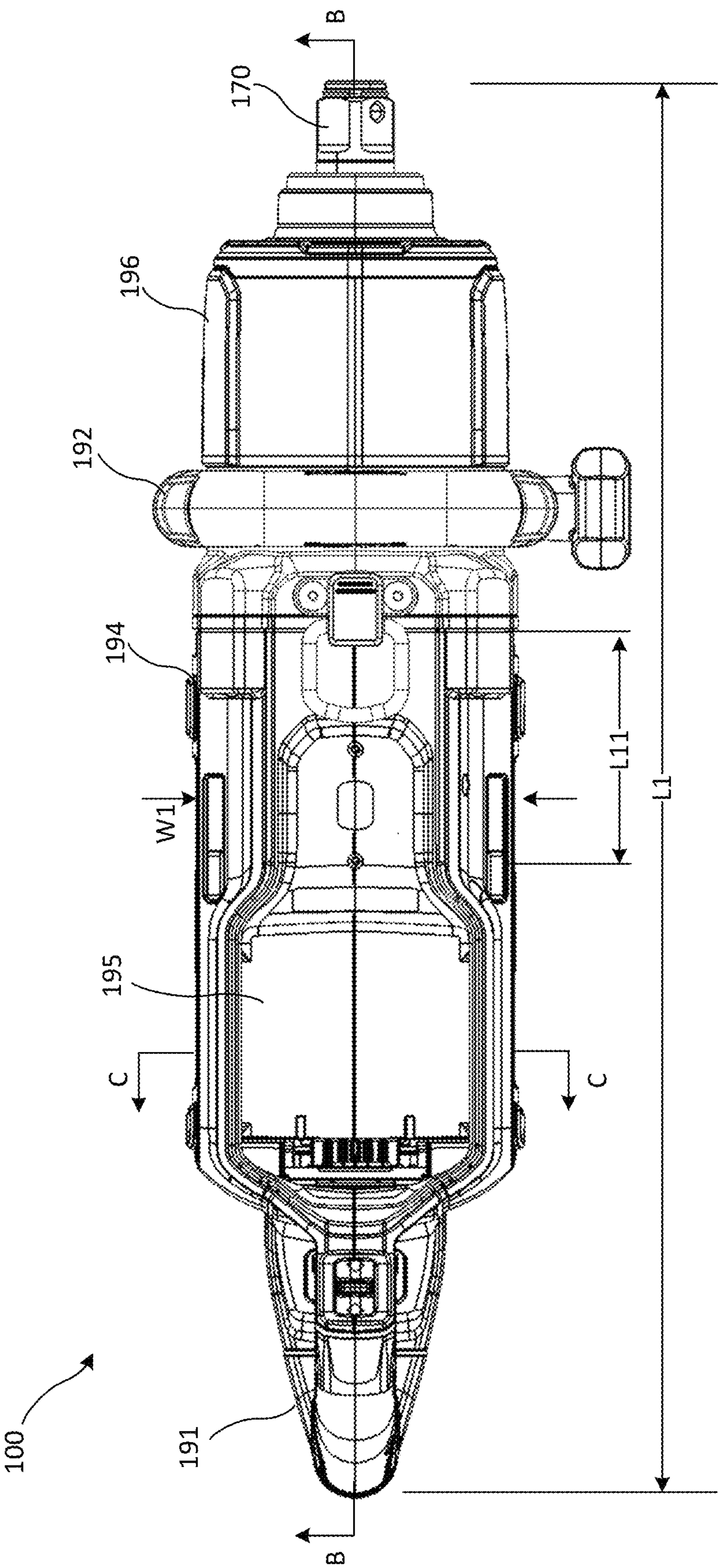
FIG. 1C is a top view of the example power-driven tool shown in FIGS. 1A and 1B, with the power storage device removed.
Figure 1D:
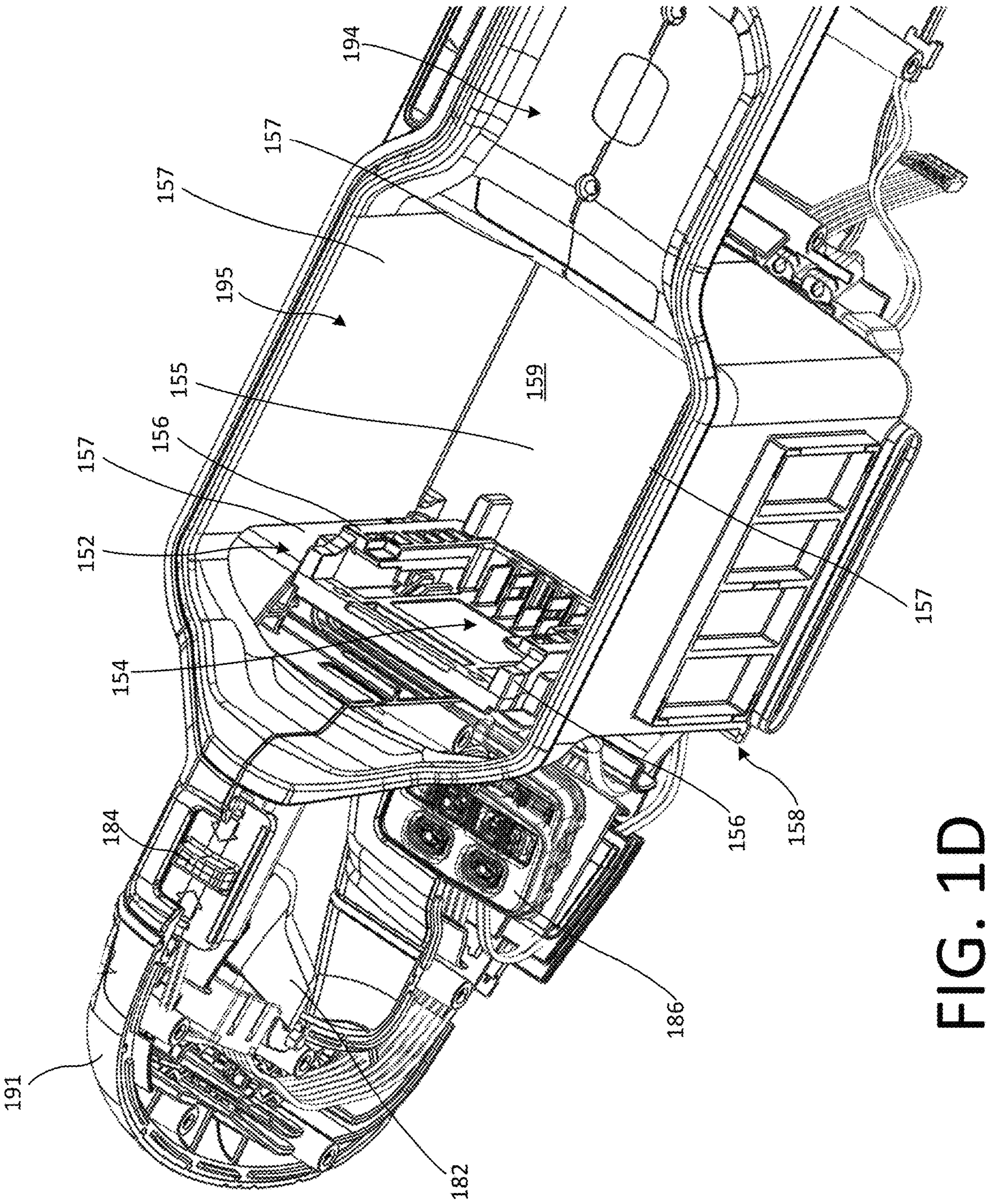
FIG. 1D is a close-in view of a power storage device receptacle of the example power-driven tool shown in FIGS. 1A-1C.
Figure 1E:
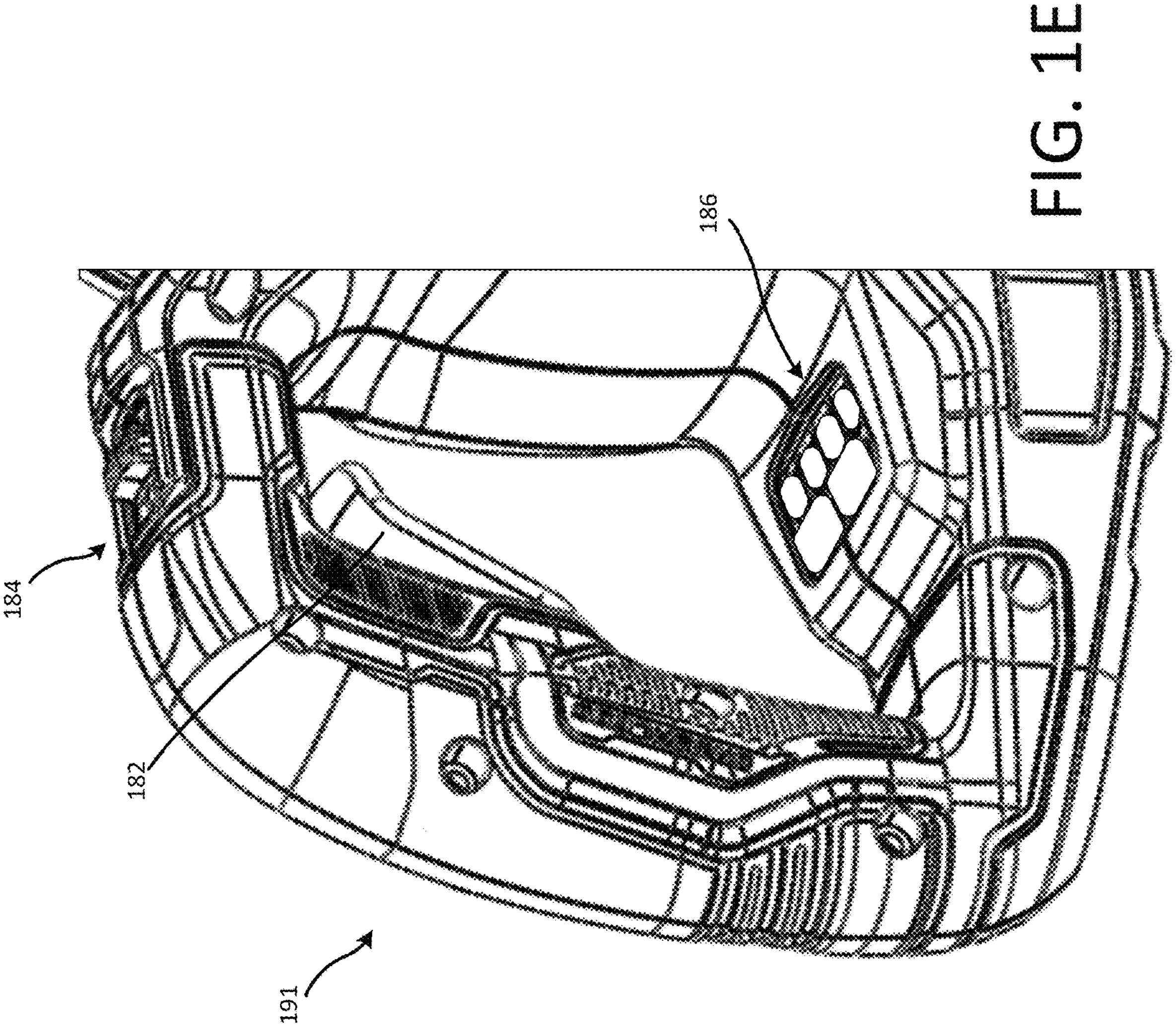
FIG. 1E is a close in view of a handle portion of the example power-driven tool shown in FIGS. 1A-1C.

Power-driven tools including an impact mechanism (such as impact drivers and impact wrenches) can output a relatively high rotational torque. For example, a power-driven tool including an impact mechanism may output a very high fastening torque for the fastening of a fastener into a workpiece, and may output a very high breakaway torque for the disengagement of a fastener from a workpiece. In some situations, accommodating a driving system and/or an impact mechanism producing the desired output characteristics within a housing of the power-driven tool may result in a configuration of the impact tool that is relatively large and/or heavy and/or difficult for a user to maintain stability during operation.

An impact tool, in accordance with implementations described herein, includes a driving system including a motor engaged with a transmission. In some examples, the motor is a multi-motor drive unit including a plurality of motors, the plurality of motors being engaged with a single gear of a transmission, for transmitting a driving force to the impact mechanism and output spindle. In some examples, engagement of the plurality of motors with the single gear of the transmission provides for a speed reduction in the rotational speed output by the plurality of motors to the transmission. In some examples, the motor is a single motor engaged with a transmission, transmitting a driving force to the impact mechanism and the output spindle. In some examples, the transmission is a planetary transmission. In some examples, the planetary transmission provides for a speed reduction, from the rotational speed output by the motor, to the rotational speed output to the impact mechanism and output spindle. In some examples, the impact tool receives power from a power storage device, or battery, that is removably couplable to the impact tool. In some examples, the power storage device, or battery, has a voltage of at least 54 V. In some examples, the impact tool outputs greater than approximately 3500 ft-lbs of fastening torque and greater than approximately 4000 ft-lbs of breakaway torque. In some examples, the impact tool outputs less than approximately 1700 ft-lbs of fastening torque and at least approximately 2500 ft-lbs of breakaway torque. In some examples, testing of fastening torque is completed by running the impact tool continuously for a set period of time, such as, for example, approximately 10 seconds. The accumulated torque applied to a fastener, such as a bolt, by the impact tool over this time is considered the fastening torque. In some examples, breakaway torque is tested by fastening a fastener, such as a bolt, to a given torque and running the impact tool continuously to test if the fastener can be loosened to zero tension in under a set amount of time, such as, for example, approximately 20 seconds. Some examples of the impact tool can be tested on a 1¾" bolt and 2¾" socket for fastening torque and breakaway torque. Some examples of the impact tool can be tested with a 1½" bolt and 2⅜" socket.

Figure 2A:
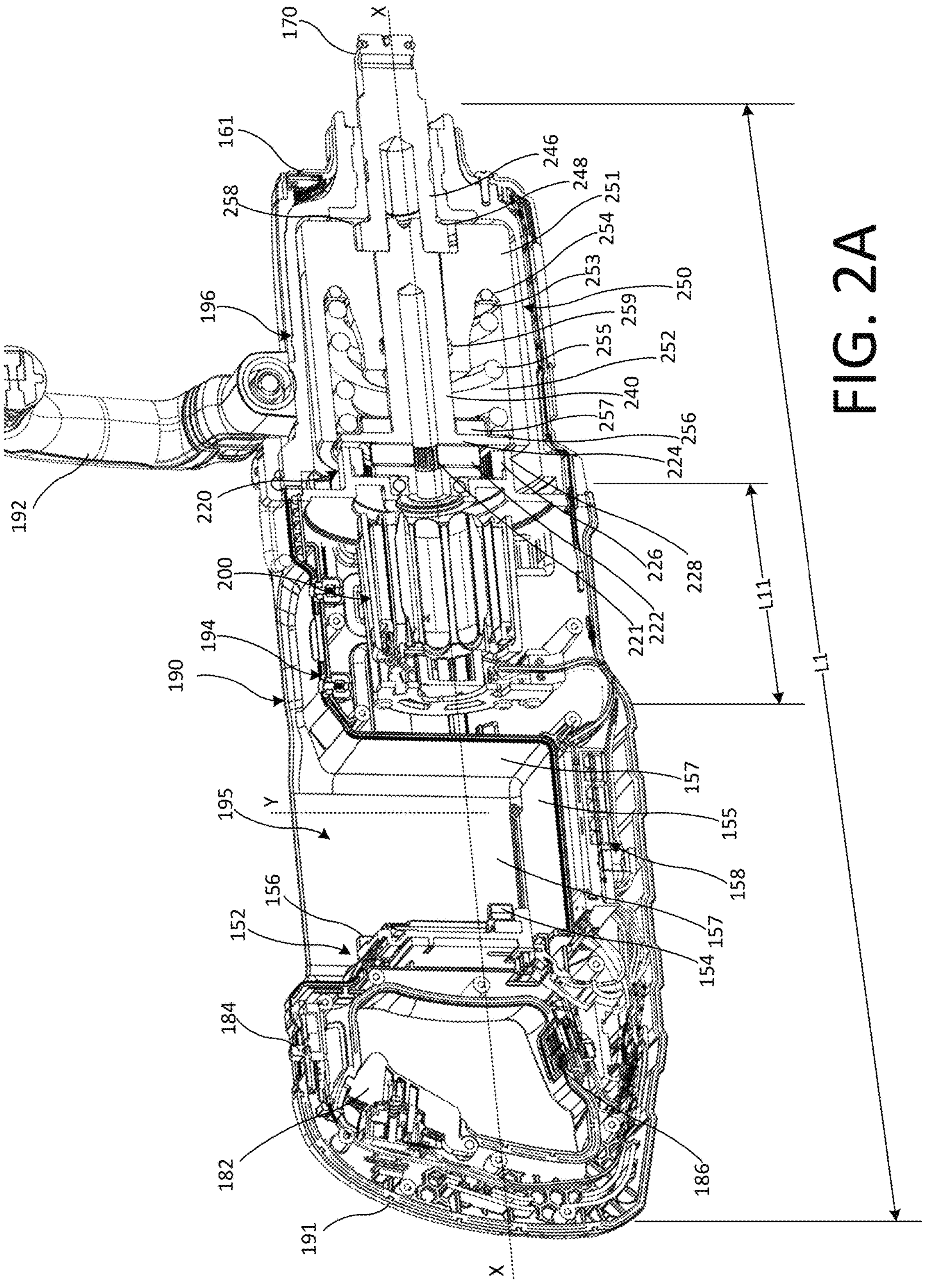
FIG. 2A is a cross-sectional view of the example power-driven tool shown in FIGS. 1A-1D, taken along line B-B of FIG. 1C.
Figure 2B:
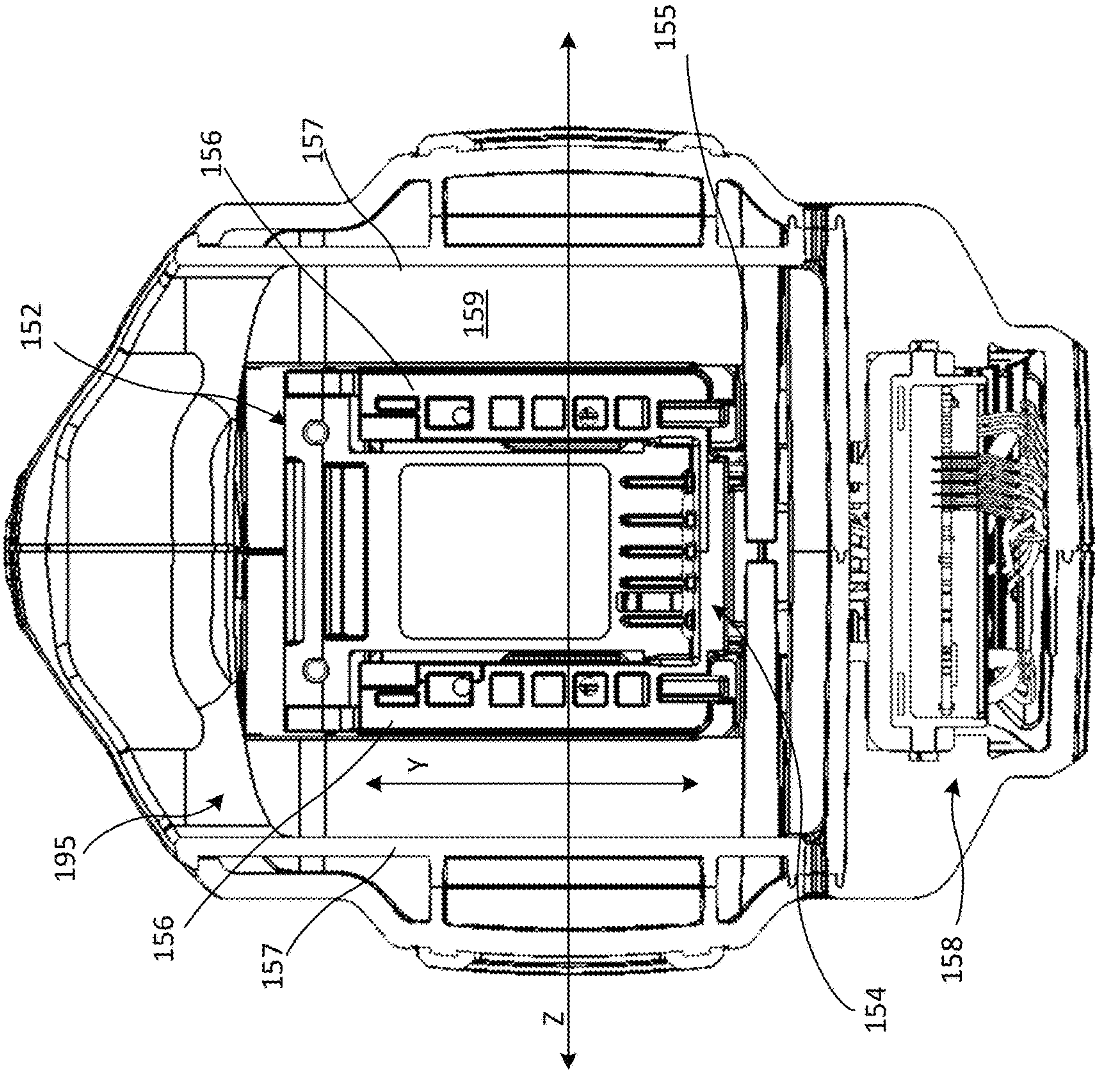
FIG. 2B is a cross-sectional view of the example power-driven tool shown in FIGS. 1A-1D, taken along line C-C of FIG. 1C.
Figure 2C:
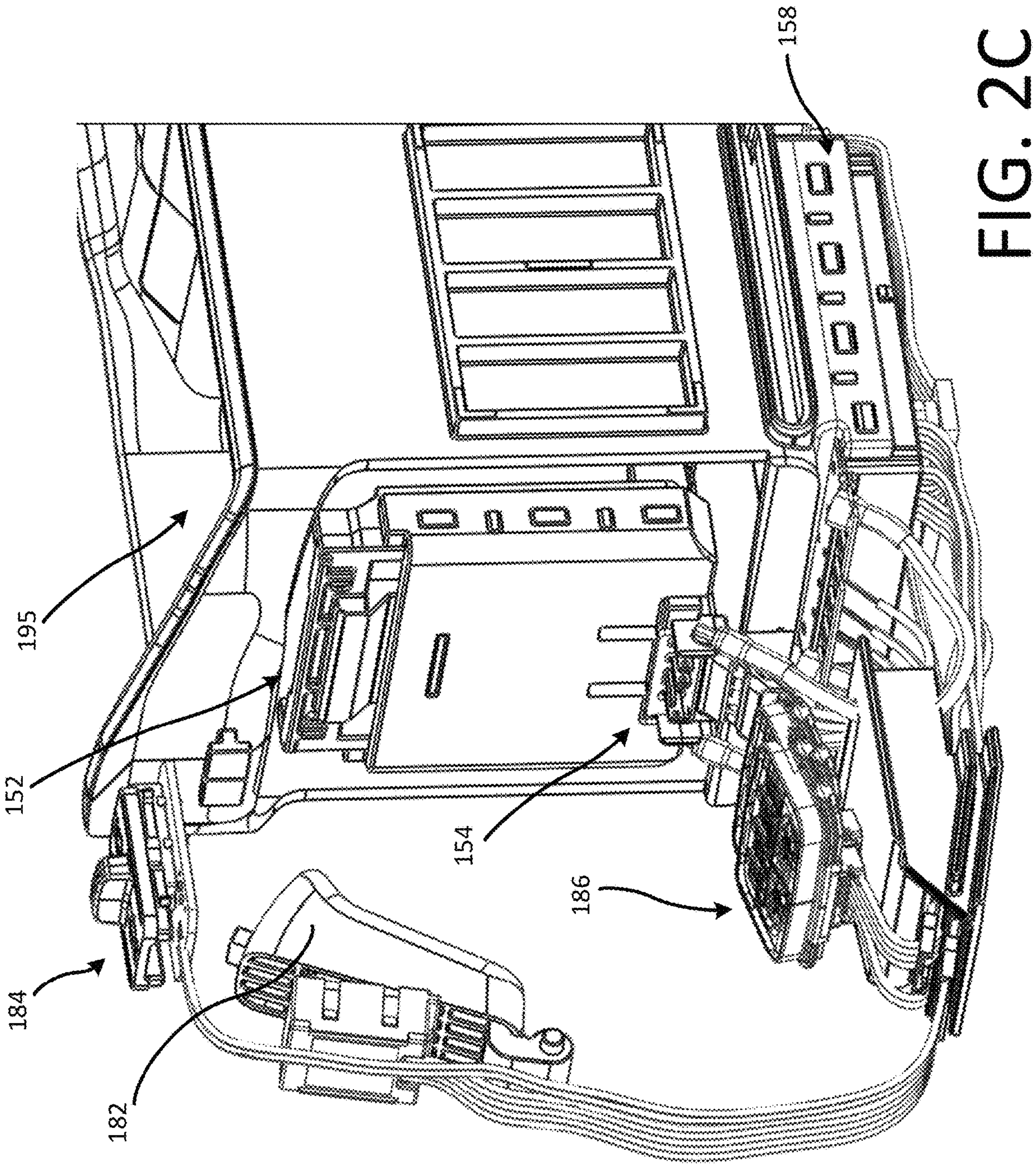
FIG. 2C is a close-in view of a handle portion of the example power-driven tool shown in FIGS. 1A-1D, with a corresponding portion of a housing removed, so that internal components received in and/or on the handle portion are visible.

An example impact tool 100, in the form of an example impact wrench, is shown in FIGS. 1A-2C. The example impact tool 100 shown in FIGS. 1A-2C is a cordless impact tool powered by a removable power storage device, or battery. In particular, FIG. 1A is a first perspective view of an example impact tool 100. FIG. 1B is a second perspective view of the example impact tool 100 shown in FIG. 1A, with a battery removed from a battery receptacle of the example impact tool 100. FIG. 1C is a close-in view of the battery receptacle of the example impact tool 100. FIG. 1E is a close in view of a handle portion of the example impact tool 100. FIG. 2A is a cross-sectional view of the example impact tool 100 shown in FIGS. 1A-1D, taken along line B-B of FIG. 1C. FIG. 2B is a cross-sectional view of the example impact tool 100 shown in FIGS. 1A-1D, taken along line C-C of FIG. 1C. FIG. 2C is a close-in view of a handle portion of the example impact tool 100, with a corresponding portion of the tool housing removed, so that wired connections between user interface devices coupled in the handle portion and a control module of the example impact tool 100 are visible.

The example impact tool 100 includes a tool housing 190 extending generally along a tool axis X, the tool axis X extending longitudinally along a length of the example impact tool 100, from a first end portion defining a rear end portion of the example impact tool 100 at which a first handle portion 191 is formed, to a second end portion defining a front end portion of the example impact tool, or working end of the example impact tool 100. A plurality of components, such as, for example, a driving system including a motor, a transmission, and an impact mechanism are received in the tool housing 190. In some examples, the tool housing 190 includes a motor housing 194 in which components of a motor drive unit 200 of the example impact tool 100 are received. In some examples, the tool housing 190 includes a transmission and impact mechanism housing 196 in which components of a transmission 220 and components of an impact mechanism 260 of the example impact tool 100 are received.

In some examples, the first (or rear) handle portion 191 is positioned at the first end portion of the tool housing 190. In some examples, the first handle portion 191 has a D-shaped contour. In some examples, a second (or front) handle portion 192 is coupled to the transmission and impact mechanism housing 196. In some examples, the second handle portion 192 is rotatable about the tool axis X and/or is pivotable about a handle axis A that is transverse to the tool axis X, to a plurality of different positions, to accommodate user preferences for grasping the example impact tool 100. In some examples, user manipulation of a knob 198 provides for adjustment of a rotational position of the second handle portion 192 about the tool axis X and/or about the handle axis A. In the example arrangement shown in FIGS. 1A-1D, the first handle portion 191 and the second handle portion 192 are positioned so that a first hand of the user grips the first handle portion 191, and a second hand of the user grips the second handle portion 192, to provide for stability during operation of the example impact tool 100. The positioning of the first handle portion 191 and the second handle portion 192 in this manner may provide for ambidextrous use of the example impact tool 100. In some examples, a cavity 159 defining a battery receptacle 195 is formed between the first handle portion 191 and the motor housing 194. In the example shown in FIGS. 1A-1D, a battery 150, functioning as a power source for the example impact tool 100, is removably receivable in the battery receptacle 195.

In some examples, the example impact tool 100 includes one or more user interface devices providing for operation and control of the example impact tool 100 in response to user manipulation. In the example arrangement shown in FIGS. 1A-2C, a trigger 182 is provided on the first handle portion 191. The trigger 182 may be engaged, for example, manipulated by a user, to provide for operation of the example impact tool 100. In the example arrangement shown in FIGS. 1A-2C, a switch 184 is provided on the first handle portion 191. The switch 184 may be manipulated by the user, to control a direction of operation of the motor drive unit 200 (for example, forward and reverse operation of the motor drive unit 200), to in turn control a rotational direction of an output spindle 170 of the example impact tool 100, and a direction of torque output by the output spindle 170. In the example arrangement shown in FIGS. 1A-2C, a mode selector 186 is provided on the first handle portion 191. The mode selector 186 may be manipulated by the user to provide for selection of a mode of operation of the example impact tool 100. In some examples, selection of a mode of operation of the example impact tool 100 may include, for example, selection of an operating speed of the example impact tool 100, selection of an output torque of the example impact tool 100, selection of whether the impact tool 100 is operating in a fastening mode or a fastener removal mode, and other such operating parameters. In some examples, the first handle portion 191 is a D-shaped handle. The D-shape of the first handle portion 191 may accommodate the incorporation of the trigger 182, the switch 184, and the mode selector 186. The D-shape of the first handle portion 191 may facilitate user access to the trigger 182, the switch 184, and the mode selector 186.

The output spindle 170 extends through a second end portion of the tool housing 190, for coupling of an accessory device, such as, for example a socket, a socket driver, or other such accessory device, to the example impact tool 100. In some examples, a plurality of illuminators are positioned on the tool housing 190, proximate the output spindle 170, to provide for illumination of a workpiece during operation of the example impact tool 100. In some examples, the plurality of illuminators is provided as a lighting assembly 160 including a plurality of lights 161. In some examples, the plurality of lights 161 are arranged along a periphery of the output spindle 170, to provide for illumination of the workpiece during operation of the example impact tool 100. In some examples, one or more of the plurality of lights 161 are light emitting diodes (LEDs) that can be collectively or selectively controlled to provide for illumination of the workpiece during operation of the example impact tool 100.

As shown in FIGS. 1A-2B, a cavity 159 formed between the first handle portion 191 and the motor housing 194 defines the battery receptacle 195. The cavity 159 defining the battery receptacle 195 includes a base wall 155 and peripheral side walls 157 that together define the cavity 159. An open end portion of the cavity 159 provides for insertion and removal of the battery 150 from the battery receptacle 195. An interior portion of the cavity 159 defining the battery receptacle 195 is illustrated in the close-in view shown in FIG. 1D, and in the cross-sectional views shown in FIGS. 2A and 2B. A terminal block 152 is located in the battery receptacle 195. The terminal block 152 extends along an insertion axis Y that is transverse to the tool axis X. The terminal block 152 includes a plurality of terminals 154 at a lower end portion of the terminal block 152. Guide rails 156 are positioned corresponding to the insertion axis Y (i.e., substantially vertically, in a substantially horizontal orientation of the example impact tool 100), on opposite sides of the plurality of terminals 154. The guide rails 156 guide insertion of the battery 150 into the battery receptacle 195, for connection of terminals of the battery (not shown) to the plurality of terminals 154 in the battery receptacle 195 of the example impact tool 100, and to guide removal of the battery 150 from the battery receptacle 195. In some examples, a dimension, for example, a width, of the battery receptacle 195 in the direction of a transverse axis Z corresponds to a dimension, for example a width, of the battery 150, and a dimension, for example a length, of the battery receptacle 195 in the direction of the tool axis X corresponds to a dimension, for example, a length of the battery 150, such that the battery 150 inserted in the battery receptacle 195 is surrounded by the base wall 155 and the peripheral side walls 157. The transverse axis Z is substantially orthogonal to the tool axis X, and substantially orthogonal to the insertion axis Y.

A control module 158 is positioned below the lower end portion of the battery receptacle 195. In some examples, the control module 158 extends generally parallel to the tool axis X. The control module 158 provides for communication between the trigger 182, the switch 184, the mode selector 186, and the plurality of terminals 154/the battery 150, for operation of the motor drive unit 200, and corresponding operation of the example impact tool 100, in response to user manipulation of the trigger 182 and/or the switch 184 and/or the mode selector 186. Positioning of the control module 158 and the battery receptacle 195/plurality of terminals 154 of the terminal block 152/battery 150 in close proximity to the first handle portion 191 on which the trigger 182, switch 184, and mode selector 186 are located may simplify the wired connection of these elements in the tool housing 190 of the example impact tool 100. In the view illustrated in FIG. 2C, a portion of the tool housing 190 corresponding to the first handle portion 191 is removed, so that the wired connection of the trigger 182, the switch 184, the mode selector 186, the plurality of terminals 154 of the terminal block 152, and the control module 158 are visible.

As shown in FIG. 2A, the motor drive unit 200 is received in the motor housing 194. In some examples, the motor drive unit 200 is a single brushless DC motor that receives power from the battery 150. In some examples, the motor may be a different type of motor. In the example arrangement shown in FIG. 2A, the transmission 220 is coupled to an output shaft of the motor drive unit 200. In some examples, the transmission 220 is a planetary transmission, providing for a reduction in speed from the rotational speed output by the motor drive unit 200. In some examples, the transmission 220 in the form of a planetary transmission, includes a pinion or a sun gear 221 driven by the motor drive unit 200. one or more planet gears 222 are mounted on a planet carrier 224 and are in meshed engagement between the sun gear 221 and a ring gear 226. The ring gear 226 is fixed on a ring gear mount 228 which is, in turn, fixed to the tool housing 190. Thus, the ring gear mount 228, and ring gear 226 fixed thereto, remain stationary, while the planet gears 222 mounted on the planet carrier 224 rotate, thus causing the planet carrier 224 to rotate.

A cam shaft 240 of the impact mechanism 250 extends axially forward from the planet carrier 224 and rotates together with the planet carrier 224, at a reduced rotational rate relative to the sun gear 221, in response to rotation of the planet gear(s) 222 about the sun gear 221. Thus, the transmission 220 transmits input power from the motor drive unit 200 to the cam shaft 240 at a reduced speed relative to the rotational speed of the output shaft of the motor drive unit 200.

A substantially cylindrical hammer 251 is received over the cam shaft 240. The cylindrical hammer 251 is configured to move rotationally and axially relative to the cam shaft 240. In some examples, a front end portion of the cam shaft 240 has a reduced diameter, so as to be received in an axial opening in the output spindle 170. In some examples, an anvil 246, including two radially extending anvil projections 248, is fixedly coupled to a rear end portion of the output spindle 170. The hammer 251 includes two hammer projections 258 at a front end portion thereof that lie in the same rotational plane as the anvil projections 248, such that each hammer projection 258 may engage a corresponding anvil projection 248 in a rotating direction.

A pair of rear-facing V-shaped cam grooves (not shown) are formed on an outer wall of the cam shaft 240, with open end portions thereof facing toward the first end portion, or rear end portion, of the tool housing 190. A corresponding pair of forward-facing V-shaped cam grooves 259 is formed on an interior wall of the hammer 251, with open end portions thereof facing toward the second end portion, or front end portion, of the tool housing 190. One or more balls (not shown) are received in and ride along each of the cam grooves 259 to couple the hammer 251 to the cam shaft 240.

A compression spring 255 is received in a cylindrical recess 252 in the hammer 251 and abuts a forward face of the planet carrier 224. In some examples, a front end portion of the spring 255 rests against a washer 253 and bearing 254 disposed within the recess 252. In some examples, a rear end portion of the spring 255 is coupled to an annular spring mounting plate 256. In some examples, a spacer 257 may be positioned between the mounting plate 256 and a forward face of the transmission 220 to prevent the spring 255 from resting against the planet carrier 224. In some examples, the spacer 257 is partially nested in an annular portion of the mounting plate 256. In some examples, the spacer 257 enables the spring 255 to be of a larger diameter than the planet carrier 224, allowing, for example, a greater compression force to be exerted on the hammer 251, which in turn generates a higher impact force on the anvil 246. The spring 255 biases the hammer 251 toward the anvil 246 so that the hammer projections 258 engage the corresponding anvil projections 248.

At low torque levels, the impact mechanism 250 transmits torque to the output spindle 170 in a continuous rotary mode. In the continuous rotary mode, the compression spring 255 maintains the hammer 251 in its most forward position so that the hammer projections 258 continuously engage the anvil projections 248. This causes the cam shaft 240, the hammer 251, the anvil 246, and the output spindle 170 to rotate together as a unit so that the output spindle 170 has substantially the same rotational speed as the cam shaft 240.

As the torque increases, and reaches and/or exceeds a torque transition threshold, the impact mechanism 250 transmits torque to the output spindle 170 in an impact mode. In the impact mode, the hammer 251 moves axially rearward, against the force of the spring 255. This decouples the hammer projections 258 from the anvil projections 248. Thus, the anvil 246 continues to spin freely on its axis without being driven by the motor drive unit 200 and the transmission 220, and coasts to a slightly slower speed. Meanwhile, the hammer 251 continues to be driven at a higher speed by the motor drive unit 200 and the transmission 220. As this occurs, the hammer 251 moves axially rearward relative to the anvil 246 due to the rearward movement of the balls in the V-shaped cam grooves 259. When the balls reach a rearmost position in the V-shaped cam grooves 259, the spring 255 drives the hammer 251 axially forward with a rotational speed that exceeds the rotational speed of the anvil 246. This causes the hammer projections 258 to rotationally strike the anvil projections 248, imparting a rotational impact to the output spindle 170. This impacting operation repeats, imparting intermittent rotational impacts on the output spindle 170, as long as the torque on the output spindle 170 continues to exceed the torque transition threshold.

In the example arrangement shown in FIGS. 1A-2C, the example impact tool 100 has an overall length L1, in a longitudinal direction corresponding to the tool axis X. In the example shown in FIGS. 1A-2C, the motor drive unit 200 has an overall length L11, in the longitudinal direction along a motor drive unit axis X1. In the example shown in FIGS. 1A-2C, the transmission 220 extends along a transmission axis X2. In the example shown in FIGS. 1A-2C, the impact mechanism 250 extends along an impact mechanism axis X3. In the example shown in FIGS. 1A-2C, the output spindle 170 extends along an output axis X4. In the example shown in FIGS. 1A-2C, the tool axis X, the motor drive unit axis X1, the transmission axis X2, the impact mechanism axis X3, and the output axis X4 are all substantially aligned, such that the motor drive unit 200, the transmission 220, the impact mechanism 250, and the output spindle 170 operate substantially coaxially about the tool axis X, simply for purposes of discussion and illustration. In some examples, the tool axis X, the motor drive unit axis X1, the transmission axis X2, the impact mechanism axis X3, and the output axis X4 are not necessarily aligned for coaxial operation in this manner. In the example shown in FIGS. 1A-2C, the example impact tool 100 has an overall width W1, for example, taken at the motor housing 194, in a transverse direction corresponding to the transverse axis Z.

In some examples, a power source providing power to the impact tool 100, including the motor drive unit 200, the transmission 220, and the impact mechanism 250 as described above, is in the form of a power storage device, such as the battery 150 described above. In some examples, the battery 150 has a voltage of at least 54 volts and a capacity of at least 6 amp-hours.

In some examples, the example impact tool 100, including the motor drive unit 200, the transmission 220, and the impact mechanism 250 as described above, outputs at least approximately 3500 ft-lbs of fastening torque and at least approximately 4000 ft-lbs of breakaway torque. In some examples, the example impact tool 100, including the motor drive unit 200, the transmission 220, and the impact mechanism 250 as described above, outputs less than approximately 1700 ft-lbs of fastening torque and at least approximately 2500 ft-lbs of breakaway torque.

Figure 2D:
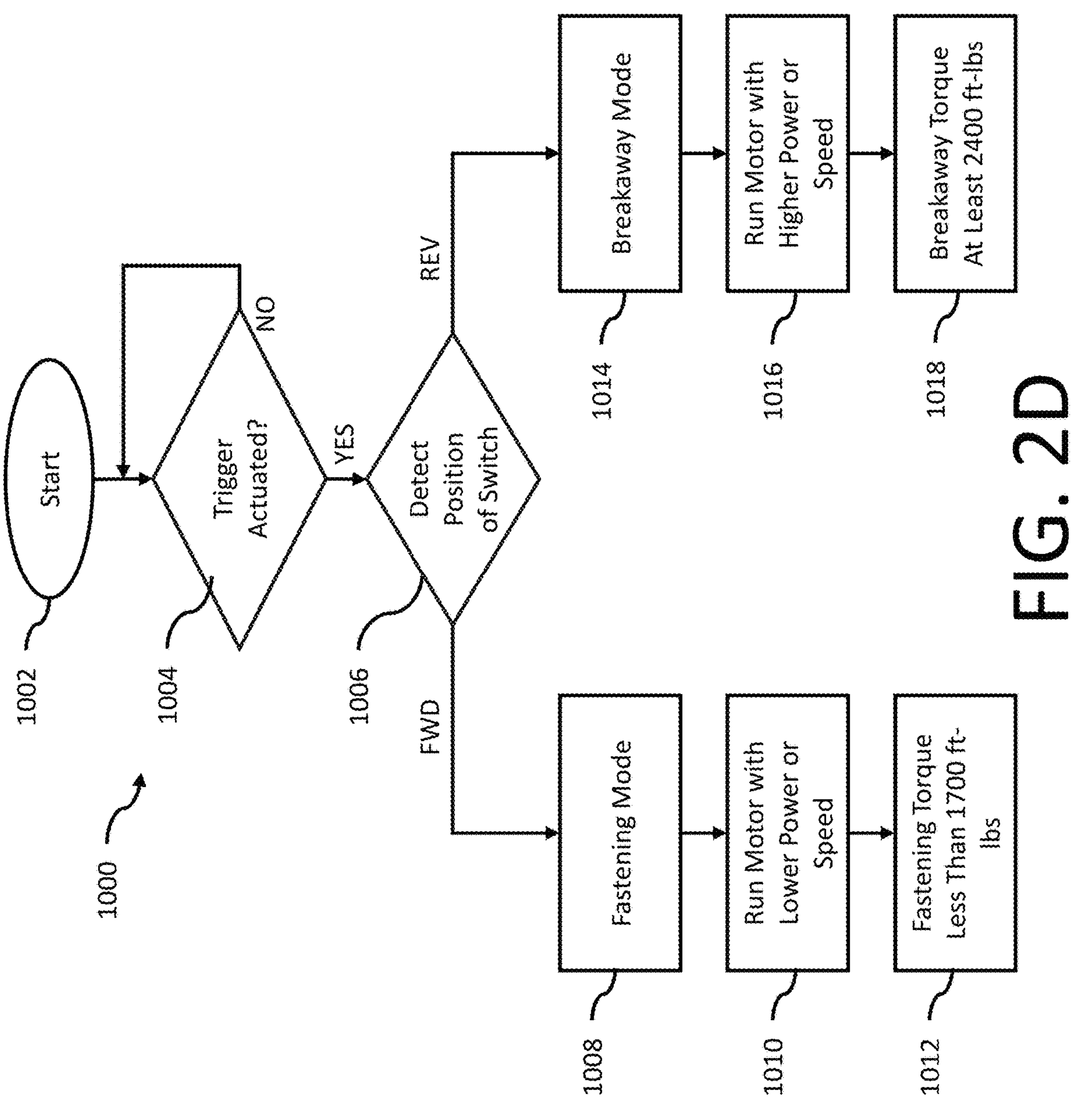
FIG. 2D is a flow chart illustrating an example control algorithm for a power-driven rotary impact tool.

In some examples, the control module 138 may control the motor drive unit 200 to operate in a first mode when the impact tool 100 is being used to fasten a fastener (e.g., operating in a fastening mode), and to operate in a second mode when the impact tool 100 is being used to remove a fastener (e.g., operating in a breakaway mode). In an example, as shown in FIG. 2D, the control module 138 is programmed to implement a control algorithm 1000. After operation of the impact tool 100 is initiated at step 1002, the control module 138 determines whether the trigger 182 has been actuated. If the trigger 182 has been actuated, then at step 1006 the control module 138 detects the position of the switch 184. In some examples, the switch 184 is manipulated to select forward or reverse operation of the impact tool 100. If the position of the switch 184 indicates selection of the forward mode of operation, then at step 1008, the control module 138 determines that impact tool 100 is being operated in the fastening mode to install a fastener. Next, at step 1010, the control module 138 controls the motor with reduced power or speed as compared to operation in the breakaway mode. This can be achieved, for example, by implementing a reduced duty cycle (also known as pulse width modulation), reduced current, reduced voltage, or reduced conduction band and/or angle advance, as compared with operation in the breakaway mode. The lower power or speed enables a lower fastening torque (e.g., less than 1700 ft-lbs), which may reduce stripping of a fastener head. If, at step 1006, the position of the switch 184 indicates selection of the reverse mode of operation, then at step 1014, the control module 138 determines that impact tool 100 is being operated in the breakaway mode to remove a fastener. Next, at step 1016, the control module 138 controls the motor drive unit 200 with reduced power or speed as compared to the fastening mode. This can be achieved, for example, by implementing a higher duty cycle (also known as pulse width modulation), higher current, higher voltage, or enhanced conduction band and/or angle advance (CBAA), as compared with the fastening mode. The higher power or speed enables a higher breakaway torque (e.g., greater than or equal to 2400 ft-lbs), which may help remove a stuck bolt or nut.

Figure 2E:
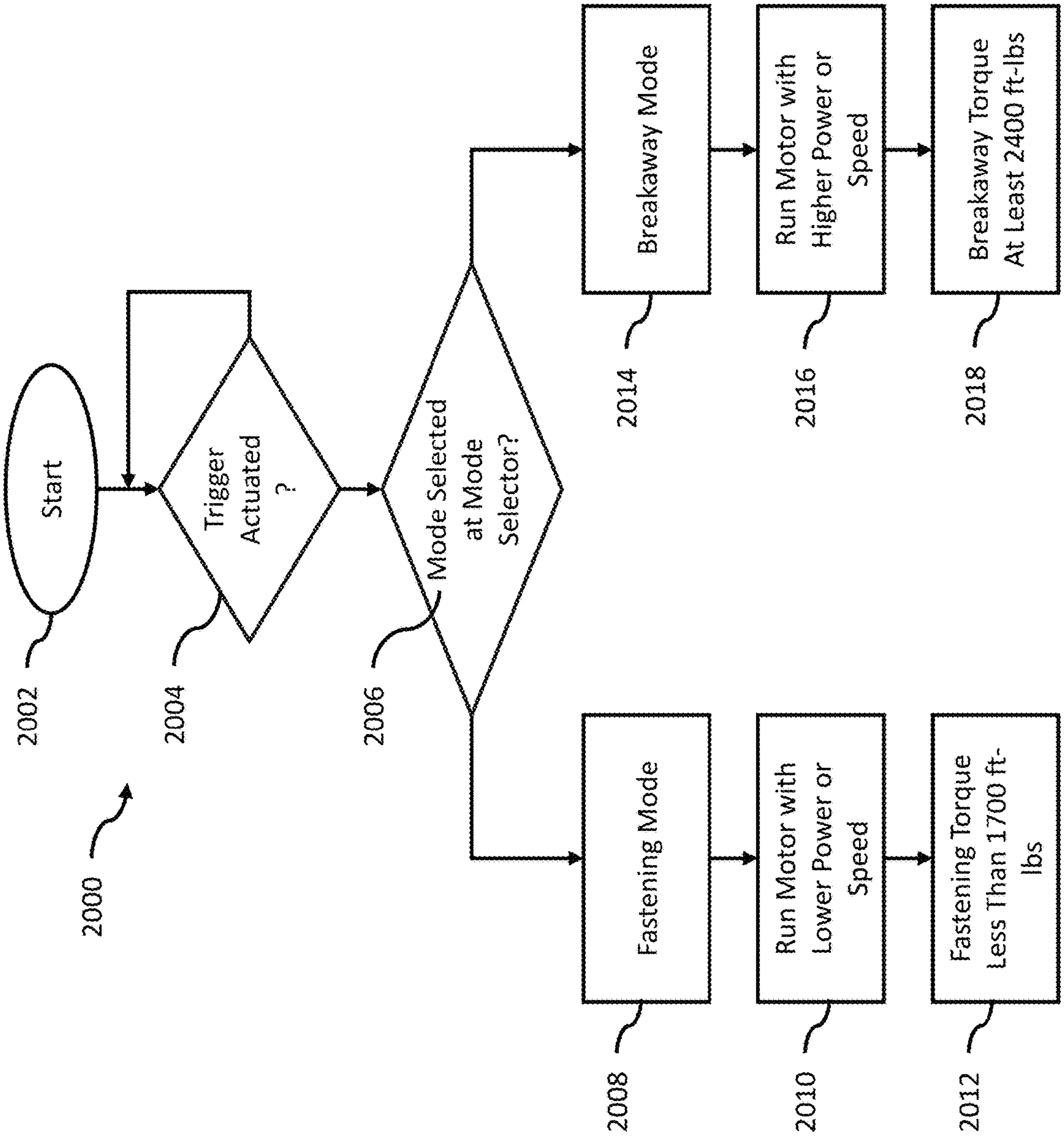
FIG. 2E is a flow chart illustrating another example control algorithm for a power-driven rotary impact tool.

In another example, as shown in FIG. 2E, the control module 138 is programmed to implement a control algorithm 2000. After operation of the impact tool 100 is initiated at step 2002, the control module 138 determines whether the trigger 182 has been actuated. If the trigger has been actuated, then at step 2006 the control module 138 detects whether the fastening mode or the breakaway mode has been selected using the mode selector 186, regardless of the position of the switch 184. If, at step 2008, the mode selector 186 indicates selection of the fastening mode, then at step 2010, the control module 138 controls the motor drive unit 200 with reduced power or speed as compared to the breakaway mode. This can be achieved, for example, by implementing a reduced duty cycle (also known as pulse width modulation), reduced current, reduced voltage, or reduced conduction band and/or angle advance, as compared with the breakaway mode. The lower power or speed enables a lower fastening torque (e.g., less than 1700 ft-lbs), which may reduce stripping of a fastener head. If, at step 2014, the mode selector 186 indicates selection of the breakaway mode of operation, then at step 2016, the control module 138 controls the motor drive unit 200 with reduced power or speed as compared to the fastening mode. This can be achieved, for example, by implementing a higher duty cycle (also known as pulse width modulation), higher current, higher voltage, or enhanced conduction band and/or angle advance (CBAA), as compared with fastening mode. The higher power or speed enables a higher breakaway torque (e.g., greater than or equal to 2400 ft-lbs), which may help remove a stuck bolt or nut.

In an example, in fastening mode, the control module 158 controls the motor drive unit 200 with a reduced (e.g., 90%) duty cycle, while in the breakaway mode, the control module 158 controls the motor drive unit 200 with a higher (e.g., 100%) duty cycle. In another example, the duty cycle is the same in both modes, and, in the fastening mode, the control module controls the motor drive unit 200 with a baseline (e.g., 120/30) CBAA, while in the breakaway mode, the control module 158 controls the motor drive unit 200 with an enhanced (e.g., 150/60) CBAA. Other ways of controlling speed and/or power of the motor drive unit 200 may be used to achieve the desired fastening torque and breakaway torque.

In some examples, fastening torque levels and/or breakaway torque levels output by rotary impact tools, such as the example impact tool 300 described herein, can be verified using a variety of methods. In some examples, a direct tension measurement device is used to correlate tension to torque by measuring torque with a torque transducer as a device is tightened. Examples of devices on which this can be measured include, for example, an electronic load cell, or a hydraulic cylinder in which a bolt increases a pressure in the cylinder, with that pressure being directly proportional to the tension in the bolt. In some examples, a break forward first movement test uses the rotary impact tool to tighten a fastener, and, using a torque wrench or torque transducer, the fastener is slowly tightened until the fastener starts to move. The peak torque is detected at a point just before the fastener moves. In some examples, a break away first movement test uses the rotary impact tool to tighten a fastener, and, using a torque wrench or torque transducer, the fastener is slowly loosened until the fastener starts to move. The peak torque is detected at a point just before the fastener moves. In some examples, a turn-to-mark test uses the rotary impact tool to tighten a fastener. An alignment mark is made on both the fastener and a fixed element relative to the rotation of the fastener (for example, an element being clamped or fixed by the fastener). The fastener is then loosened, and re-tightened with a torque wrench until the alignment marks are re-aligned to detect peak torque, counting the number of turns, as the marks will align every 360 degrees.

Figure 3A:
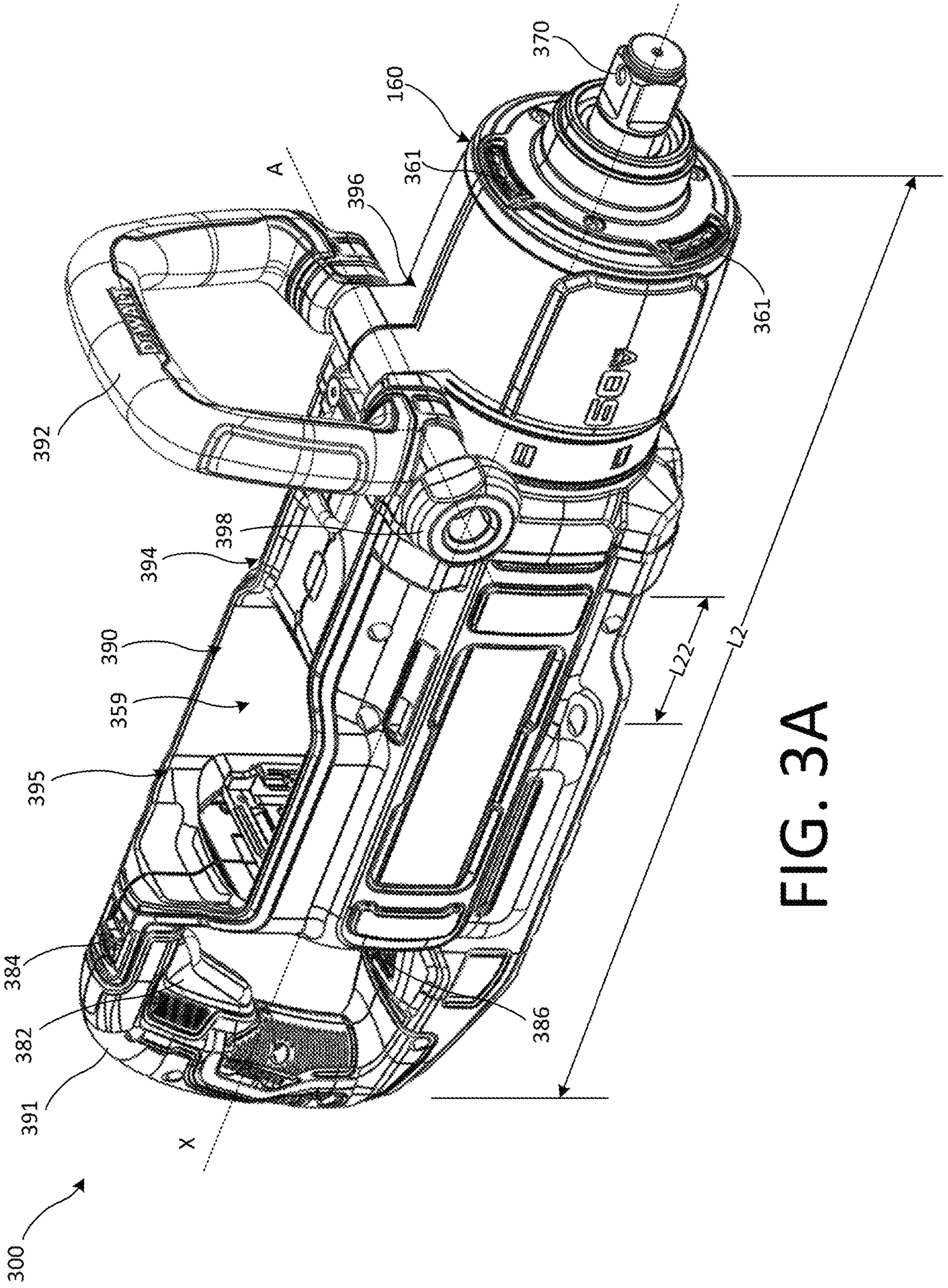
FIG. 3A is a perspective view of an example power-driven rotary impact tool.
Figure 3B:
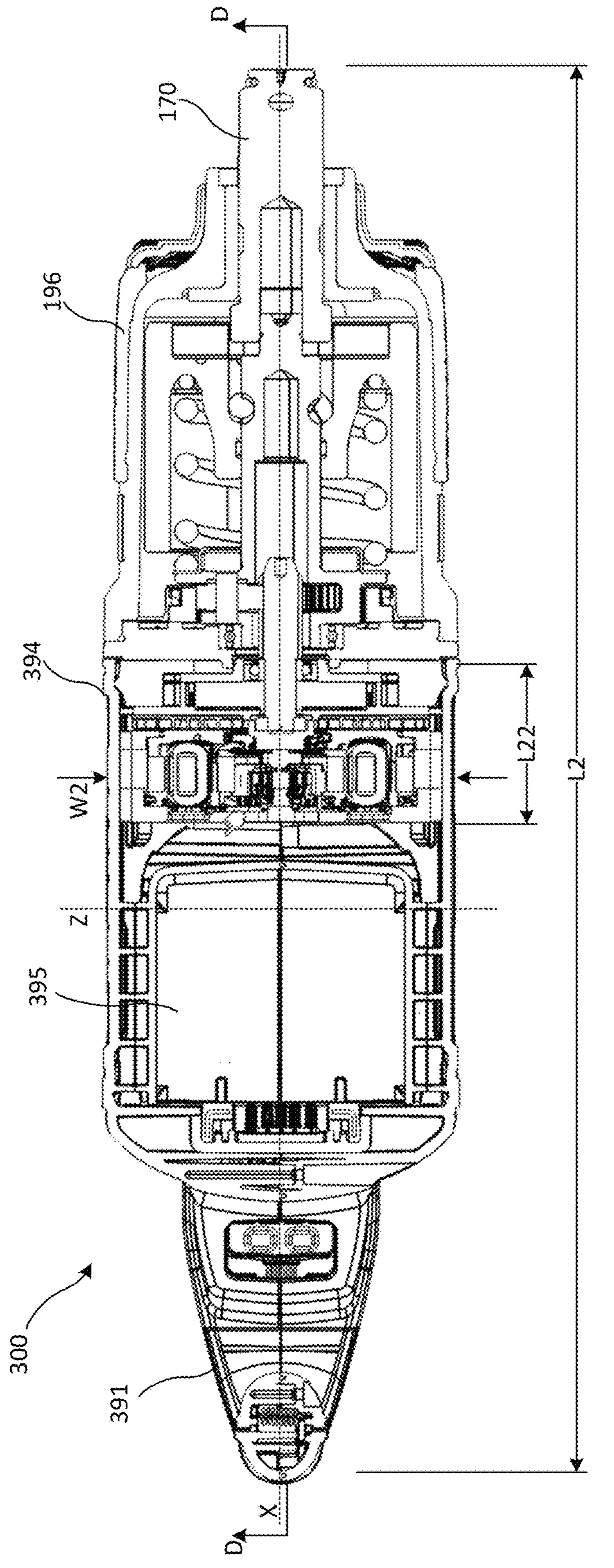
FIG. 3B is a top cross-sectional view of the example power-driven rotary impact tool shown in FIG. 3A.
Figure 3C:
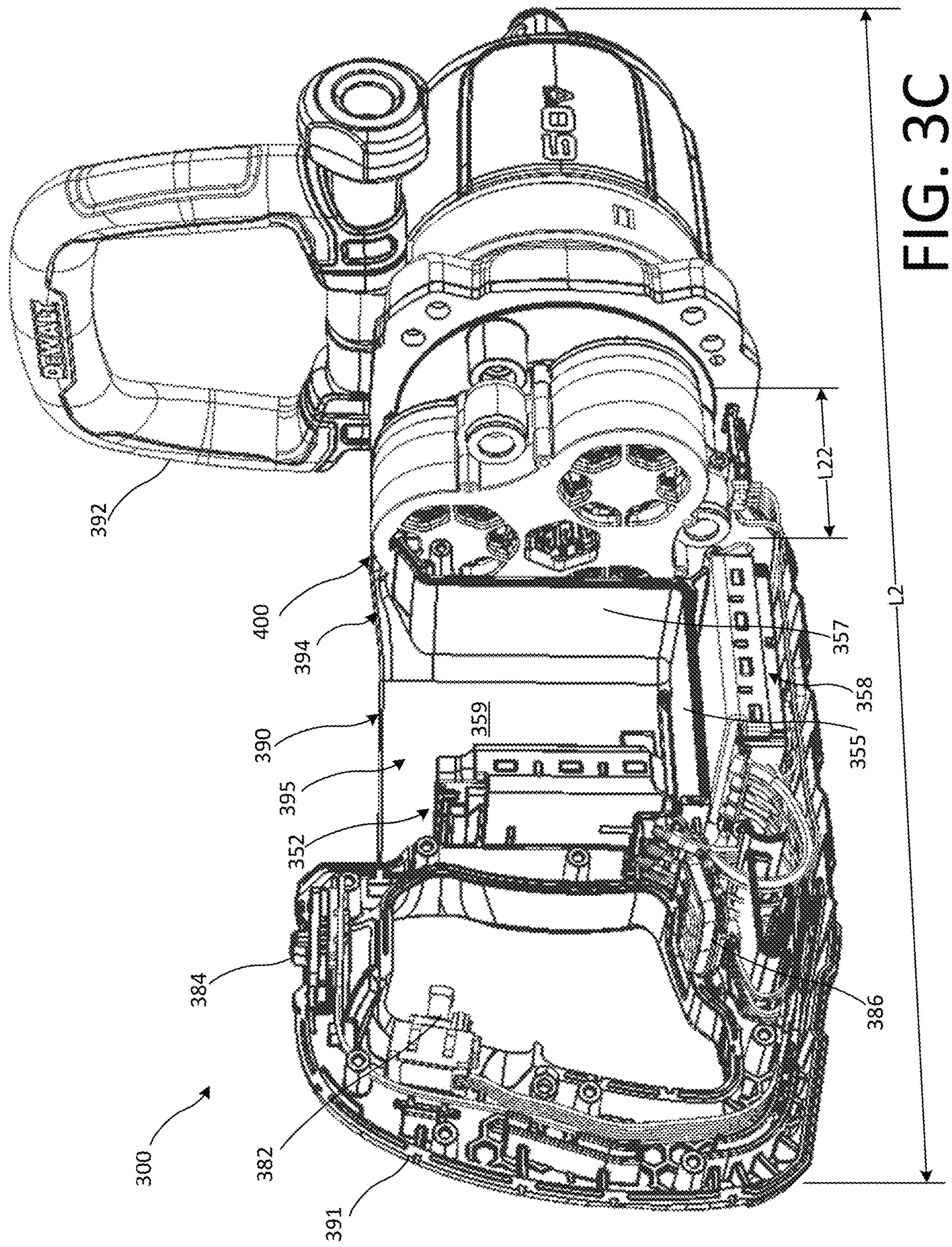
FIG. 3C is a perspective view of the example power-driven rotary impact tool shown in FIGS. 3A and 3B, with a portion of a housing removed.
Figure 3D:
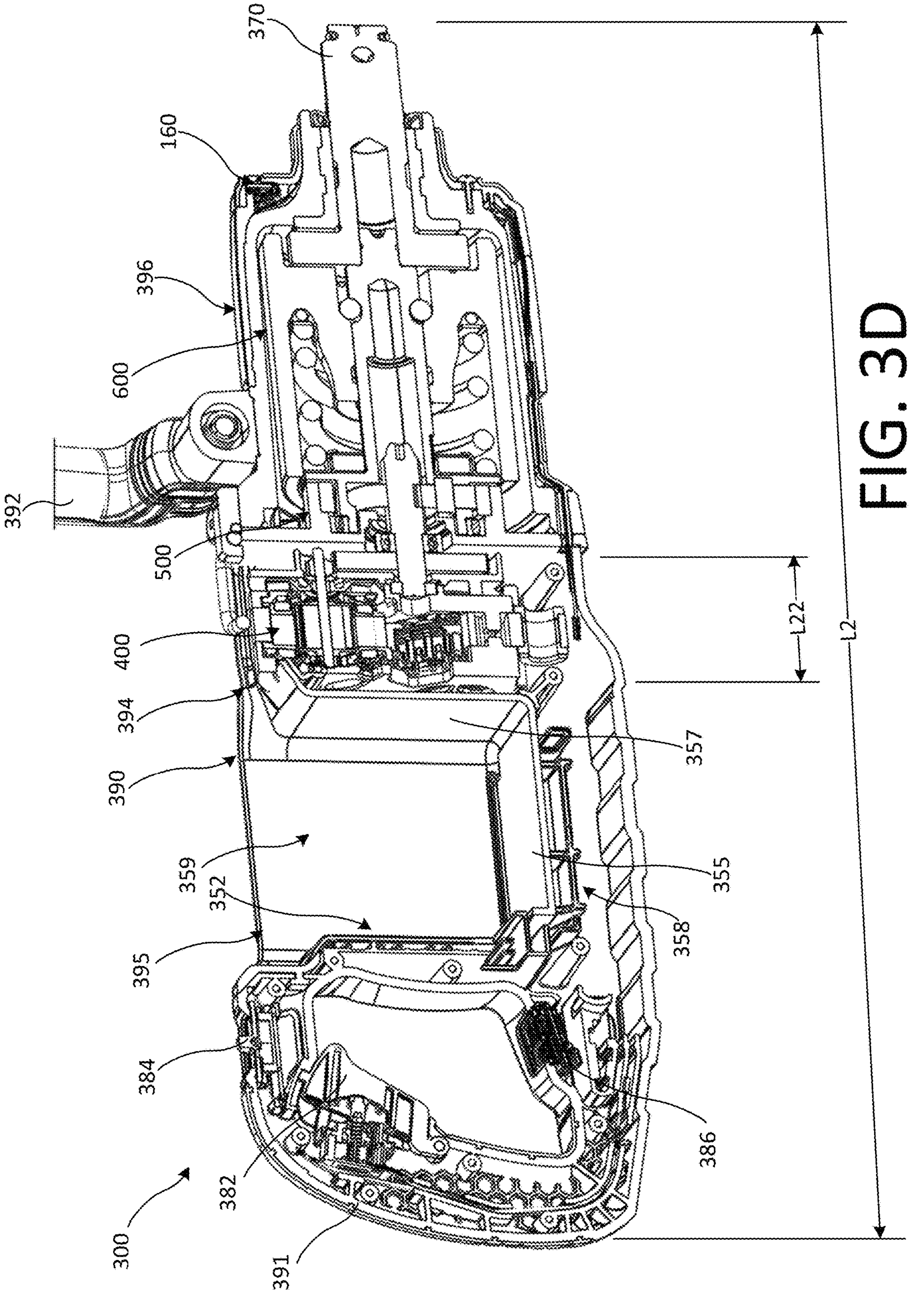
FIG. 3D is a cross-sectional view of the example rotary power-driven tool shown in FIGS. 3A-3C, taken along line D-D in FIG. 3C.

FIG. 3A is a perspective view of an example power-driven rotary impact tool 300, including a multi-motor drive unit. FIG. 3B is a perspective view of the example power-driven rotary impact tool 300 shown in FIG. 3A, with a portion of a housing removed, so that some of the internal components of the example impact tool 300 are visible. FIG. 3C is a top view of the example power-driven rotary impact tool 300 shown in FIGS. 3A and 3B. FIG. 3D is a cross-sectional view, taken along line D-D of FIG. 3B.

The example impact tool 300 includes a tool housing 390 extending generally along the tool axis X, the tool axis X extending longitudinally along a length of the example impact tool 300, from a first end portion defining a rear end portion of the example impact tool 300 to a second end portion defining a front end portion of the example impact tool 300, or working end of the example impact tool 300. A plurality of components, such as, for example, a driving system including a motor, a transmission, and an impact mechanism are received in the tool housing 390. In some examples, the tool housing 390 includes a motor housing portion 394 in which components of a motor drive unit 400 of the example impact tool 300 are received. In some examples, the tool housing 390 includes a transmission and impact mechanism housing portion 396 in which components of a transmission 500 and components of an impact mechanism 600 of the example impact tool 300 are received.

In some examples, a first (or rear) handle portion 391 is positioned at the first end portion of the tool housing 390, and a second handle portion 392 is coupled to the transmission and impact mechanism housing portion 396. The first handle portion includes interface devices including, for example, a trigger 382 for operation of the example impact tool 300, a switch 384 providing for selection of forward or reverse operation, and a mode selector 386 providing for user selection of one of a plurality of modes of operation of the example impact tool 300. Features of the first handle portion 391, including various interface devices such as the trigger 382 and/or the switch 384 and/or the mode selector 386, are similar to those discussed above with respect to the first handle portion 191, the trigger 182, the switch 184, and the mode selector 186, and thus duplicative detailed description will be omitted. Similarly, features of the second handle portion 392, including the adjustment knob 398, may be similar to those discussed above with respect to the second handle portion 192 and the adjustment knob 198, and thus duplicative detailed description will be omitted. Similarly. In some examples, a cavity 359 defining a battery receptacle 395 is formed between the first handle portion 391 and the motor housing portion 394. A power source, such as the battery 150 described above, is removably receivable in the battery receptacle 395. Features of the battery receptacle 395 may be similar to those of the battery receptacle 195 described above, and thus duplicative detailed description will be omitted.

An output spindle 370 extends out through the second end portion, or forward end portion, or working end portion, of the tool housing 390, for coupling of an accessory device, such as, for example a socket, a socket driver, or other such accessory device, to the example impact tool 300. In some examples, a plurality of illuminators, including, for example, a lighting assembly 360 including a plurality of lights 361, similar to the lighting assembly 160 described above, are positioned on the tool housing 390, proximate the output spindle 370, to provide for illumination of a workpiece during operation of the example impact tool 300.

A control module 358 is positioned below the lower end portion of the battery receptacle 395, generally parallel to the tool axis X. The control module 358 provides for communication between the trigger 382, the switch 384, the mode selector 386, and the plurality of terminals 354/the battery 150, for operation of the motor drive unit 400, and corresponding operation of the example impact tool 300. Positioning of the control module 358 and the battery receptacle 395/plurality of terminals 354 of the terminal block 352/battery 150 in close proximity to the first handle portion 391 on which the trigger 382, switch 384, and mode selector 386 are located may simplify the wired connection of these elements in the tool housing 390 of the example impact tool 300. In the example arrangement shown in FIGS. 3A-3D, the example impact tool 300 has an overall length L2, in a longitudinal direction corresponding to the tool axis X. In the example shown in FIGS. 3A-3D, the motor drive unit 400 has an overall length L22, in the longitudinal direction corresponding to a motor drive unit output axis X1. In the example shown in FIGS. 3A-3D, the transmission 500 extends along a transmission axis X2. In the example shown in FIGS. 3A-3D, the impact mechanism 600 extends along an impact mechanism axis X3. In the example shown in FIGS. 3A-3D, the output spindle 370 extends along an output axis X4. In the example shown in FIGS. 3A-3D, the tool axis X, the motor drive unit output axis X1, the transmission axis X2, the impact mechanism axis X3, and the output axis X4 are all substantially aligned, such that the motor drive unit 400, the transmission 500, the impact mechanism 600, and the output spindle 37070 operate substantially coaxially about the tool axis X, simply for purposes of discussion and illustration. In some examples, the tool axis X, the motor drive unit output axis X1, the transmission axis X2, the impact mechanism axis X3, and the output axis X4 are not necessarily aligned for coaxial operation in this manner. In the example shown in FIGS. 3A-3D, the example impact tool 100 has an overall width W2, for example, taken at the motor housing portion 394, in a transverse direction corresponding to the transverse axis Z, the transverse axis Z extending in a width direction of the impact tool 300, and being substantially orthogonal to the tool axis X extending in a longitudinal direction of the impact tool 300.

Figure 4A:
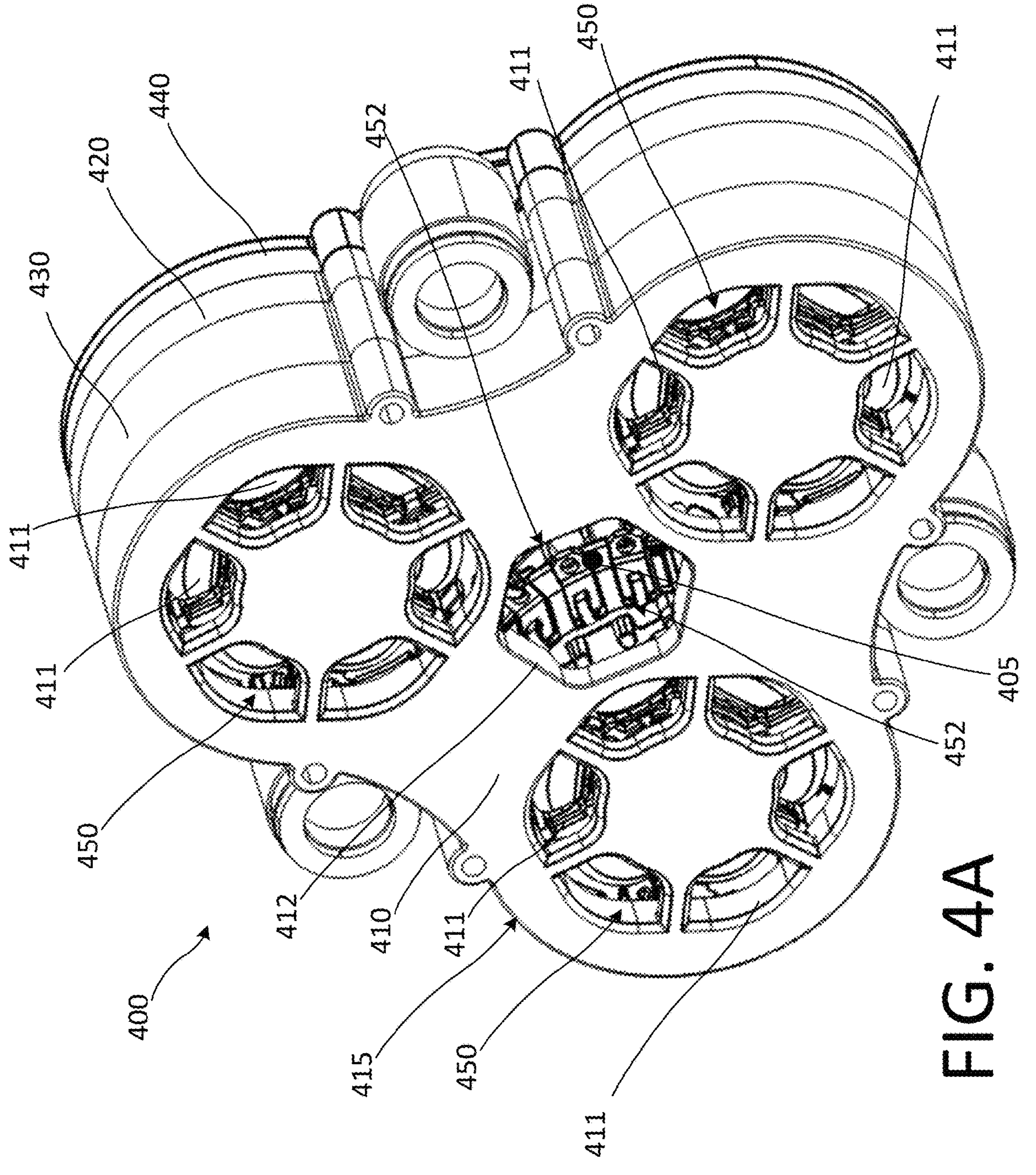
FIG. 4A is a perspective view of a motor drive unit of the example power-driven rotary impact tool shown in FIGS. 3A and 3B, from a first side of the motor drive unit.
Figure 4B:
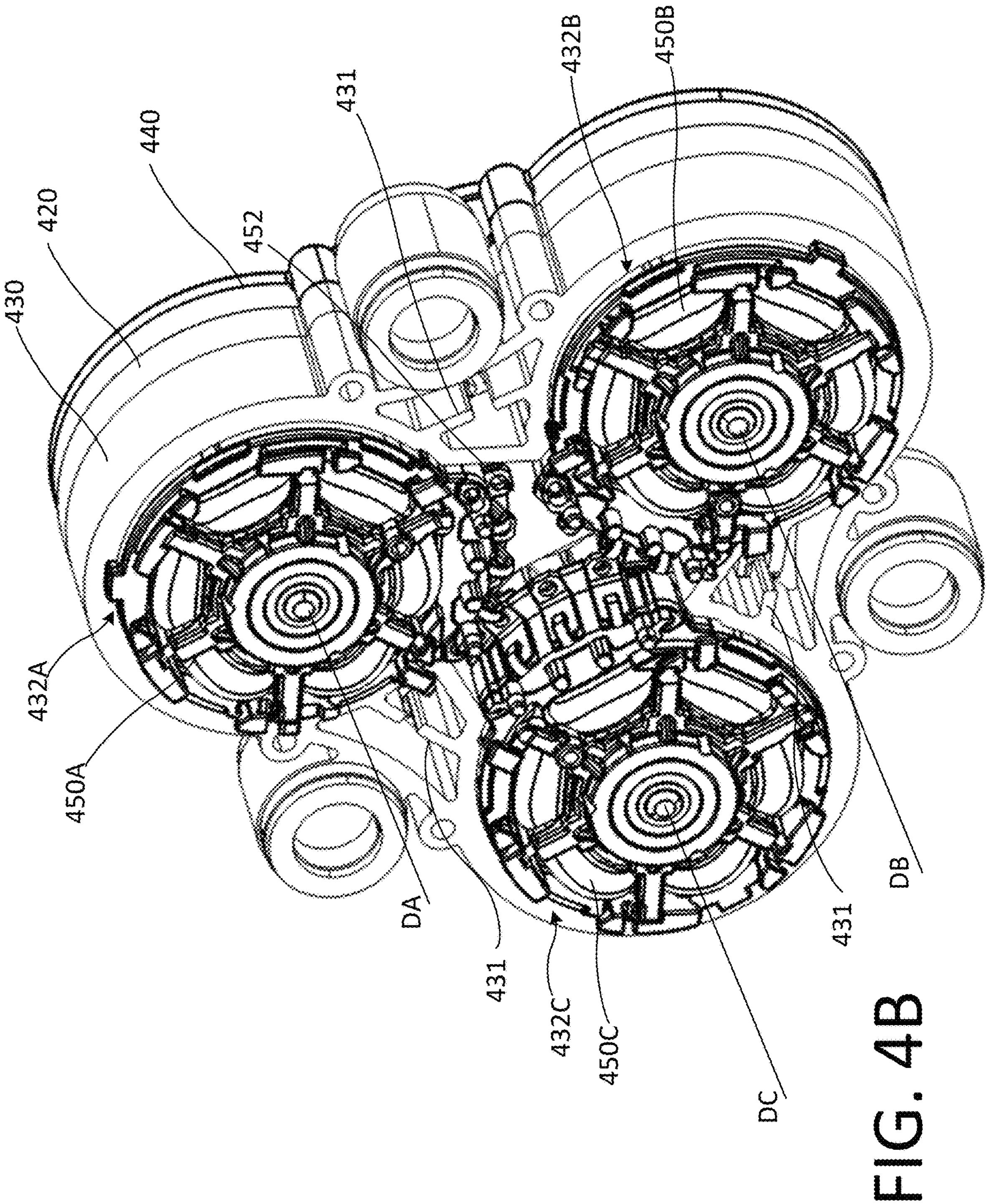
FIG. 4B is a second perspective view of the motor drive unit shown in FIG. 4A, with a first plate of the motor drive unit removed.
Figure 4D:
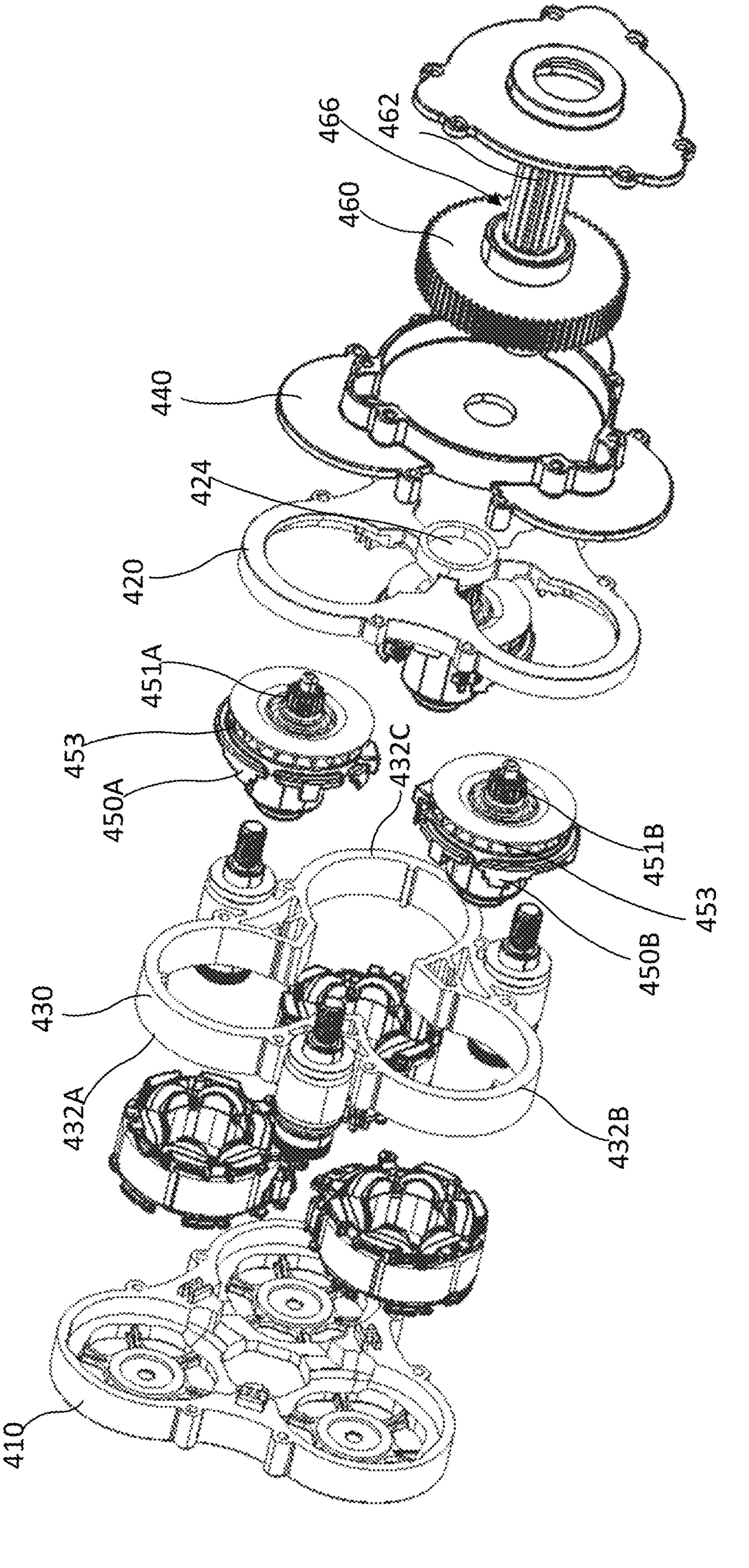
FIG. 4D is an exploded view of the motor drive unit shown in FIGS. 4A-4C(2).
Figure 4H:
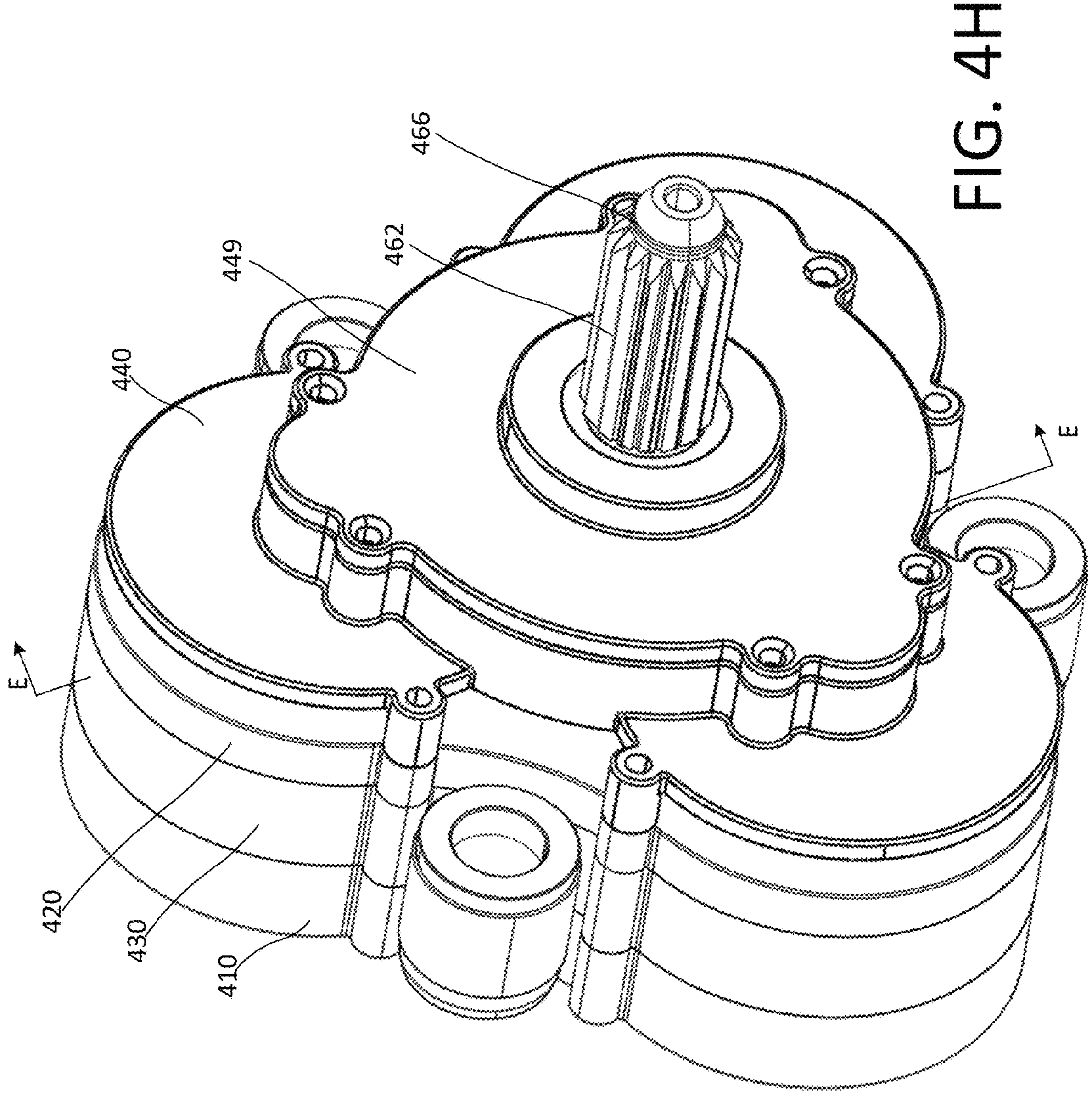
FIG. 4H is an assembled view of the motor drive unit shown in FIGS. 4A-4G(2), including the transmission cap coupled to the second side of the motor drive unit.
Figure 4I:
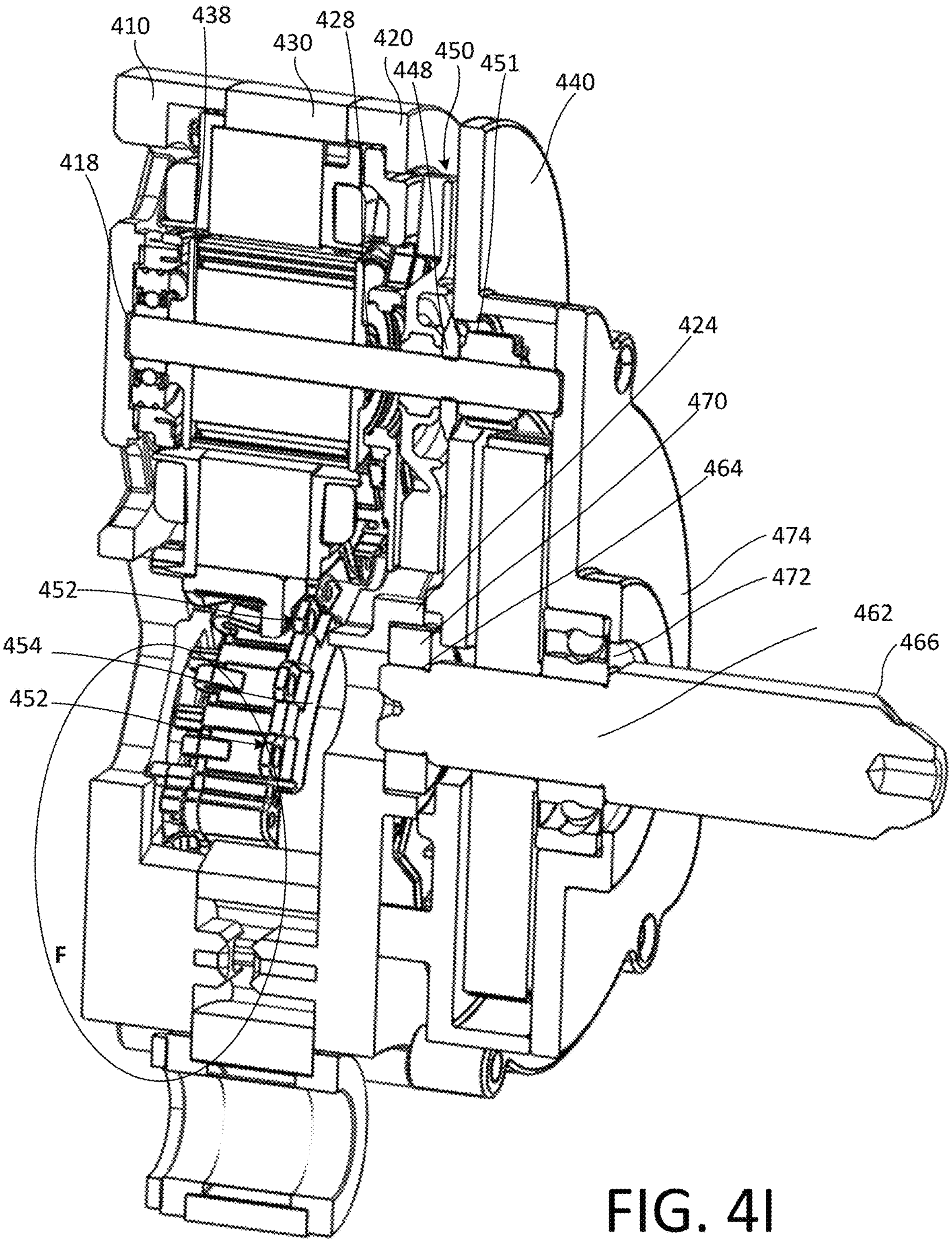
FIG. 4I is a cross-sectional view, taken along line E-E of FIG. 4H.
Figure 4J:
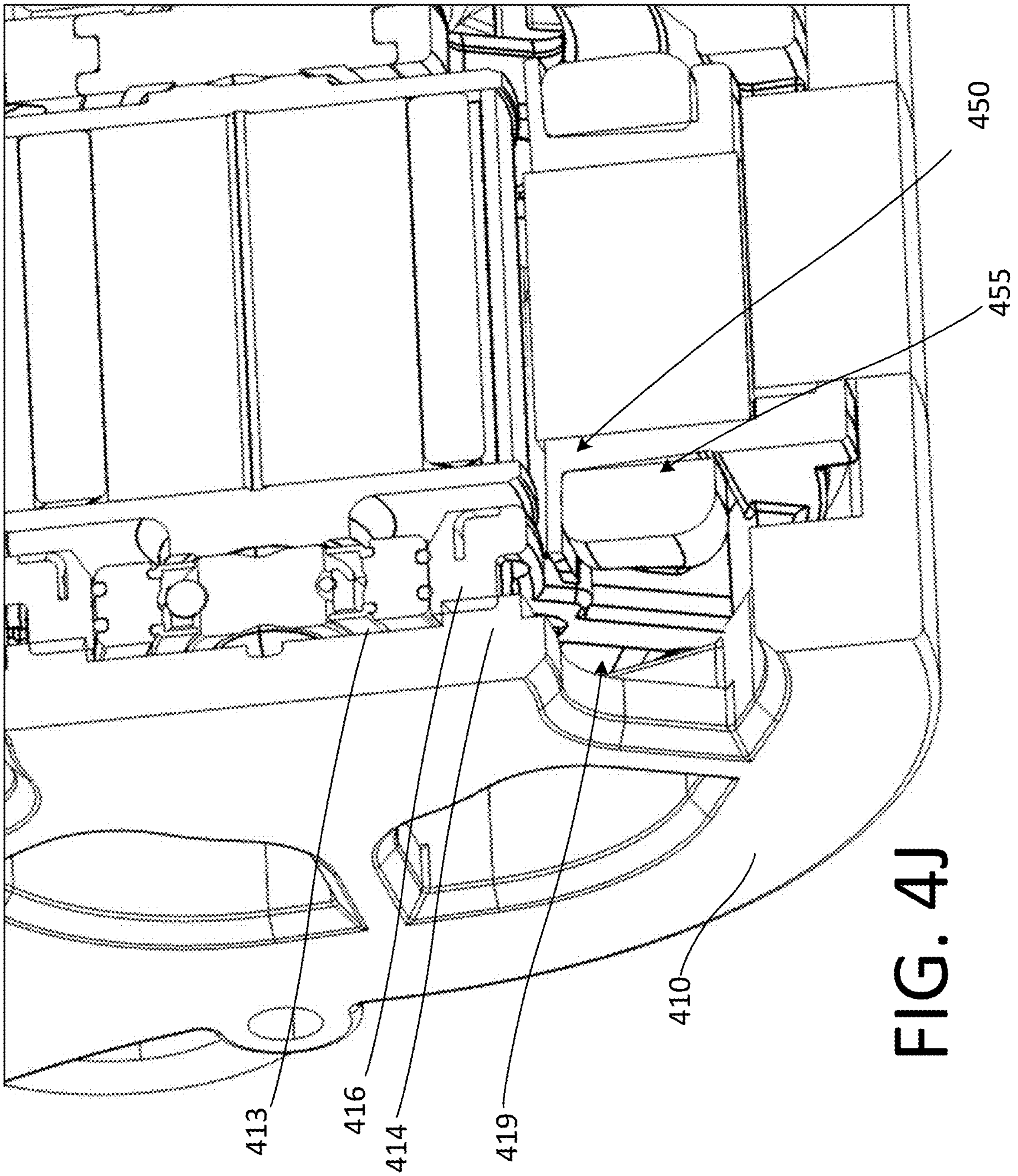
FIG. 4J is a close in view of an area F shown in FIG. 4I.

FIGS. 4A-4J illustrate features of the motor drive unit 400 received in the tool housing 390 of the example rotary impact tool 300 shown in FIGS. 3A and 3B. In particular, FIG. 4A is a perspective view of the motor drive unit 400, from a first side, or rear side of the motor drive unit 400. FIG. 4B is a perspective view of the motor drive unit 400 from the first side, or rear side of the motor drive unit 400, with a rear plate 410 of the motor drive unit 400 removed. FIG. 4C(1) is a plan view of the first side, or rear side of the motor drive unit 400, and FIG. 4C(2) is a plan view of the first side, or rear side, of the motor drive unit, with the rear plate 410 removed. FIG. 4D is an exploded view of the motor drive unit 400. FIG. 4E(1) is a perspective view of the motor drive unit 400, from a second side, or front side of the motor drive unit 400. FIG. 4E(2) is a perspective view from the second side of the motor drive unit 400, with a transmission cap 440 installed. FIG. 4F(1) is a perspective view from the second side, or front side, of the motor drive unit 400, illustrating output pinions 451 of the plurality of motors 450 of the motor drive unit 400 engaged with a master gear 460 of the motor drive unit 400. FIG. 4F(2) is a perspective view from the second side of the motor drive unit 400, illustrating the output pinions 451 and the master gear 460, with the transmission cap 440 installed on the motor drive unit 400. FIG. 4G is a partially exploded view, and FIG. 4H is an assembled view, of a transmission cap 440 on the second side, or front side, of the motor drive unit 400. FIG. 4I is a cross-sectional view, taken along line E-E of FIG. 4H. FIG. 4J is a close in view of an area F shown in FIG. 4I.

As described above, the motor drive unit 400 is received in the motor housing portion 394 of the tool housing 390. The motor drive unit 400 shown in FIGS. 4A-4J is a multi-motor drive unit, including a plurality of motors plurality of motors 450 configured to cooperatively drive an output shaft 462 via a master gear 460. Features of multi motor drive units including a plurality of motors may be similar to those described and shown in commonly owned U.S. patent application Ser. No. 18/647,665, filed on Apr. 26, 2024, entitled "Multi-Motor Drive System," the disclosure of which is incorporated herein by reference in its entirety. In some examples, each of the plurality of motors 450 may be a three-phase BLDC motor having a rotor assembly rotatably received within a stator assembly. In some examples, the rotor assembly includes a rotor shaft, a rotor lamination stack mounted on and rotatably attached to the rotor shaft, and front and rear bearings arranged to support and pilot the rotor shaft. In some examples, the front and rear bearings provide radial and/or axial support for the rotor shaft to securely position the rotor assembly within the stator assembly.

In some examples, the rotor lamination stack can include a series of flat laminations attached together via, for example, an interlock mechanical, an adhesive, an over-mold, and the like, that house or hold two or more permanent magnets therein. In some examples, the permanent magnets are surface mounted on the outer surface of the lamination stack or embedded therein. The permanent magnets may be, for example, a set of four permanent magnets that magnetically engage with the stator assembly during operation. Adjacent permanent magnets have opposite polarities such that the four permanent magnets have, for example, an N-S-N-S polar arrangement. In in some examples, the rotor permanent magnets may be made, fully or partially, of rare earth material to achieve maximum performance. In some examples, the permanent magnets may be made of less expensive ferrite materials. Due to construction and efficiency advantages of the motor drive unit 400 described herein, the plurality of motors 450 operating together are capable of outputting a total maximum power that is at least comparable to the power output by a conventional motor of a comparable size built with rare earth permanent magnets.

In some examples, the stator assembly includes a lamination stack having a center bore configured to receive the rotor assembly. In some examples, the stator lamination stack includes a plurality of stator teeth extending inwardly from the body of the lamination stack towards the center bore. The stator teeth define a plurality of slots therebetween. A plurality of stator windings are wound around the stator teeth. The stator windings may be coupled and configured in a variety of configurations, e.g., series-delta, series-wye, parallel-delta, or parallel-wye. The stator windings are electrically coupled to motor terminals mounted on the outer surface of the stator lamination stack via an insulating mount. The motor terminals may be coupled to a power switch inverter circuit on one end, and to the stator winding on the other end. The inverter circuit energizes the coil windings using a set commutation scheme. In some examples, three motor terminals are provided on each motor 450, to electrically power the three phases of the motor 450.

In some examples, front and end insulators may be provided on the end surfaces of the stator lamination stack to insulate the lamination stack from the stator windings. The end insulators may be shaped to be received at the two ends of the stator lamination stack. In some examples, each insulator includes a radial plane that mates with the end surfaces of the stator lamination stack, with the radial plane including teeth and slots corresponding to the stator teeth and stator slots. The radial plane may also include axial walls that penetrate inside the stator slots, so that the end insulators cover and insulate the ends of the stator teeth from the stator windings. In some examples, a fan is mounted on and rotatably attached to a distal end of the rotor shaft, with the rotor shaft fixed inside the rotor lamination stack. The fan rotates with the rotor shaft to cool the motor 450, particularly the stator assembly.

In some examples, each motor 450 includes bearing support members formed as motor caps disposed at and secured to the two ends of the stator assembly. The bearing support members provide structural support for the front and rear bearings relative to the stator assembly. In some examples, one or both of the bearing support members are piloted to stator slots and/or the end insulators.

As shown in FIGS. 4A-4J, the multi-motor drive unit 400 includes a plurality of motors 450, in particular an arrangement of three motors 450 (for example, a first motor 450A, a second motor 450B, and a third motor 450C), mounted within a motor mounting structure 415. The motor mounting structure 415 includes a first plate, or a rear plate 410 (at a side of the motor mounting structure 415 facing the battery receptacle 395), a second plate, or a front plate 420 (at a side of the motor mounting structure 415 facing the transmission 500), and an intermediate plate 430 coupled between the rear plate 410 and the front plate 420. Each motor 450 (for example, the first motor 450A, the second motor 450B, and the third motor 450C) is mounted in a corresponding opening 432 (for example, a first opening 432A, a second opening 432B, and a third opening 432C) in the intermediate plate 430. Each of the plurality of motors 450 is fixed in the respective opening 432, with rotor components rotatable about a respective axis of rotation. For example, the first motor 450A rotates about an axis of rotation DA, the second motor 450B rotates about an axis of rotation DB, and the third motor 450C rotates about an axis of rotation DC. In some examples, a fabrication method associated with the intermediate plate 430 may facilitate scaling of the intermediate plate 430, and of the motor drive unit 400, to accommodate different sizes of motors and/or numbers of motors and/or arrangements of motors. For example, in some implementations, the intermediate plate 430 is fabricated from extruded aluminum, to facilitate such scaling.

As shown in FIGS. 4C(1) and 4C(2), in some examples, each of the plurality of motors 450 includes a plurality of terminals, for example, three terminals 452, to electrically power the three phases of the respective motor 450. The plurality of motors 450 may be arranged such that terminals 452 of the plurality of motors 450 are oriented toward a center 405 of the intermediate plate 430 (in some examples, corresponding to an axial center of the motor drive unit 400). In particular, in the example arrangement shown in FIGS. 4C(1) and 4C(2), terminals 452A of the first motor 450A are positioned at an offset with respect to the center 405 of the intermediate plate 430, and at an offset with respect to the terminals 452B of the second motor 450B, and at an offset with respect to the terminals 452C of the third motor 450C. In this example arrangement, lines bifurcating each of the motors 450 (i.e., extending from a center of rotation of each motor 450 through a center of the three terminals 452 of the respective motor 450) do not intersect the center 405 of the intermediate plate 430. That is, the plurality of motors 450 are clocked, or rotated, allowing for staggering of the terminals 452 about the center 405 of the intermediate plate 430. This allows the plurality of motors 450 to be positioned closer together on the intermediate plate 430, resulting in a more compact arrangement of the plurality of motors 450. A cross-sectional area of the motor drive unit 400 may correspond to the area bound by an outer periphery 417 of the motor drive unit 400 shown in FIG. 4C(1). In some examples, the cross-sectional area defined by this outer periphery is between approximately 91 cm^2 and approximately 150 cm^2.

In some examples, the arrangement of the terminals 452 of the plurality of motors 450 about the center 405 of the intermediate plate 430 in this manner aligns the terminals 452 with an opening 412, for example a central opening, in the rear plate 410. This arrangement may facilitate a wiring connection into the motor drive unit 400 at a single point, through the opening 412 in the rear plate 410 and to the terminals 452. In some examples, the terminals 452 of the plurality of motors 450 are in communication with a printed circuit board (PCB) 454, allowing for wired connection between, for example, the terminal block 352 and/or the control module 358, into the PCB 454, and distribution of power to all of the motors 450. In some examples, the PCB 454, alone or together with the control module 358, functions as a motor control unit that is electrically connected to each of the plurality of motors 450. In some examples, the motor control unit includes a controller, a single a single gate driver that is electrically connected to the controller, and a single inverter circuit that is electrically connected the controller, the single gate driver, and the plurality of motors. In some examples, the controller is configured to receive positional information from a single set of position sensors positioned proximate a rotor of one of the plurality of motors 450, and to control the plurality of motors 450 using the single gate driver and the single inverter circuit. In some examples, the controller generates a set of common commutation drive signals, and the single inverter circuit synchronously drives the plurality of motors 450 using the set of common commutation drive signals.

In some examples, one or more indexing features 421 are formed on the front plate 420, for example, on an interior facing surface of the front plate 420, i.e., a side surface of the front plate 420 facing the intermediate plate 430 and the rear plate 410. In the example shown in FIGS. 4A-4D, the indexing features 421 have an H shape, simply for purposes of discussion and illustration. The principles described herein are applicable to indexing features having other shapes and/or forms and/or contours. Each of the indexing features 421 may be received in a corresponding recess 431 formed in the intermediate plate 430 and/or the rear plate 410, to interlock the front plate 420 with the intermediate plate 430 and/or the rear plate 410. Accordingly, in some examples, the shape and/or form and/or contour of the indexing features 421 may provide for interlocking of the front plate 420 with the intermediate plate 430 and the rear plate 410, and may retain a relative positioning of the front plate 420 with the intermediate plate 430 and the rear plate 410. This may, in turn, maintain a relative position of the plurality of motors 450 installed in the motor mounting structure 415. In some examples, fasteners (not shown) may extend through corresponding openings 448, 418, 438, 428 in the transmission cap 440, the front plate 420, the intermediate plate 430, and the rear plate 410, respectively (see FIG. 4I), to fix an axial position of the rear plate 410, the intermediate plate 430, and the front plate 420, once a rotational position is set through engagement of the indexing features 421 in the recesses.

In response to application of power to one or more of the plurality of motors 450, the plurality of motors 450 generate a rotational force, that is output by a pinion 451 of the respective motor of the plurality of motors 450. In particular, as shown in FIGS. 4E and 4F, operation of the first motor 450A causes corresponding rotation of a first pinion 451A. Operation of the second motor 450B causes corresponding rotation of a second pinion 451B. Operation of the third motor 450C causes corresponding rotation of a third pinion 451C. As shown in FIG. 4F (1), each of the pinions 451 is engaged with a master gear 460, such that the master gear 460 rotates in response to operation of at least one of the plurality of motors 450 and rotation of the corresponding pinion(s) 451. Accordingly, each of the pinions 451 rotates in response to application of power to the plurality of motors 450. Due to the engagement of the pinions 451 with the master gear 460, the master gear 460 rotates in response to rotation of the pinions 451, transferring an output torque to the transmission 500 via the output shaft 462. In this example arrangement of the pinions 451 and the master gear 460, a first speed reduction is achieved (and corresponding increase in torque), from the rotational speed output by the plurality of motors 450 to the rotational speed input to the transmission 500 via the output shaft 462.

As shown in FIGS. 4E and 4F, in some examples, a fan 453 is coupled to a rotor shaft of each of the plurality of motors 450, for example, at an outside of the front plate 420. In response to application of power to one or more of the plurality of motors 450 and corresponding rotation of the rotor shaft of the motor 450, the fans 453 rotate together with the rotor shaft (and the pinions 451). In some examples, the rear plate 410 includes a plurality of openings 411. In some examples, the plurality of openings 411 are positioned radially outward from the central opening 412, at positions corresponding to the plurality of motors 450. In some examples, the plurality of openings 411 may function as air intakes that guide air into the plurality of motors 450. Rotation of the fans 453 may draw air in through the plurality of openings 411 in the rear plate 410, and axially through the plurality of motors 450, to provide for cooling of the plurality of motors 450.

In some examples, a power to mass ratio of the motor drive unit 400 is between approximately 3.0 W/g to approximately 10.0 W/g. In some examples a magnetic interface boundary to cross-sectional area ratio of the motor drive unit 400 is between approximately 1.5 mm/cm2 to approximately 3.0 mm/cm2. In some examples, the magnetic interface boundary of the motor drive unit 400 is a sum of an electro-magnetic boundary of each of the plurality of motors 450. In some examples, a power to volume ratio of the motor drive unit 400 is between approximately 5.0 W/cm3 to approximately 25.0 W/cm3.

In some examples, a coupling portion 464 is formed on a first side of the master gear 460, facing the front plate 420, and received in a bearing pocket 424 formed on the front plate 420 (see FIG. 4I). In some examples, a transmission bearing 470 is positioned between the coupling portion 464 of the master gear 460 and an inner peripheral surface of the bearing pocket 424, supporting the master gear 460 with the integrally formed output shaft 462 relative to the front plate 420. An output shaft 462 is coupled to a second side of the master gear 460, opposite the first side at which the coupling portion 464 is formed, such that the output shaft 462 rotates together with the master gear 460 in response to rotation of one or more of the pinions 451. In some examples, the output shaft 462 is integrally formed with the master gear 460. In some examples, the output shaft 462 is otherwise fixedly coupled to the master gear 460. In some examples, an end portion of the output shaft 462 defines a sun gear 466 of the transmission 500 to which the motor drive unit 400 is operably coupled. The output shaft 462 extends out through a central opening formed in a transmission cap 440 positioned on the front plate 420. In some examples, an outer bearing 472 is received within a bearing retainer 474 on an end cap 449 of the transmission cap 440, supporting the master gear 460 and the integrally formed output shaft 462.

As shown in FIGS. 4E and 4F, the front plate is disposed between the intermediate plate and the master gear. In some examples, the front plate includes a set of outwardly-projecting arms extending at least partially between the fans 453 of the plurality of motors 450 to redirect the airflow expelled from the fans 453 along in a generally radial direction. In some examples, the front plate generates a circumferential exhaust path extending around the multi-motor drive unit 400. In some examples, the intermediate plate includes a plurality of arms in spaces between adjacent motors of the plurality of motors 450, each of the plurality of arms being in contact with at least a portion of one of the plurality of motors 450. In some examples, a sleeve to surrounds each of the plurality of motors 450. In some examples, the sleeve includes a thermally conductive material to remove heat from the plurality of motors 450. In some examples, the sleeve includes a plurality of arms positioned in spaces formed between adjacent motors of the plurality of motors 450, with each of the plurality of arms engaging at least a portion of one of the plurality of motors 450 to radially align and secure the plurality of motors 450.

As shown in FIGS. 4G(1) and 4H, the transmission cap 440 is positioned on the front plate 420, enclosing the pinions 451 and the master gear 460. Deflection bearings 442 are positioned corresponding to the pinions 451, at an outside of the master gear 460, within a periphery of the transmission cap 440. In some examples, the deflection bearings 442 maintain a position of the master gear 460 relative to the pinions 451, and axially retain the master gear 460. In some examples, a peripheral contour of the transmission cap 440 corresponds to a peripheral contour of the master gear 460, the pinions 451, and the deflection bearings 442. An end cap 449 is positioned on an axial end portion of the transmission cap 440, enclosing the master gear, the pinions 451, and the deflection bearings 442 defining a transmission portion of the motor drive unit 400. A cross-sectional area of the transmission portion of the motor drive unit 400 may correspond to the area bound by an outer periphery 447 of the end cap 449 shown in FIG. 4G(2). In some examples, the cross-sectional area defined by this outer periphery is between approximately 85 cm^2 and approximately 150 cm^2.

As shown in FIG. 4J, in some examples, the rear plate 410 includes a protrusion 414 formed on an interior facing side 413 of the rear plate 410. In some examples, the protrusion 414 integrally formed with the rear plate 410. In some examples, the protrusion 414 is coupled to the rear plate 410. In some examples, the protrusion 414 is molded onto, or over-molded on, the rear plate 410. In some examples, the protrusion 414 is a compliant member. In some examples, the protrusion 414 abuts a bearing support structure 416 that is fixed to a stator 455 of the motor 450 shown in FIG. 4J, at a position that is radially inward from the stator 455. Positioning of the protrusion 414 abutting the bearing support structure 416 axially restrains a position of the plurality of motor 450 in the motor mounting structure 415. Positioning of the protrusion 414 abutting the bearing support structure 416 forms and maintains a gap area 419 between the stator 455 and the interior facing side 413 of the rear plate 410, in which wiring may be accommodated. Positioning of the protrusion 414 abutting the bearing support structure 416 in this manner, particularly in a configuration in which the protrusion 414 is a compliant member, may allow the protrusion 414 to account for, or absorb, manufacturing tolerances associated with the components of the motor drive unit 400.

In some examples, an overall size, or profile of the example rotary impact tool 300 incorporating the multi-motor drive unit 400 including the plurality of motors 450 may be smaller than a rotary impact tool incorporating a single motor and outputting a similar amount of fastening torque and/or breakaway torque. In some examples, the overall size, or profile of the example rotary impact tool 300 incorporating the multi-motor drive unit 400 including the plurality of motors 450 may be smaller than a rotary impact tool incorporating a single motor, while outputting a greater amount of fastening torque and/or a greater amount of breakaway torque. For example, the axial length L22 of the multi-motor drive unit 400 of the example impact tool 300 may be less than the axial length L11 of the motor drive unit 200 of the example impact tool 100. Similarly, the overall axial length L2 of the impact tool 300 may be less than the overall axial length L1 of the example impact tool 100, and/or the transverse width W2 of the impact tool 300 may be less than the transverse width W1 of the example impact tool 100, while outputting similar levels of fastening torque and/or breakaway torque. In some examples, the overall axial length L2 and/or transverse width W2 of the impact tool 300 may be less than the overall axial length L1 and/or transverse width W1 of the example impact tool 100, with the example impact tool 300 outputting greater levels of fastening torque and/or breakaway torque. In some examples, the overall axial length L1 of the example impact tool 100 may be between approximately 500 mm and approximately 600 mm. In some examples, the axial length L11 of the motor drive unit 200 of the example impact tool 100 may be between approximately 100 mm and approximately 150 mm. In some examples, the transverse width W1 of the example impact tool 100 may be between approximately 100 mm and approximately 140 mm. In some examples, the overall axial length L2 of the example impact tool 300 may be between approximately 400 mm and approximately 550 mm. In some examples, the axial length L22 of the motor drive unit 400 of the example impact tool 300 may be between approximately 50 mm and approximately 100 mm. In some examples, the transverse width W2 of the example impact tool 300 may be between approximately 100 mm and approximately 140 mm. In some examples, the motor drive unit 400 may be controlled so that only some of the plurality of motors 450 operate, while remaining motors 450 are in a standby mode, to provide a greater variation in an amount of fastening torque an/or breakaway torque that is produced by the example impact tool 300.

Figure 5A:
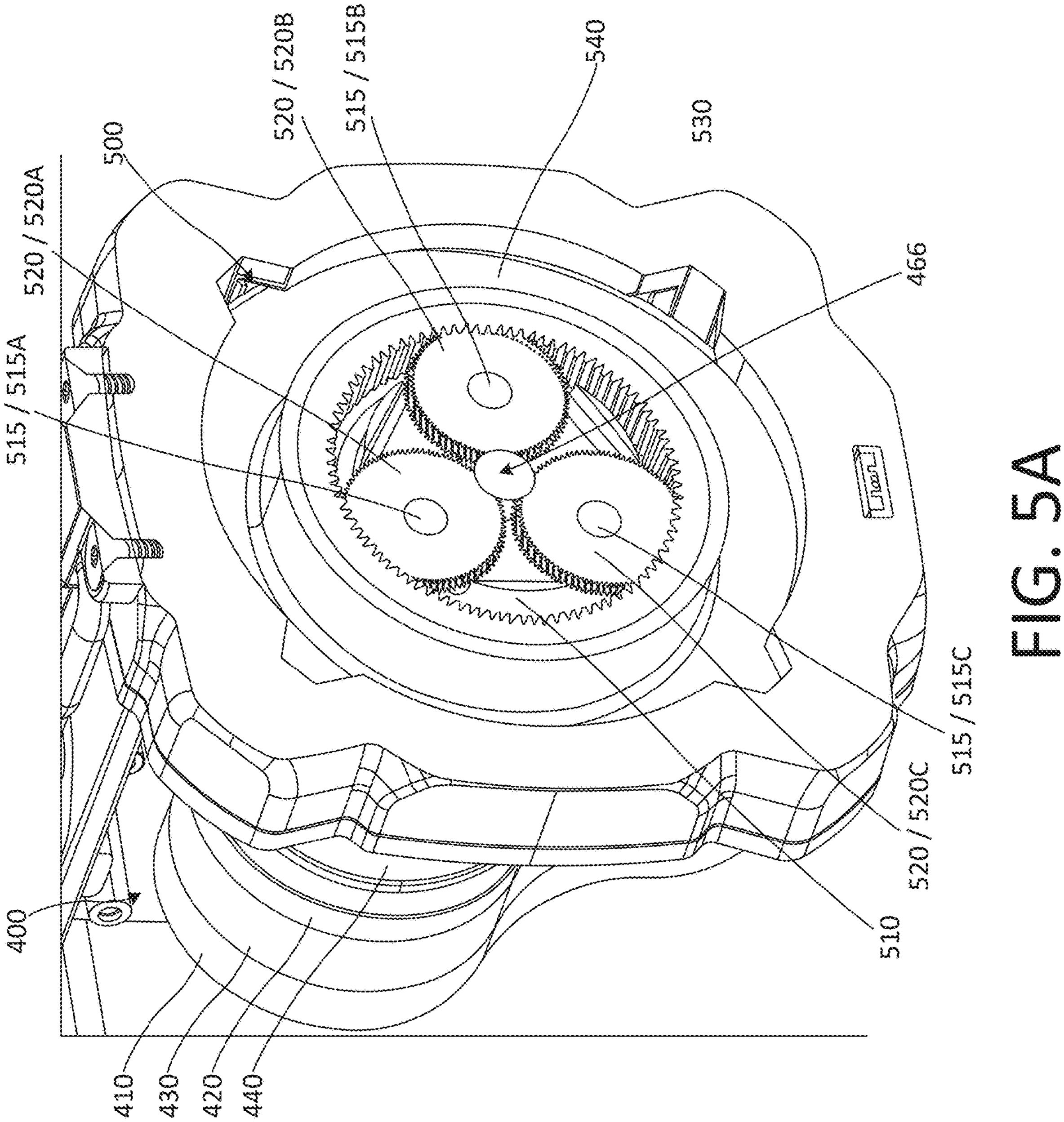
FIG. 5A is a perspective view illustrating components of a transmission of the example power-driven impact tool shown in FIGS. 3A-3D.
Figure 5B:
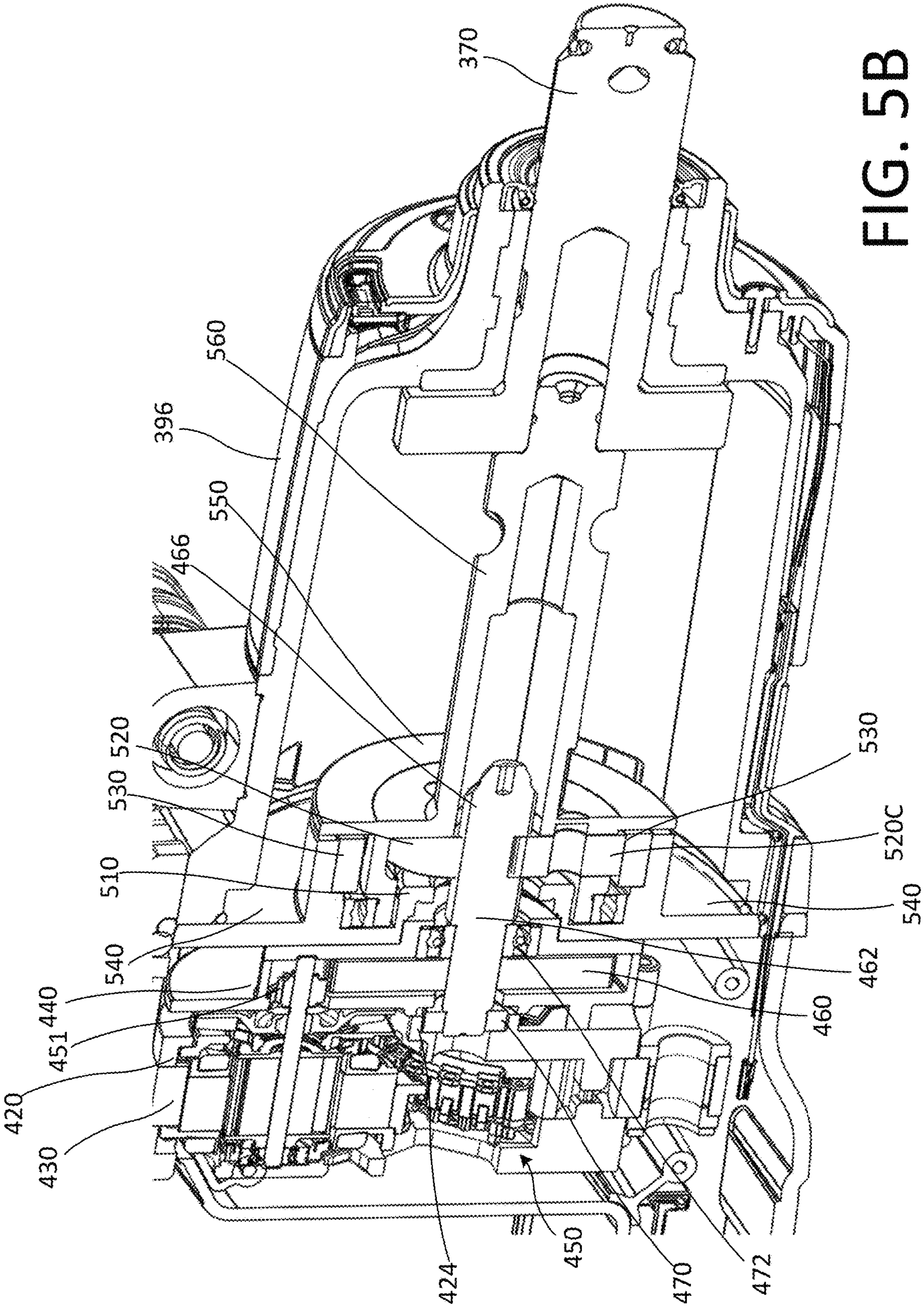
FIG. 5B is a partial cross-sectional view of the components of the transmission shown in FIG. 5A.

FIG. 5A is a perspective view illustrating components of the transmission 500 of the example impact tool 300, coupled to an output of the multi-motor drive unit 400 shown in FIGS. 4A-4J. FIG. 5B is a partial cross-sectional view of the components of the transmission 500 coupled to the multi-motor drive unit 400 shown in FIGS. 4A-4J.

In the example shown in FIGS. 5A and 5B, the transmission 500 is a planetary transmission including a plurality of planet gears 520 in meshed engagement with the sun gear 466 formed on the end portion of the output shaft 462 integrally formed with the master gear 460 of the motor drive unit 400. In this example, the plurality of planet gears 520 includes a first planet gear 520A, a second planet gear 520B, and a third planet gear 520C, simply for purposes of discussion and illustration. Each of the plurality of planet gears 520 is mounted on a corresponding pin 515 (for example, a first pin 515A, a second pin 515B, and a third pin 515C), in a planet carrier. The planet carrier includes a first carrier plate 510 and a second carrier plate 550, with the plurality of planet gears 520 mounted on the pins 515 between the first and second carrier plates 510, 550 defining the planet carrier. A cam shaft 560 is coupled to and extends axially from the second carrier plate 550. In some examples, the cam shaft 560 is integrally formed with the second carrier plate 550. A distal end of the master gear 460 has a reduced diameter, and is received in an opening in the output spindle 370, to transfer an output torque to the output spindle 370. The plurality of planet gears 520 are in meshed engagement with the sun gear 466 at a center of the plurality of planet gears 520, and also with a ring gear 530 at a periphery of the plurality of planet gears 520. The ring gear 530 is mounted on, for example fixedly coupled to, a ring gear mount 540, which is in turn fixed to the transmission and impact mechanism housing portion 396 of the tool housing 390.

In this example arrangement, in response to an application of power to the plurality of motors 450 of the motor drive unit 400, the pinions 451 rotate, thus rotating the master gear 460 and the integrally formed output shaft 462 and the sun gear 466 formed at the end portion thereof. The plurality of planet gears 520, in meshed engagement with the sun gear 466 and the ring gear 530 as described above, rotate in response to rotation of the sun gear 466. The second carrier plate 550 and cam shaft 560 rotate in response to rotation of the plurality of planet gears 520 coupled to the second carrier plate 550. Rotation of the cam shaft 560 in turn causes rotation of the output spindle 370, to output a rotary torque.

As described above, the interaction of the output pinions 451 of the plurality of motors 450 with the master gear 460 of the motor drive unit 400 produces a first speed reduction (from the input at the plurality of motors 450 to the output at the output shaft 462/sun gear 466), and a corresponding increase in output torque. In some examples, the first speed reduction is between approximately 1:1 and approximately 8:1. The planetary transmission 500 including the arrangement of the plurality of planet gears 520 as described above produces a second speed reduction (from the input at the sun gear 466 to the output at the cam shaft 560), and a corresponding increase in output torque. In some examples, the second speed reduction is between approximately 3:1 and approximately 13:1.

Figure 6:
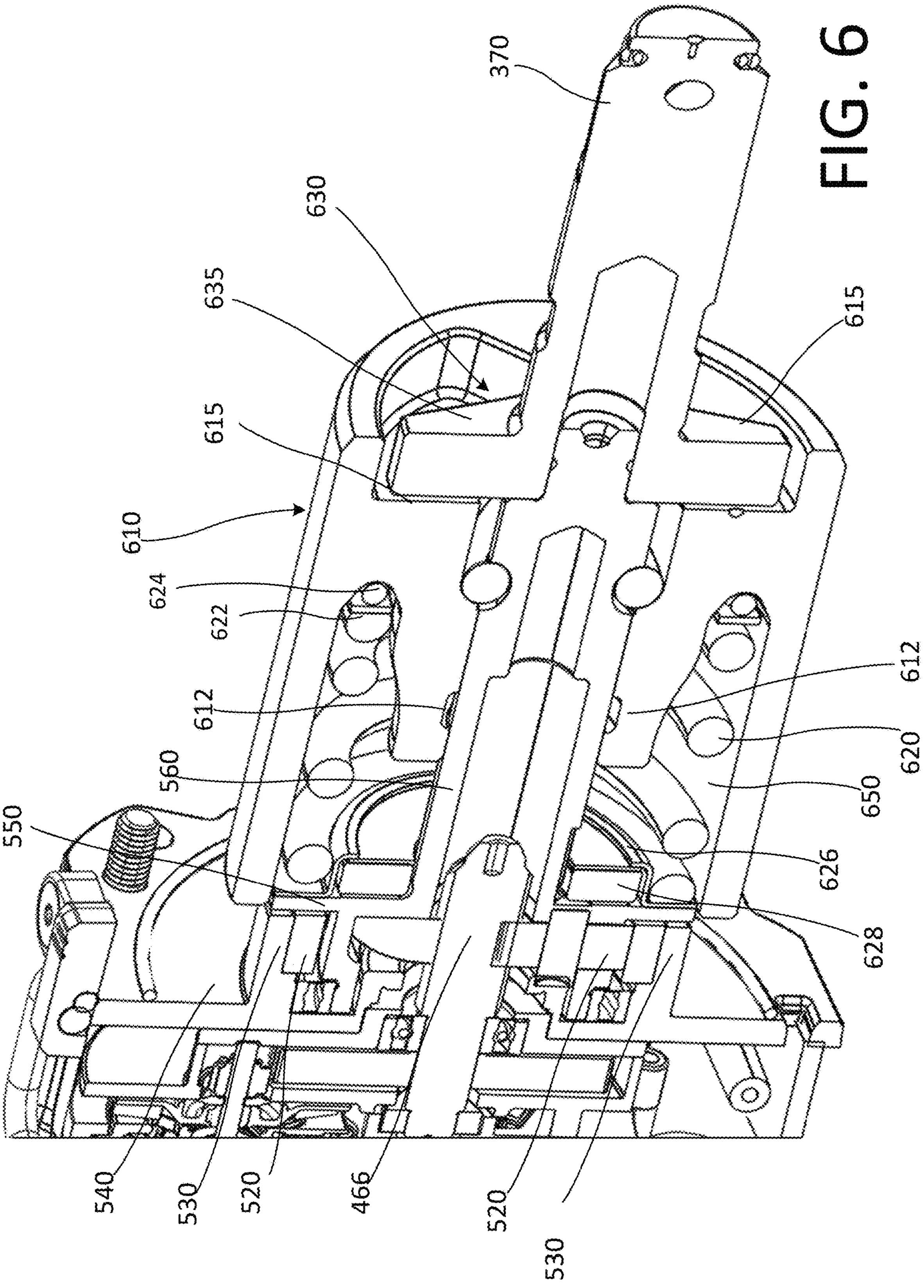
FIG. 6 is a partial cross-sectional view, illustrating components of an example impact mechanism of the of the example power-driven impact tool shown in FIGS. 3A-3D.

FIG. 6 is a partial cross-sectional view, illustrating features of an example impact mechanism 600 of the example impact tool 300, coupled to the example transmission 500 described above. As shown in FIG. 6 and as described above, the cam shaft 560 extends axially forward from the carrier plate 550 and rotates together with the carrier plate 550, at a reduced rotational rate relative to the sun gear 466, in response to rotation of the planet gear(s) 520 about the sun gear 466. Thus, the transmission 500 transmits input power from the motor drive unit 400 to the cam shaft 560 at a reduced speed relative to the rotational speed of the output shaft 462 of the motor drive unit 400.

The example impact mechanism 600 includes a substantially cylindrical hammer 610 received over the cam shaft 560. The cylindrical hammer 610 is configured to move rotationally and axially relative to the cam shaft 560. As noted above, a front end portion of the cam shaft 560 has a reduced diameter, so as to be received in, and fixedly coupled in, an axial opening in the output spindle 370, such that the output spindle 370 rotates together with the cam shaft 560. An anvil 630, including two radially extending anvil projections 635, is fixedly coupled to a rear end portion of the output spindle 370. The hammer 610 includes two hammer projections 615 at a front end portion thereof that lie in the same rotational plane as the anvil projections 635, such that each hammer projection 615 may engage a corresponding anvil projection 635 in a rotating direction.

A pair of rear-facing V-shaped cam grooves (not shown) are formed on an outer wall of the cam shaft 560, with open end portions thereof facing toward the first end portion, or rear end portion, of the tool housing 390. A corresponding pair of forward-facing V-shaped cam grooves 612 is formed on an interior wall of the hammer 610, with open end portions thereof facing toward the second end portion, or front end portion, of the tool housing 390. One or more balls (not shown) are received in and ride along each of the cam grooves to couple the hammer 610 to the cam shaft 560.

A compression spring 620 is received in a cylindrical recess 650 in the hammer 610 and abuts a forward face of the second carrier plate 550. In some examples, a front end portion of the spring 620 rests against a washer 622 and bearing 624 disposed within the recess 650. In some examples, a rear end portion of the spring 620 is coupled to an annular spring mounting plate 626. In some examples, a spacer 628 may be positioned between the mounting plate 626 and a forward face of the transmission 500 to prevent the spring 620 from resting against the second carrier plate 550. In some examples, the spacer 628 is partially nested in an annular portion of the mounting plate 626. In some examples, the spacer 628 enables the spring 620 to be of a larger diameter than the second carrier plate 550, allowing, for example, a greater compression force to be exerted on the hammer 610, which in turn generates a higher impact force on the anvil 630. The spring 620 biases the hammer 610 toward the anvil 630 so that the hammer projections 615 engage the corresponding anvil projections 635.

Figure 7A:
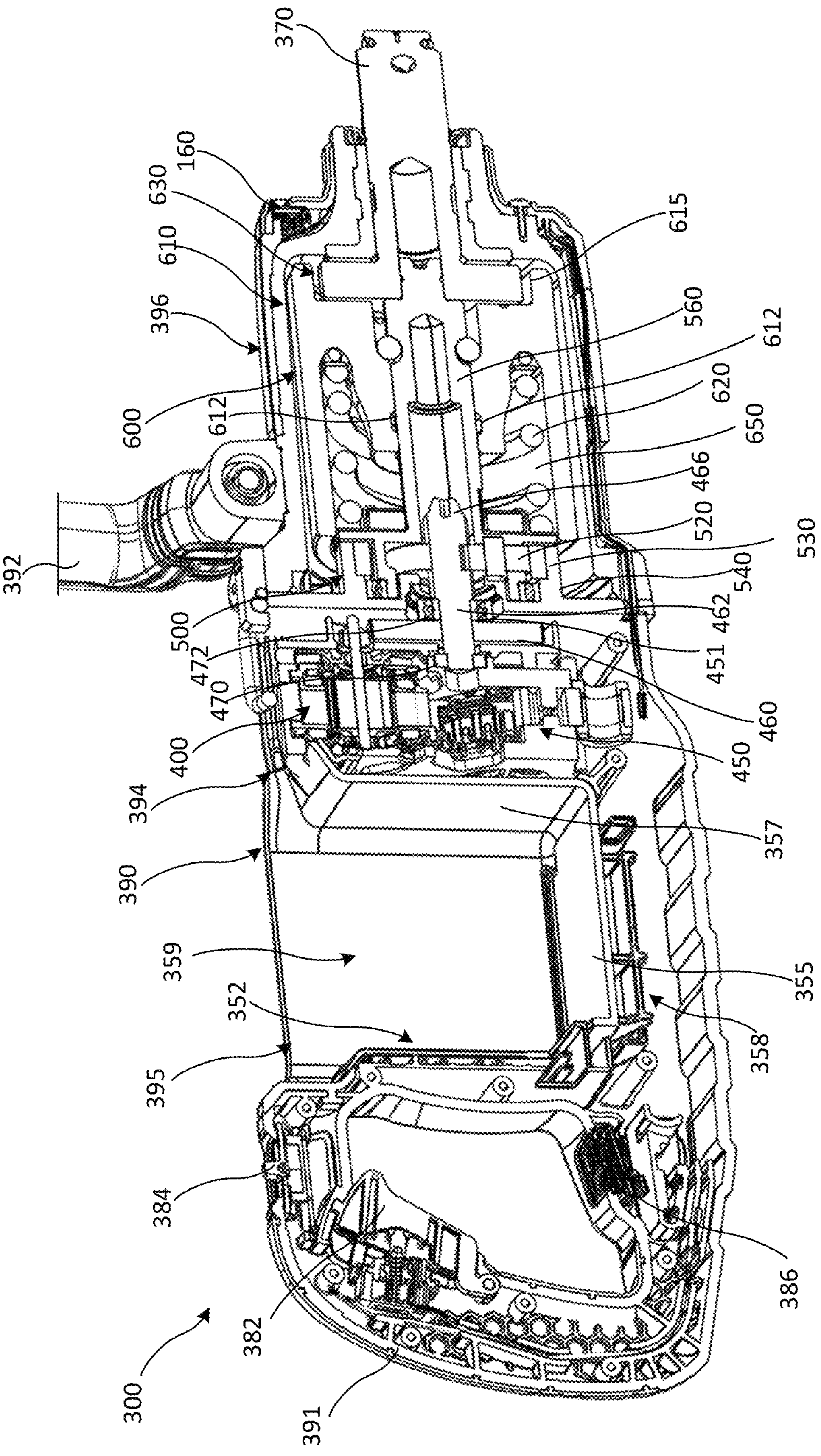
FIG. 7A is a cross-sectional view of the example rotary power-driven tool shown in FIGS. 3A-3C, taken along line D-D of FIG. 3B, illustrating interaction of components of the example motor drive unit shown in FIGS. 4A-4J, the example transmission shown in FIGS. 5A and 5B, and the example rotary impact mechanism shown in FIG. 6.
Figure 7B:
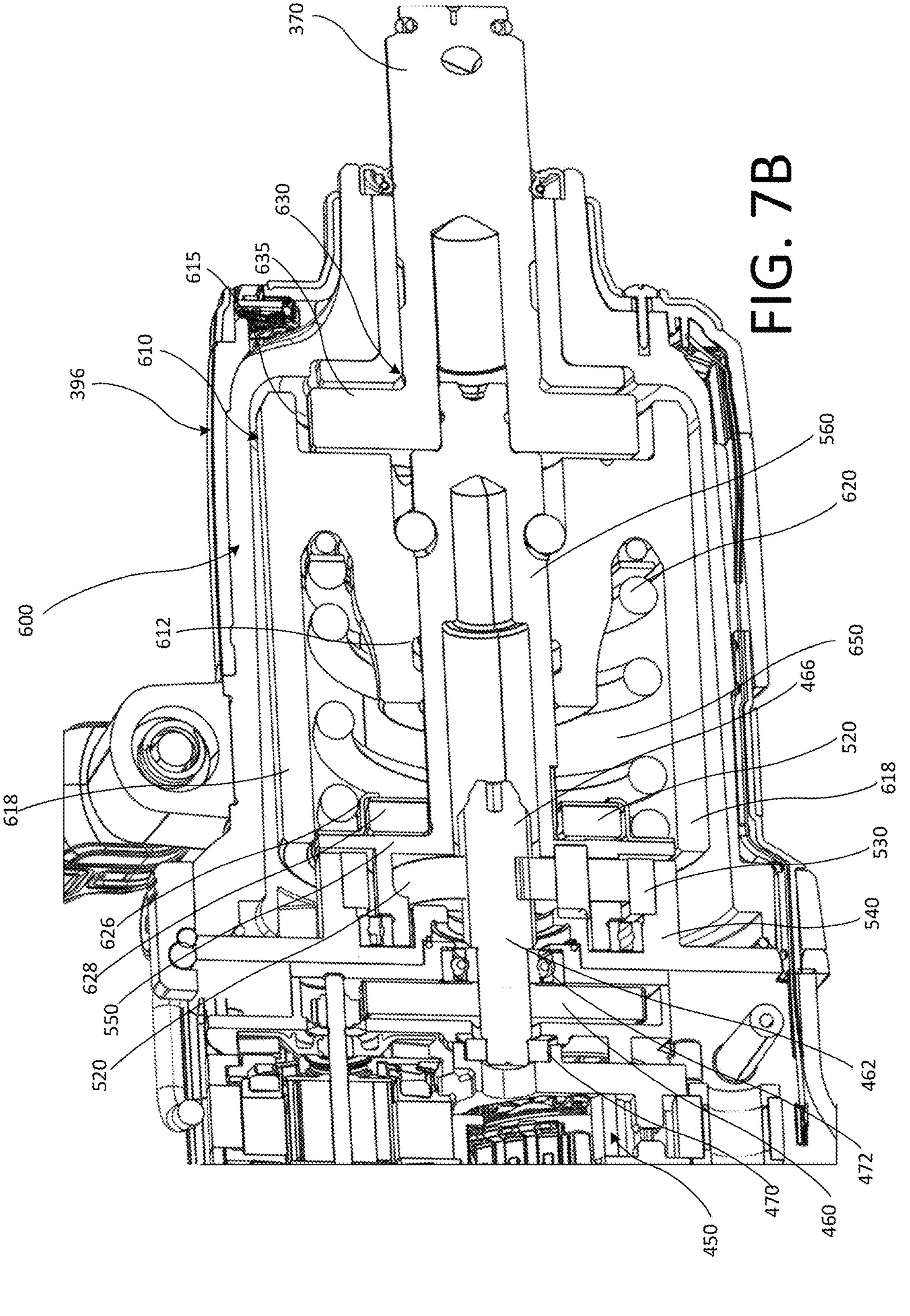
FIG. 7B is a partial cross-sectional view, illustrating the example rotary impact mechanism in a first state.
Figure 7C:
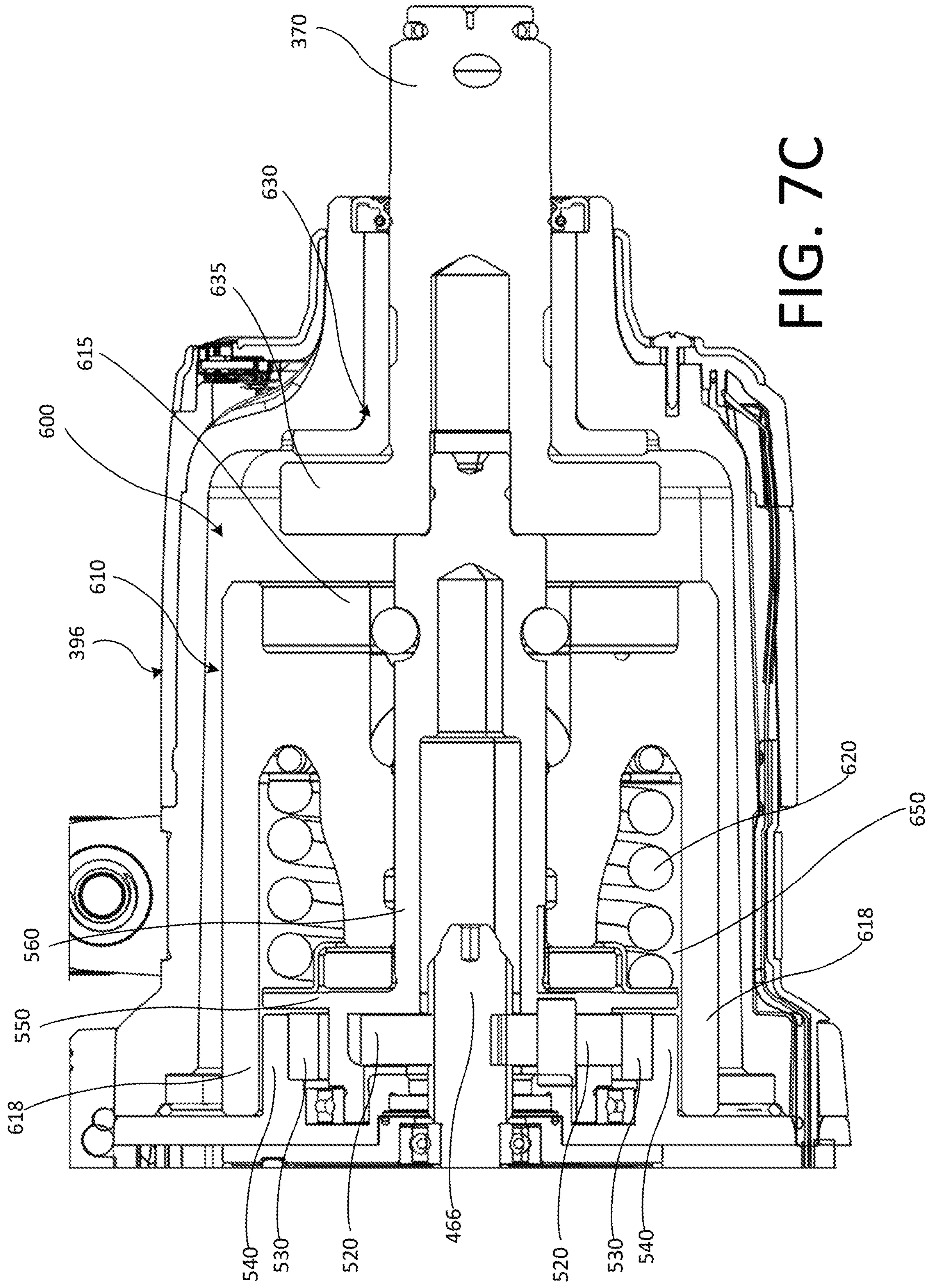
FIG. 7C is a partial cross-sectional view, illustrating the example rotary impact mechanism in a second state.

FIG. 7A is a cross-sectional view of the impact tool 300, taken along line D-D of FIG. 3B, illustrating all of the components of the multi-motor drive unit 400, the transmission 500, and the impact mechanism 600 of the example impact tool 300. FIG. 7B is a partial cross-sectional view, illustrating the components of the transmission 500 and the impact mechanism 600 in a first state, in which the hammer 610 is in a substantially fully forward position in the transmission and impact mechanism housing portion 396 of the tool housing 390. FIG. 7C is a partial cross-sectional view, illustrating the components of the transmission 500 and the impact mechanism 600 in a second state, in which the spring 620 is compressed and the hammer 610 is in a rearmost position in the transmission and impact mechanism housing portion 396 of the tool housing 390.

At relatively low torque levels, for example, a torque at the output spindle 370 that is less than or equal to a threshold torque value, the impact mechanism 600 transmits torque to the output spindle 370 in a continuous rotary mode. In the continuous rotary mode, the compression spring 620 maintains the hammer 610 in the forward position shown in FIG. 7B, so that the hammer projections 615 continuously engage the anvil projections 635. This causes the cam shaft 560, the hammer 610, the anvil 630, and the output spindle 370 to rotate together as a unit, so that the output spindle 370 has substantially the same rotational speed as the cam shaft 560.

As the torque increases, and reaches and/or exceeds a torque transition threshold, for example, a torque at the output spindle 370 that is greater than the threshold torque value, the impact mechanism 600 transmits torque to the output spindle 370 in an impact mode. In the impact mode, the hammer 610 moves axially rearward, against the force of the spring 620. This axially rearward movement of the hammer 610 decouples the hammer projections 615 from the anvil projections 635. Thus, the anvil 630 continues to spin freely on its axis without being driven by the motor drive unit 400 and the transmission 500, and coasts to a slightly slower speed. Meanwhile, the hammer 610 continues to be driven at a higher speed by the motor drive unit 400 and the transmission 500. As this occurs, the hammer 610 moves axially rearward relative to the anvil 630 due to the rearward movement of the balls in the V-shaped cam grooves 612, as shown in FIG. 7C. When the balls reach a rearmost position in the V-shaped cam grooves 612, the force of the spring 620 drives the hammer 610 axially forward with a rotational speed that exceeds the rotational speed of the anvil 630. This drives the hammer 610 back to the forwardmost position shown in FIG. 7B, with the hammer projections 615 rotationally aligned with the anvil projections 635, and causes the hammer projections 615 to rotationally strike the anvil projections 635, imparting a rotational impact to the output spindle 370. This impacting operation repeats, imparting intermittent rotational impacts on the output spindle 370, as long as the torque on the output spindle 370 continues to exceed the torque transition threshold.

In some examples, the impact tool 300 including the motor drive unit 400, the transmission 500, and the impact mechanism 600 as described above are configured to generate a fastening torque of greater than or equal to approximately 3600 ft-lbs within approximately 10 seconds of initiation of the application of rotational impacts on the anvil projections 635 by the hammer projections 615. In some examples, the impact tool 300 including the motor drive unit 400, the transmission 500, and the impact mechanism 600 as described above are configured to generate a fastening torque of greater than or equal to approximately 3600 ft-lbs within approximately 5 seconds of initiation of the application of rotational impacts on the anvil projections 635 by the hammer projections 615. In some examples, the impact tool 300 including the motor drive unit 400, the transmission 500, and the impact mechanism 600 as described above are configured to generate a breakaway torque of greater than or equal to approximately 3800 ft-lbs.

As noted above, the interaction of the pinions 451 (driven by the motors 450 of the motor drive unit 400) with the master gear 460 produces a first speed reduction (and corresponding increase in torque) for the speed going from the motor drive unit 400 into the transmission 500 (via the sun gear 466 at the end portion of the integral output shaft 462). Because the motor drive unit 400 generates a portion of the speed reduction typically needed for output of the desired rotary torque, an among of speed reduction provided by the transmission 500 can be less than typically needed. In some examples, this may allow for use of a smaller transmission, thus further reducing the overall size, or profile of the example impact tool 300. In some examples, this may allow for greater hammer mass incorporated into the hammer of the rotary impact mechanism 600, thus further increasing the output torque produced by the example impact tool 300.

For example, a reduction in size of the transmission 500 may result in a reduced overall diameter of the transmission 500. As shown in FIG. 7C, in the rearmost position of the hammer 610, this may allow peripheral end portions 618 of the hammer 610 to nest around a radially outermost portion of the ring gear 530, in a recess defined in the ring gear mount 540 (with the cam carrier including the first and second carrier plates 510, 550 positioned radially within the ring gear 530). In contrast, in a configuration relying on a larger transmission to provide a greater speed reduction, the peripheral end portions 618 of the hammer 610 would abut, or be axially forward of, the second carrier plate 550 in such an otherwise larger (i.e., larger diameter) transmission. This arrangement may provide for a reduction in overall length of the space occupied by the impact mechanism 600, and/or may allow additional hammer mass to be added to the hammer 610, to increase an impact force applied by the hammer 610.

In some examples, the axial length L22 of the multi-motor drive unit 400 is less than or equal to approximately 57.0 mm. In some examples, the axial length L22 of the multi-motor drive unit 400 is between approximately 57.0 mm and approximately 70.0 mm. In some examples, the transverse width W2 of the multi-motor drive unit 400 is less than or equal to approximately 65.0 mm. In some examples, the transverse width W2 of the multi-motor drive unit 400 is between approximately 65.0 mm and approximately 70.0 mm. In some examples, a ratio of fastening torque output by the impact tool 300 to an axial length of the multi-motor drive unit 400, the transmission 500, and the impact mechanism 600, is approximately 70 ft-lbs/mm.

In some examples, a moment of inertia of the impact mechanism 600, based on, for example, a geometry of the hammer 600, is between approximately 2600 kgmm^2 and approximately 4000 kgmm^2. In some examples, in which the spring 620 is coupled, for example, fixedly coupled, to the hammer 610, the moment of inertia of the impact mechanism 600 is between approximately 2800 kgmm^2 and approximately 4800 kgmm^2. In some examples, a volumetric displacement of the transmission 500 and impact mechanism 600, including, for example, the sun gear 466, the planet gears 520, the carrier plates 510, the ring gear 530, the spring 620, the hammer 610, the anvil 630, and the transmission and impact mechanism housing portion 396 is between approximately 400 cm^3 and approximately 1400 cm^3. In some examples, a ratio of an inertia (of the impact mechanism 600) to displacement volume (of the driving system and impact mechanism) is between approximately 0.75 kgmm^2/cm^3 and 1.5 kgmm^2/cm^3.

As noted above, in some examples, the example impact tool 100 and/or the example impact tool 300 may include a plurality of illuminators proximate the output spindle 170, 370 to provide for illumination of a workpiece during operation of the example impact tool. In some examples, the plurality of illuminators is provided as a lighting assembly 160 including a plurality of lights 161. In some examples, the plurality of lights are arranged along a periphery of the output spindle, to provide for illumination of the workpiece during operation. In some examples, one or more of the plurality of lights are light emitting diodes (LEDs) that can be collectively or selectively controlled to provide for illumination of the workpiece during operation.

Figure 8A:
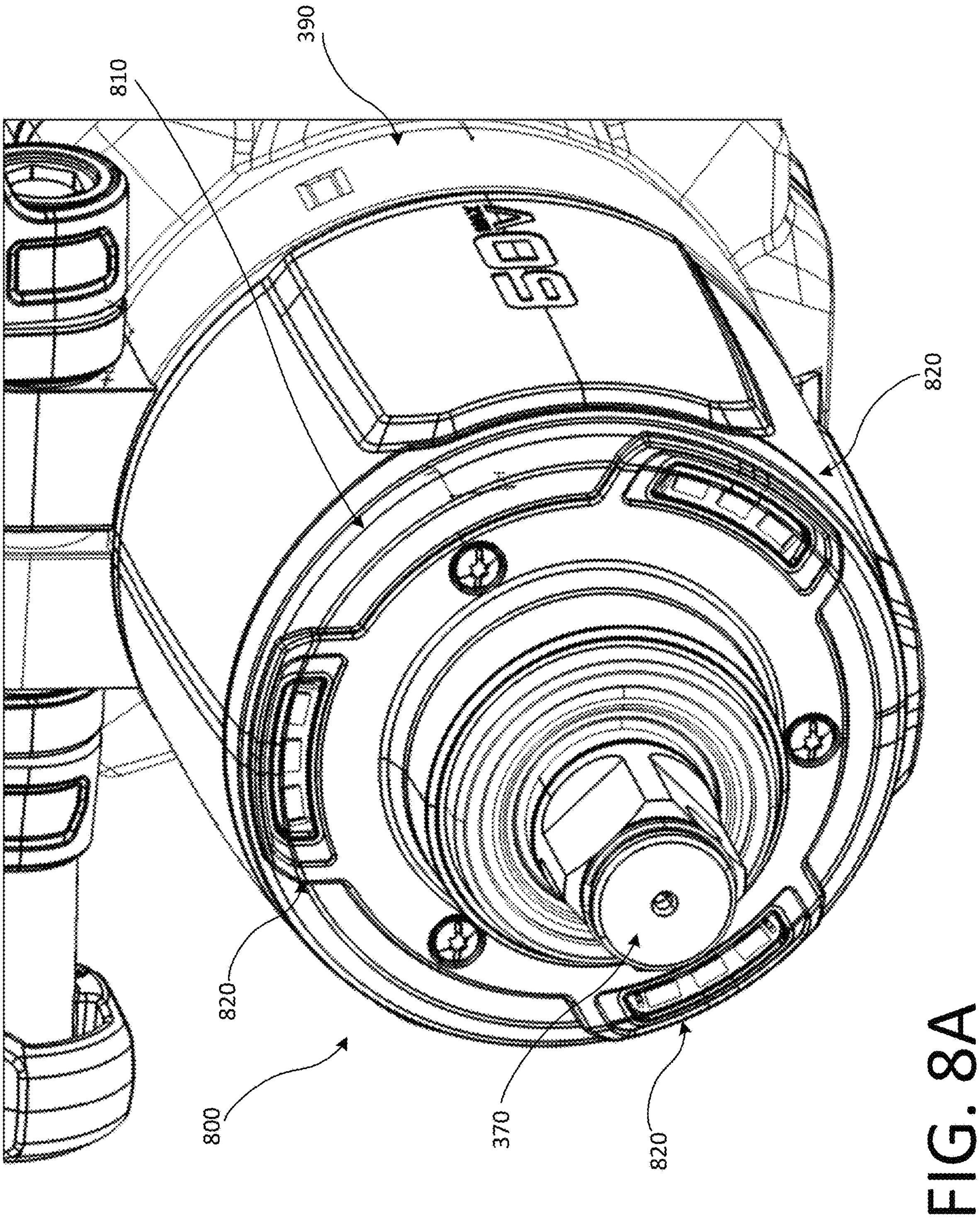
FIG. 8A is a partial perspective view of an example lighting assembly coupled to a working end portion of an example tool.
Figure 8B:
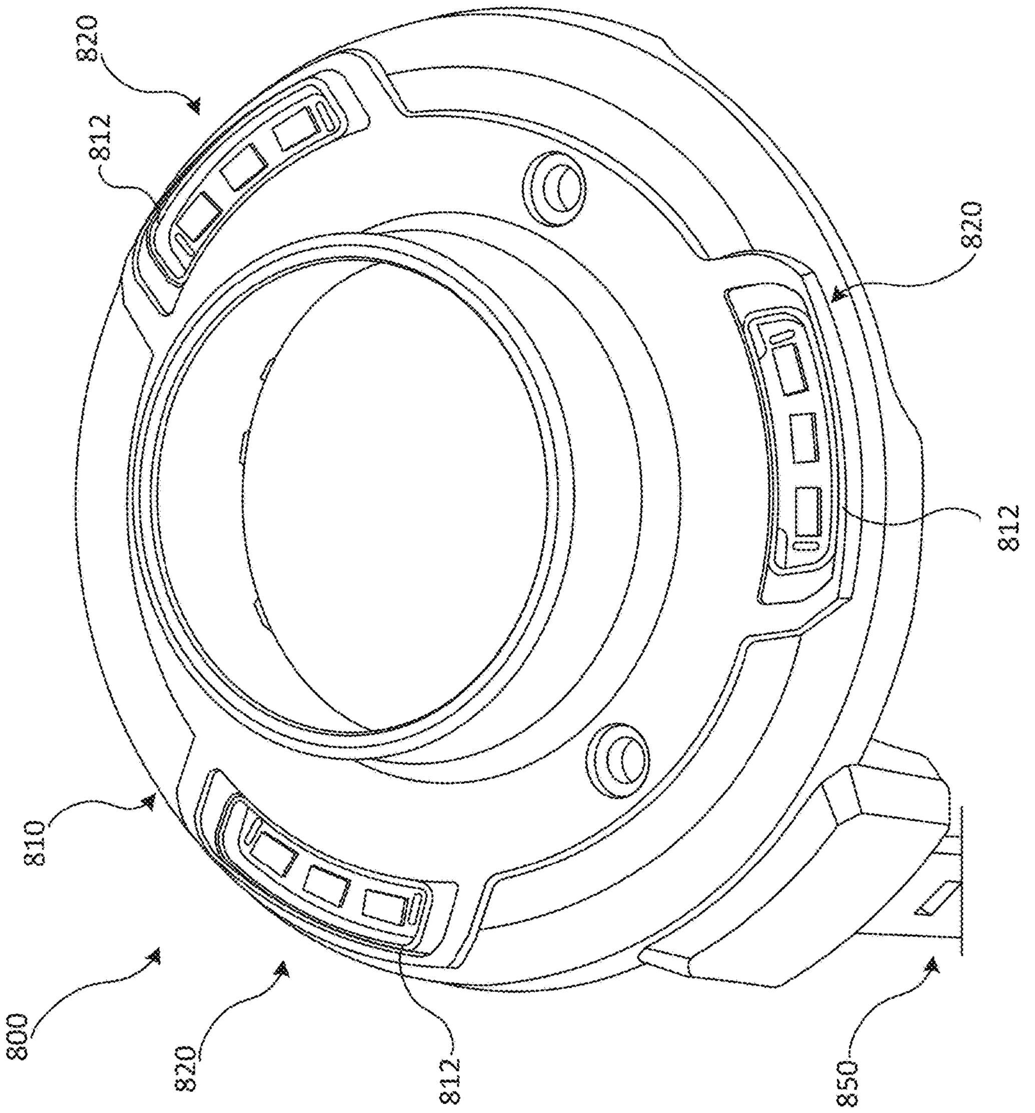
FIG. 8B is an assembled perspective view of the example lighting assembly shown in FIG. 8A, removed from the example tool, from an exterior side of the example lighting assembly.
Figure 8C:
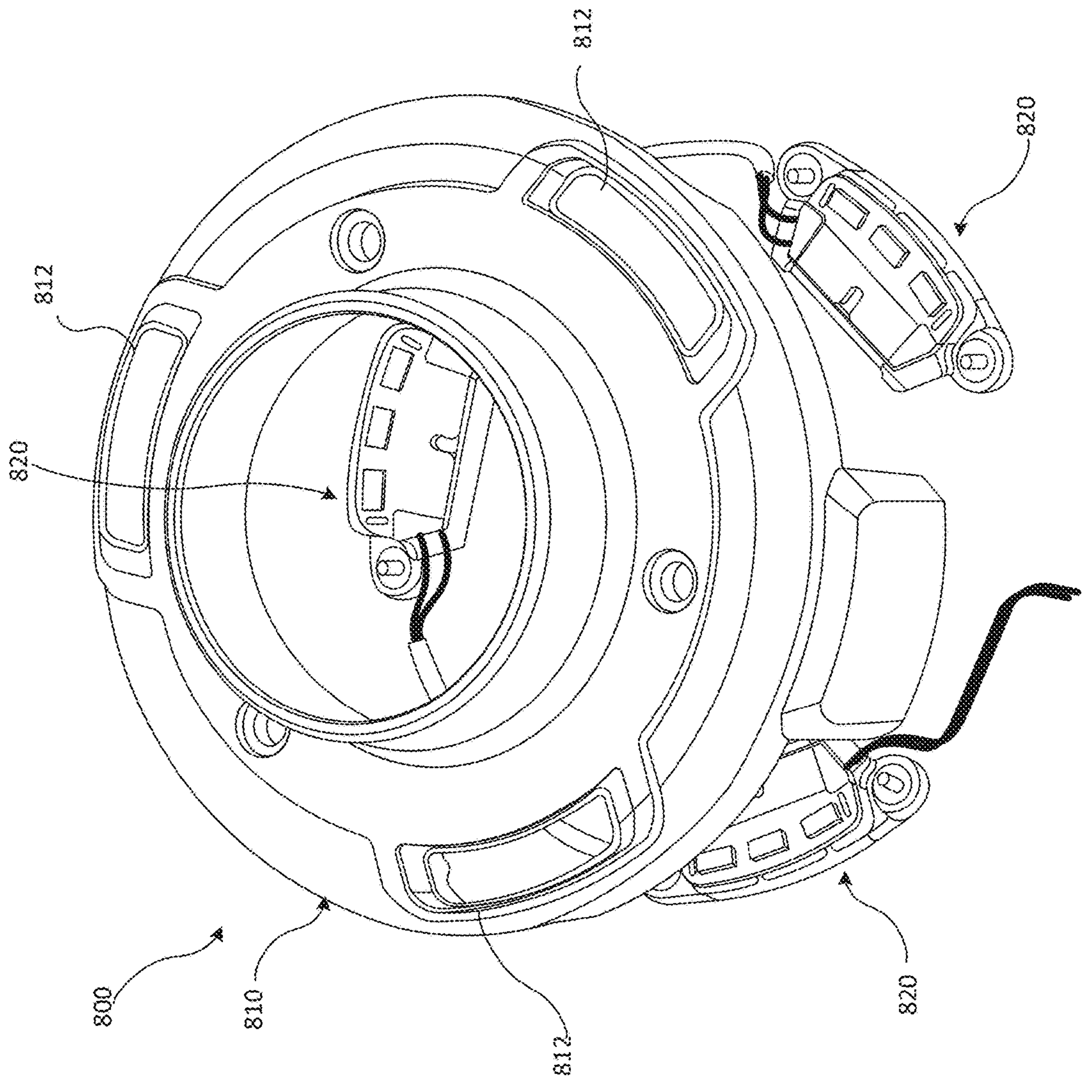
FIG. 8C is an exploded perspective view of the example lighting assembly shown in FIGS. 8A and 8B, removed from the example tool, from an exterior side of the example lighting assembly.
Figure 8D:
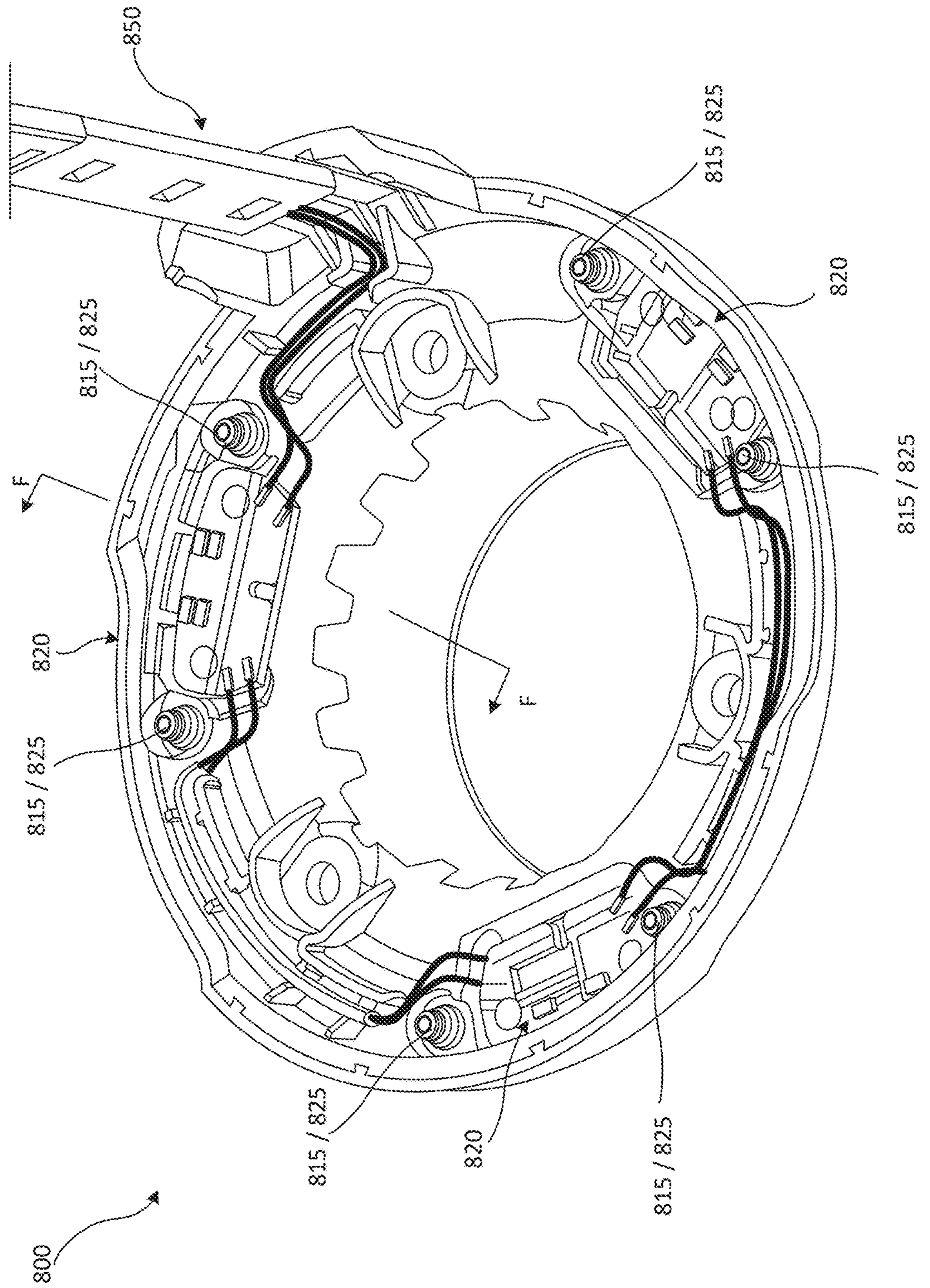
FIG. 8D is an assembled perspective view of the example lighting assembly shown in FIGS. 8A-8C, removed from the example tool, from an interior side of the example lighting assembly.
Figure 8E:
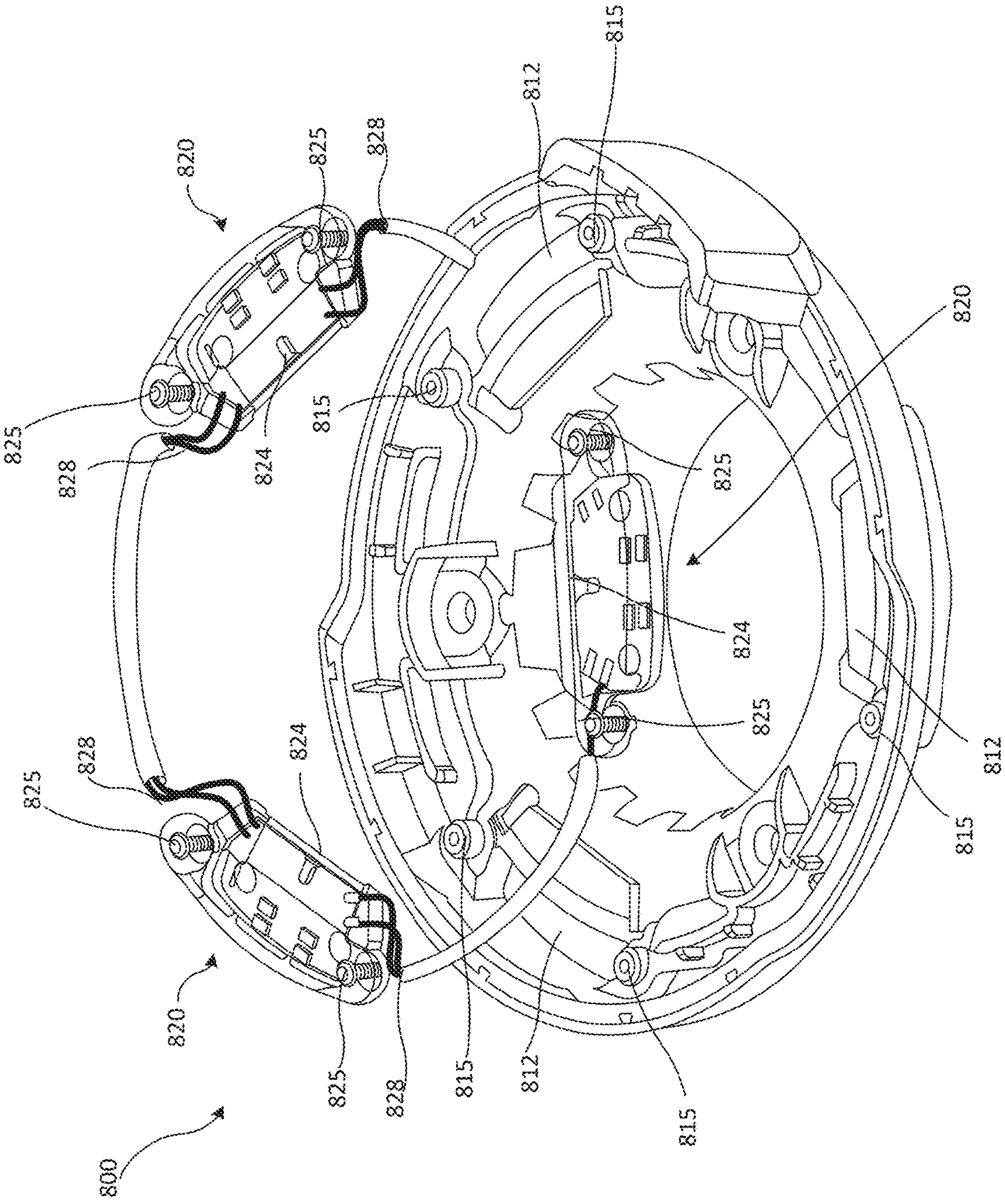
FIG. 8E is an exploded perspective view of the example lighting assembly shown in FIGS. 8A-8D, removed from the example tool, from an interior side of the example lighting assembly.
Figure 8F:
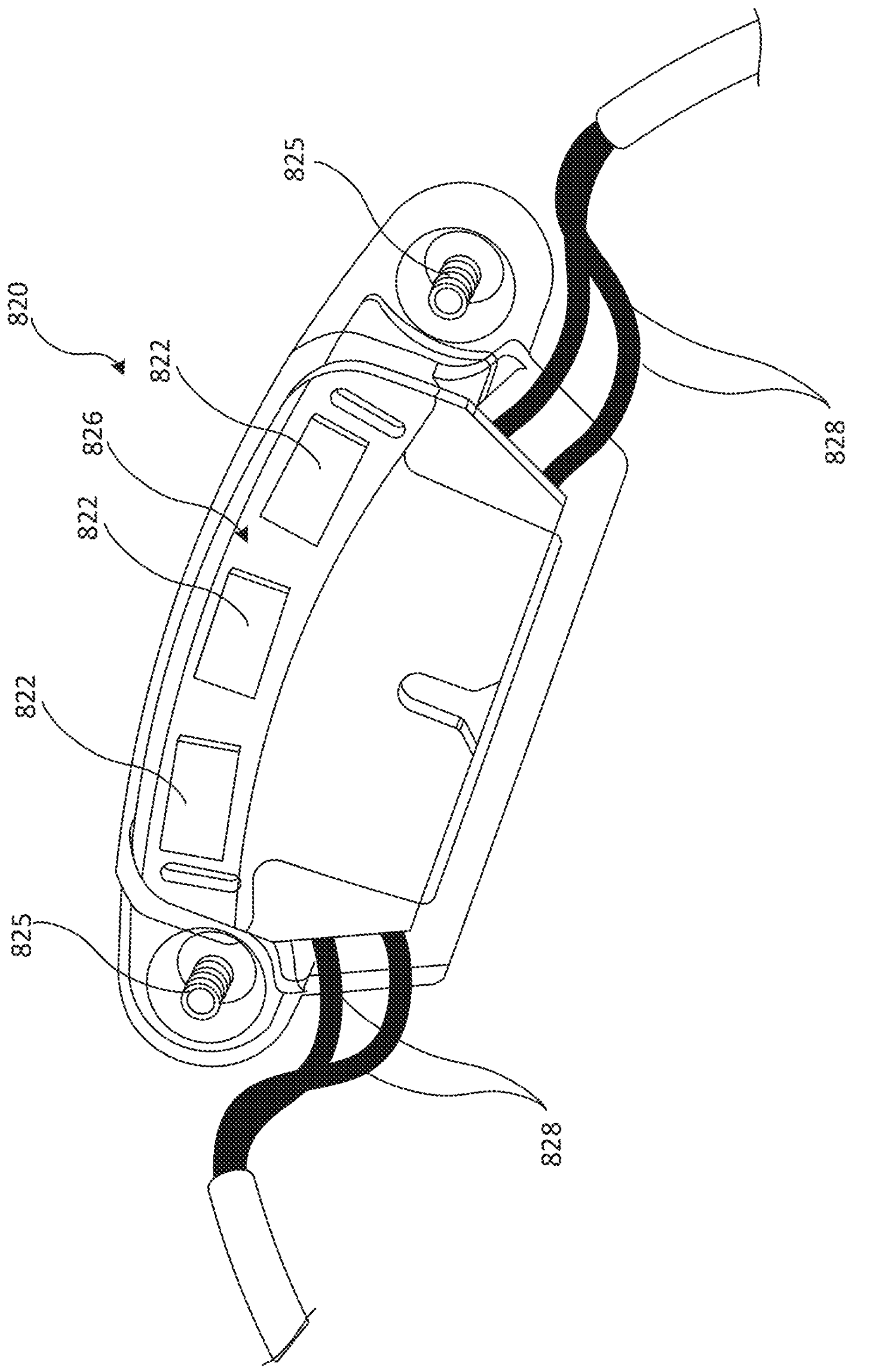
FIG. 8F is an exterior view of an example lighting module of the example lighting assembly shown in FIGS. 8A-8E.
Figure 8G:
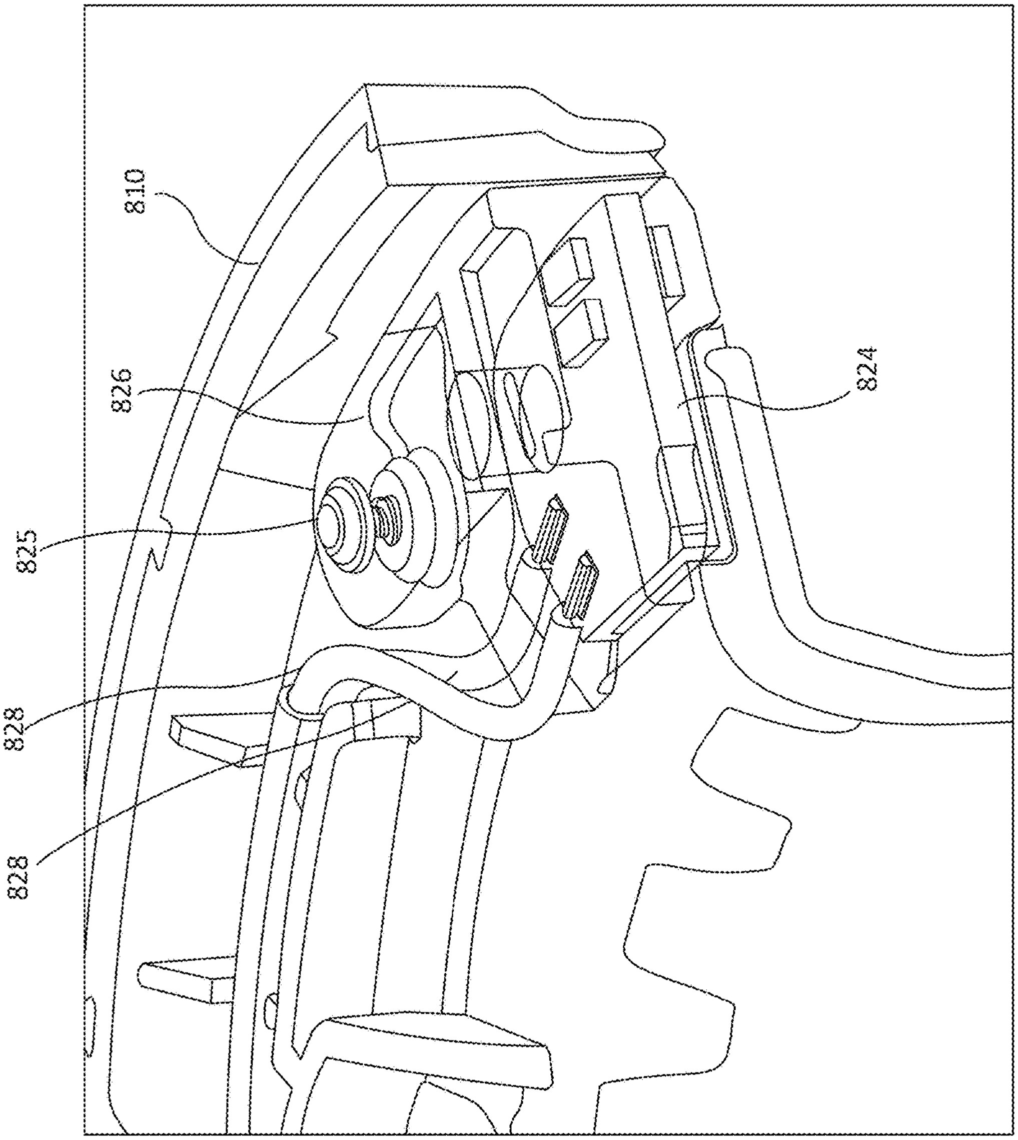
FIG. 8G is a partial cross-sectional view, taken along line F-F of FIG. 8D.

FIGS. 8A-8F illustrate an example lighting assembly 800, which can be incorporated into the housing of a power-driven tool, such as, for example, the example impact tool 100 and/or the example impact tool 300 described above, or another power-driven tool not explicitly described herein. In particular, FIG. 8A is a partial perspective view illustrating the example lighting assembly 800 coupled to a working end portion of the tool housing 390 of the example rotary impact tool 300. FIG. 8B is an assembled perspective view, and FIG. 8C is an exploded perspective view, of the example lighting assembly 800 shown in FIG. 8A, removed from the example rotary impact tool 300, from an exterior side of the example lighting assembly 800. FIG. 8D is an assembled perspective view, and FIG. 8E is an exploded perspective view, of the example lighting assembly 800 shown in FIGS. 8A-8C, removed from the example rotary impact tool 300, from an interior side of the example lighting assembly 800. FIG. 8F is a top view of an example lighting module 820 of the example lighting assembly 800 shown in FIGS. 8A-8E. FIG. 8G is a partial cross-sectional view, taken along line F-F of FIG. 8D. FIGS. 8A-8G illustrate the example lighting assembly 800 with respect to the example rotary impact tool 300, simply for purposes of discussion and illustration. The principles described herein are applicable to the example rotary impact tool 100, and/or other power-driven tools not explicitly described herein.

The example lighting assembly 800 may include a cap portion 810 that is coupled to the tool housing 390 of the example impact tool 300, at a working end of the example impact tool 300 corresponding to the output spindle 370 of the example tool. A plurality of lighting modules 820 are coupled in the cap portion 810. In some examples, the plurality of lighting modules 820 are positioned so as to at least partially surround the output spindle 370, so as to illuminate a work area during operation of the example impact tool 300.

Figure 8H:
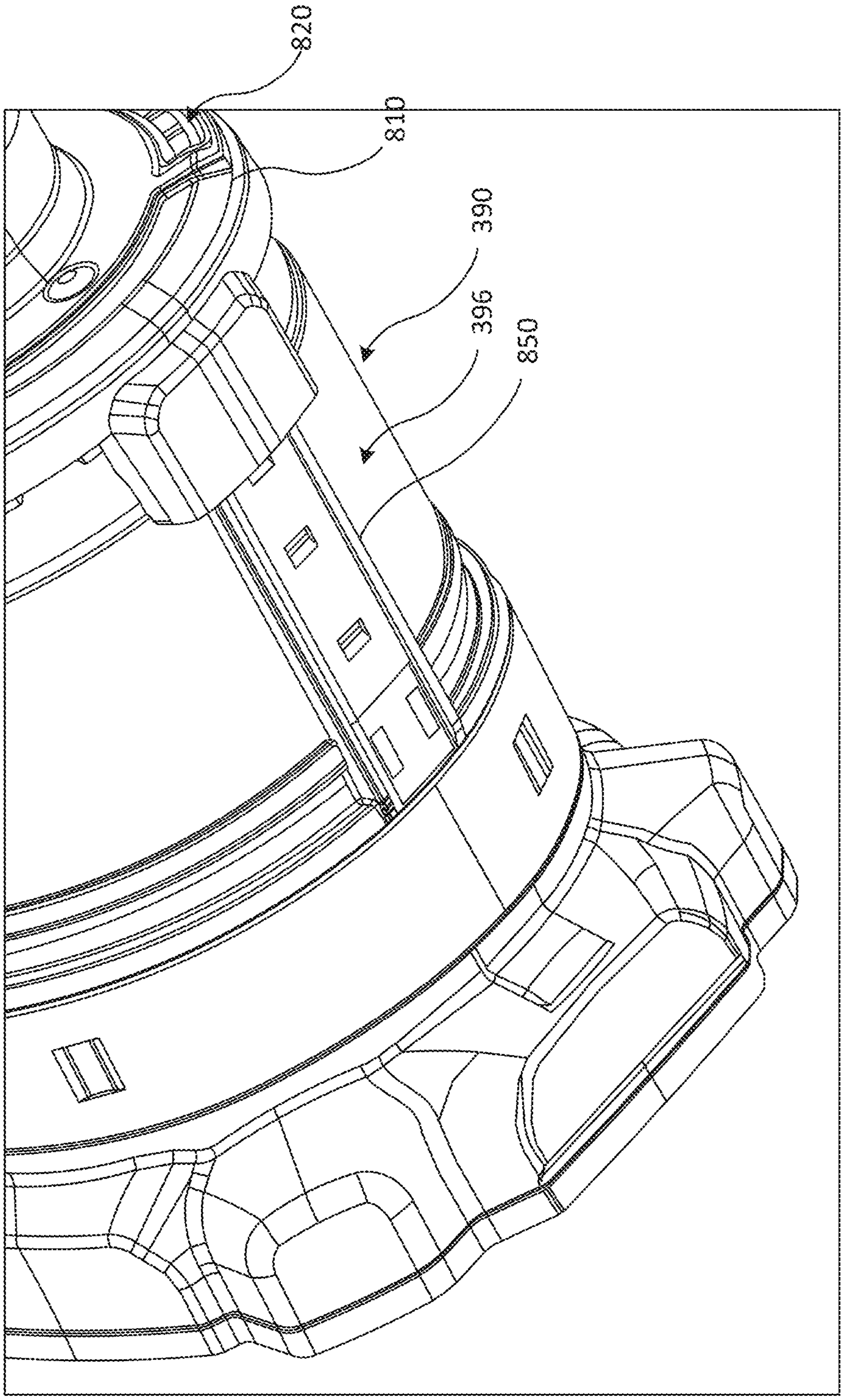
FIGS. 8H and 8I are close-in views of a wire guide of the example lighting assembly shown in FIGS. 8A-8G.
Figure 8I:
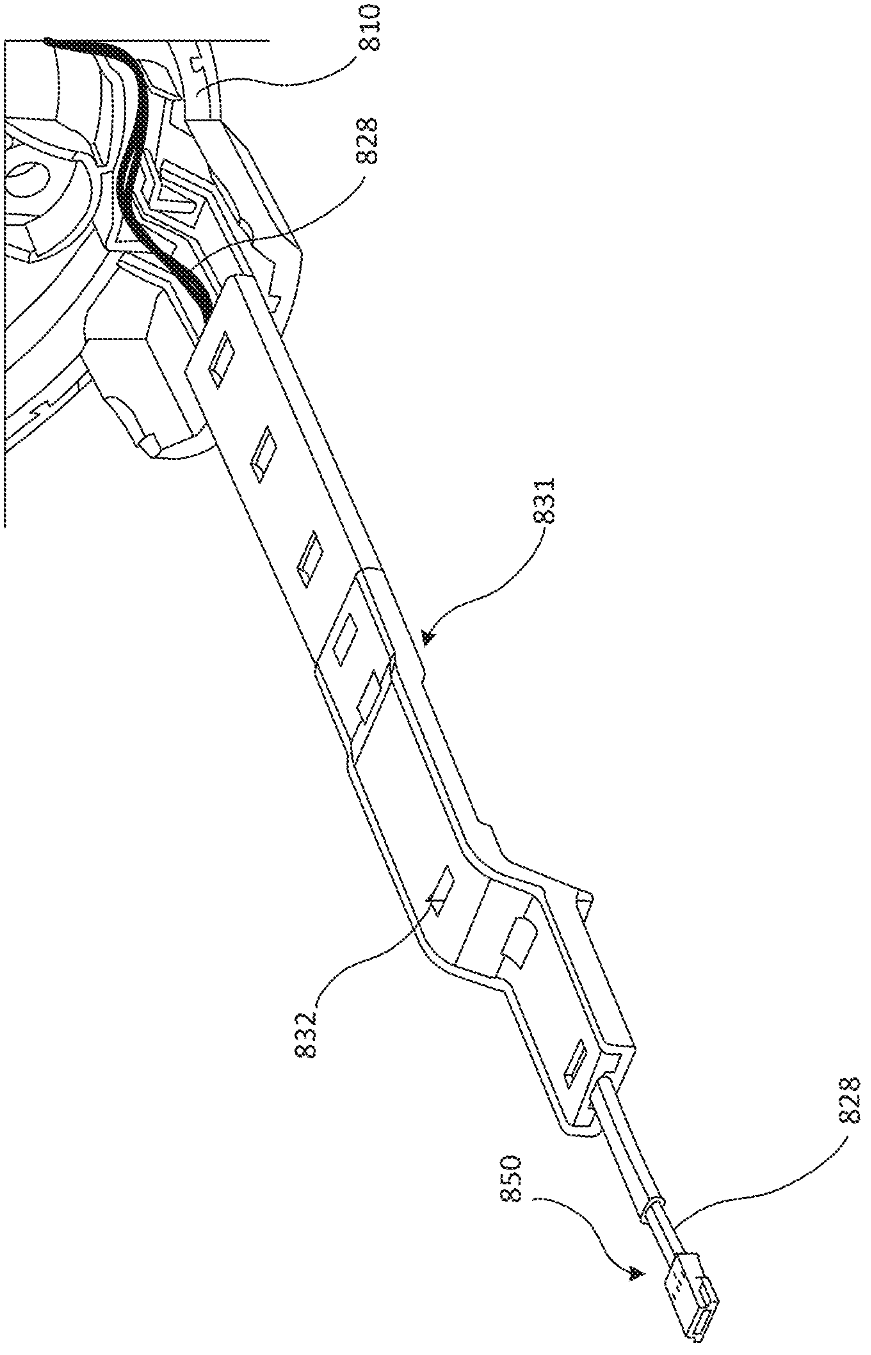

In some examples, each of the plurality of lighting modules 820 includes light emitting diodes (LEDs) 822 mounted on a substrate 824. The LEDs 822 and the substrate 824 are encapsulated by a transparent encapsulating layer 826. In some examples, the encapsulating layer 826 is a transparent overmolding of material on the LEDs 822 assembled on the substrate 824. Wires 828 connecting the LEDs 822/the substrate 824 to a harness 850 extend out of the transparent encapsulating layer 826 for connection with a power source (for example, a battery received in a battery receptacle as described above) and/or to a control source (such as, for example, the control module, controlled in response to operation of one of the control interface devices as described above). The plurality of lighting modules 820 are positioned in a corresponding plurality of openings 812 in the cap portion 810. In some examples, each of the lighting modules 820 is aligned with a corresponding opening 812 in the cap portion 810, from the interior side of the cap portion 810 as shown in FIGS. 8D and 8E. In some examples, pins 815 on the interior side of the cap portion 810 are inserted into openings 825 in the substrate 824 of the lighting module 820, to retain a position of the lighting module 820 relative to the opening 812. The wires 828 in the harness 850 exiting the cap portion 810 may be encapsulated in a harness wire protecter and guide. This allows the wires 828 to be routed below the portion of the housing 390 enclosing the impact mechanism 600, as shown in FIG. 8H. In some examples, the wires 828 exiting the cap portion 810 can be encapsulated in an overmold material 832 after insertion into a main substrate material 831, as shown in FIG. 8I. The wires 828 then exit the harness 850 inside the tool housing 390, for connection to a power source.

In some examples, the transparent overmolding of the encapsulating layer 826 allows for direct light transmission through the transparent encapsulating layer 826 and onto a workpiece. In some examples, the overmolding of the transparent encapsulating layer 826 on the LEDs 822, and the installation of the plurality of lighting modules 820 from the interior side of the cap portion 810 allows for a low profile, substantially flush installation of the plurality of lighting modules 820 in the cap portion 810. In some examples, the overmolding of the transparent encapsulating layer 826 on the LEDs 822, and the installation of the plurality of lighting modules 820 from the interior side of the cap portion 810 provides protection for the plurality of lighting modules 820 during operation of the tool, and some level of vibration isolation of the plurality of lighting modules 820 during operation of the impact tool 300.

Figure 8J:
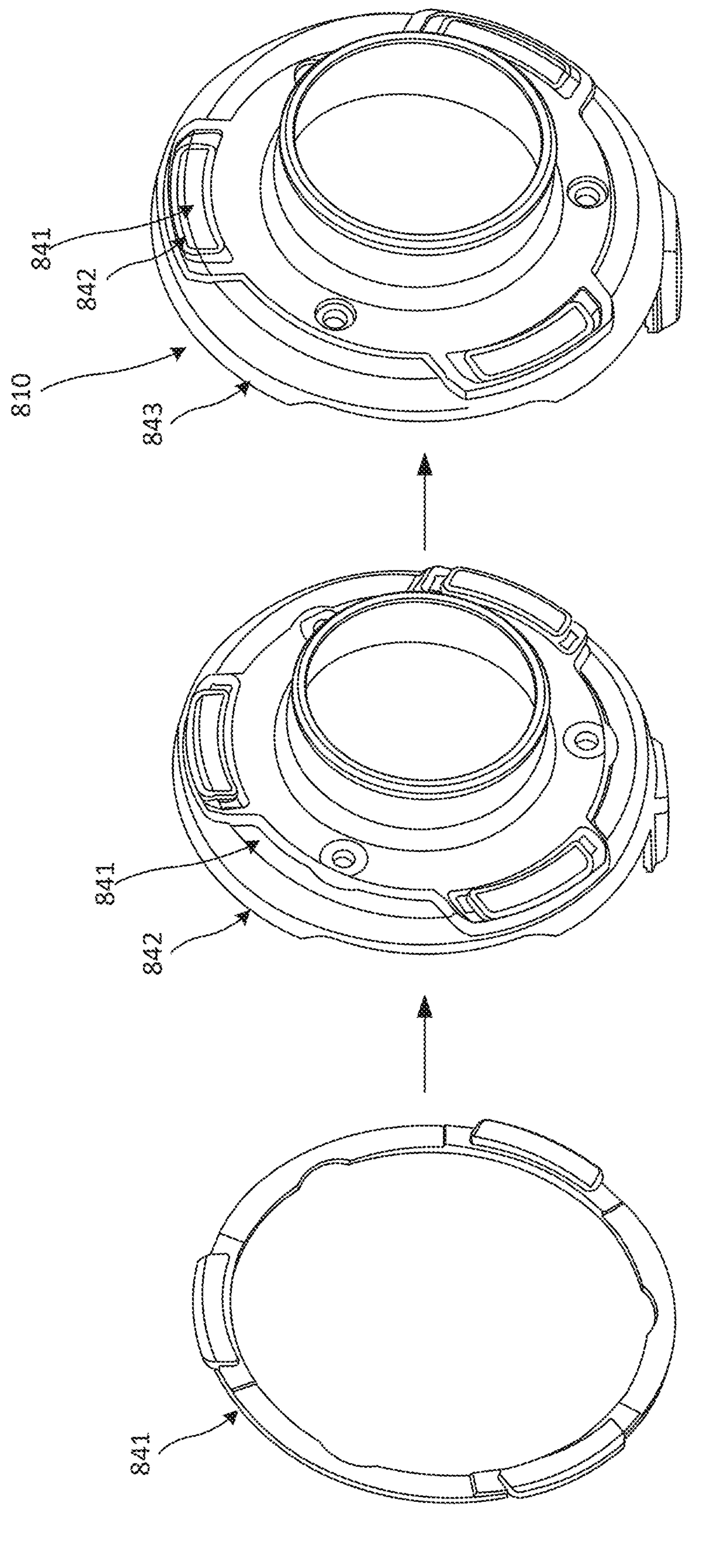
FIG. 8J illustrates an overmold process associated with the example lighting assembly shown in FIGS. 8A-8G.

In some examples, the cap portion 810 of the lighting assembly 800 is molded in a three-part process with various injection mold tooling. This process involves changing half of the mold between injection molding of each material. FIG. 8J illustrates a substrate produced by injecting a first material into a mold. After molding of the substrate, the cavity of the mold is changed, and a second material 842 is injected into the mold, onto the substrate. The cavity of the mold is changed again, and a third overmold material 843 is injected into the mold. In some examples, injection of the first material 841 produces a first shot substrate made from a transparent or clear material, allowing light distribution from the LEDs 822. The inside features of this first material 841 can allow for various distribution of the light emitted by the LEDs 822. In some examples, the first material 841 from which the substrate is produced may be made from tinted material or in combination with a textured mold to further scatter the distribution of light emitted by the LEDs 822.

As noted above, in some examples, the example impact tool 100 and/or the example impact tool 300 may include a control module 158, 358 installed on a lower surface of the battery receptacle 195, 395, to control a flow of power from the battery, and operation of the example impact tool 100, 300, in response to user inputs received at one of the user interface devices 182/184/186, 382/384/386 provided on the first handle portion 191, 391. In some examples, vibration isolation members may be provided with the control module 158, 358 and/or the terminal block 152, 352 to provide for vibration isolation and protection of these components during operation of the example rotary impact tool 100, 300.

Figure 9A:
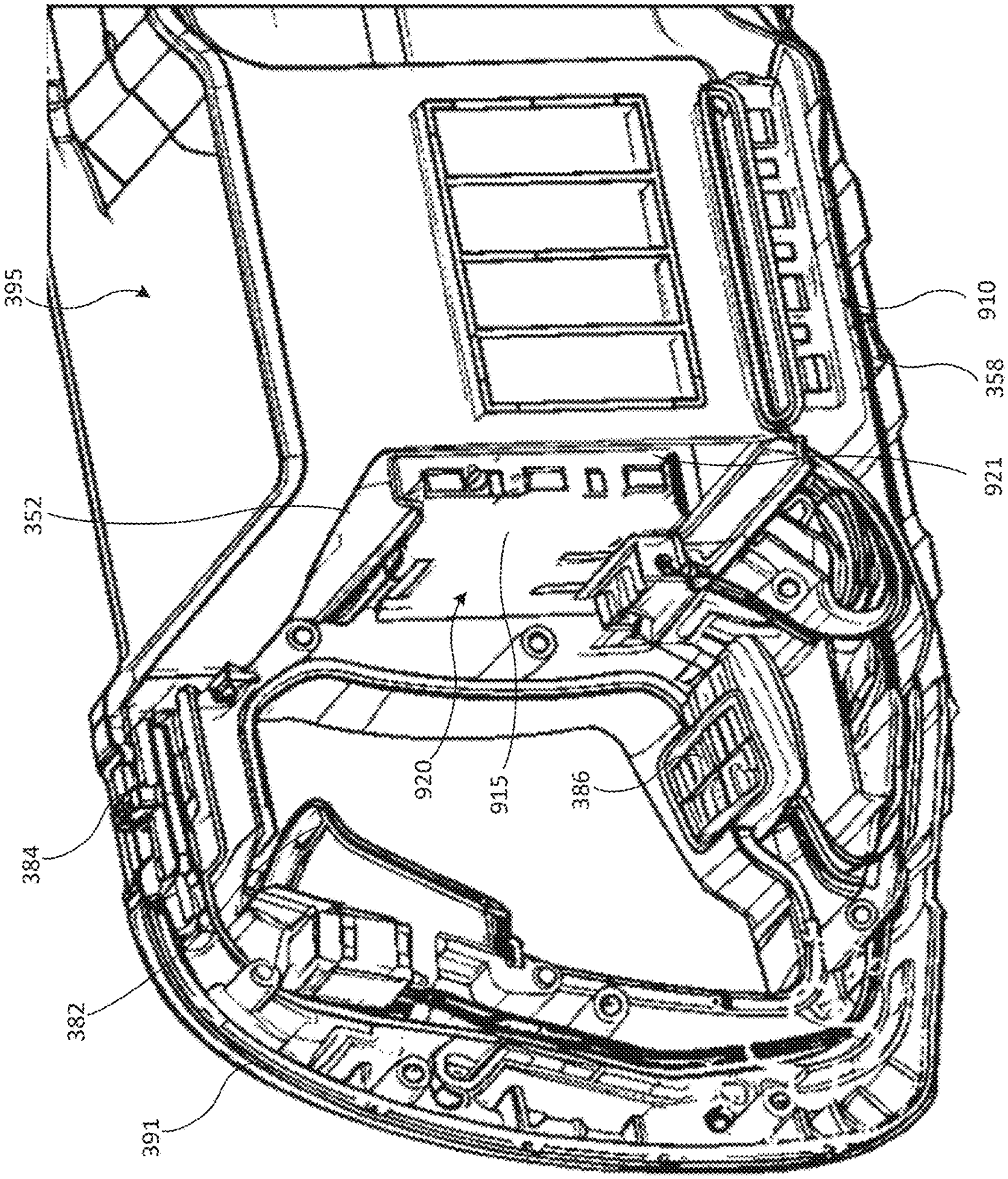
FIG. 9A is a first perspective view of a first handle portion and a battery receptacle of an example power-driven rotary impact tool, with a portion of a tool housing removed.
Figure 9B:
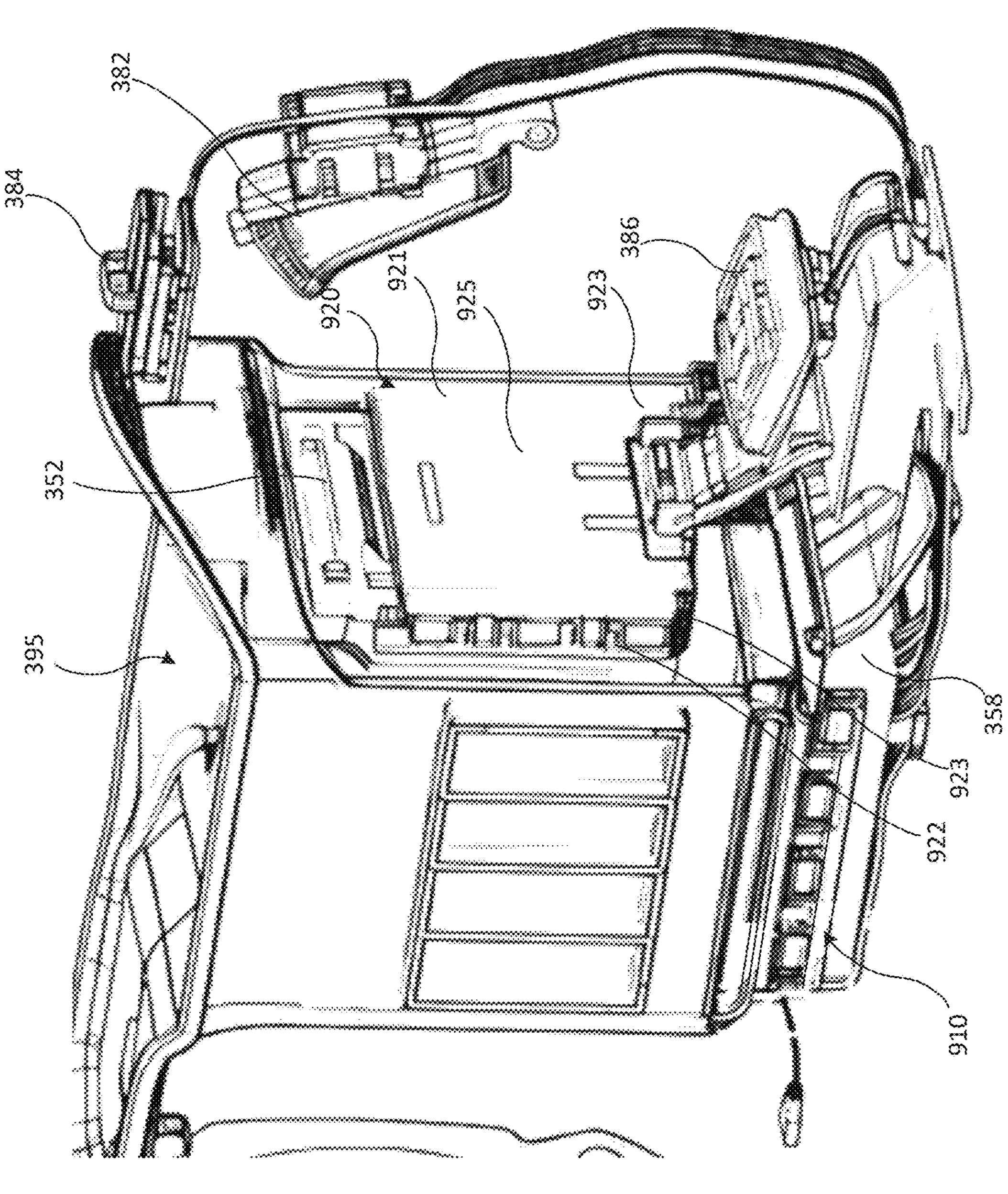
FIG. 9B is a second perspective view of first handle portion and the battery receptacle of the example power-driven rotary impact tool, with the tool housing removed.
Figure 9C:
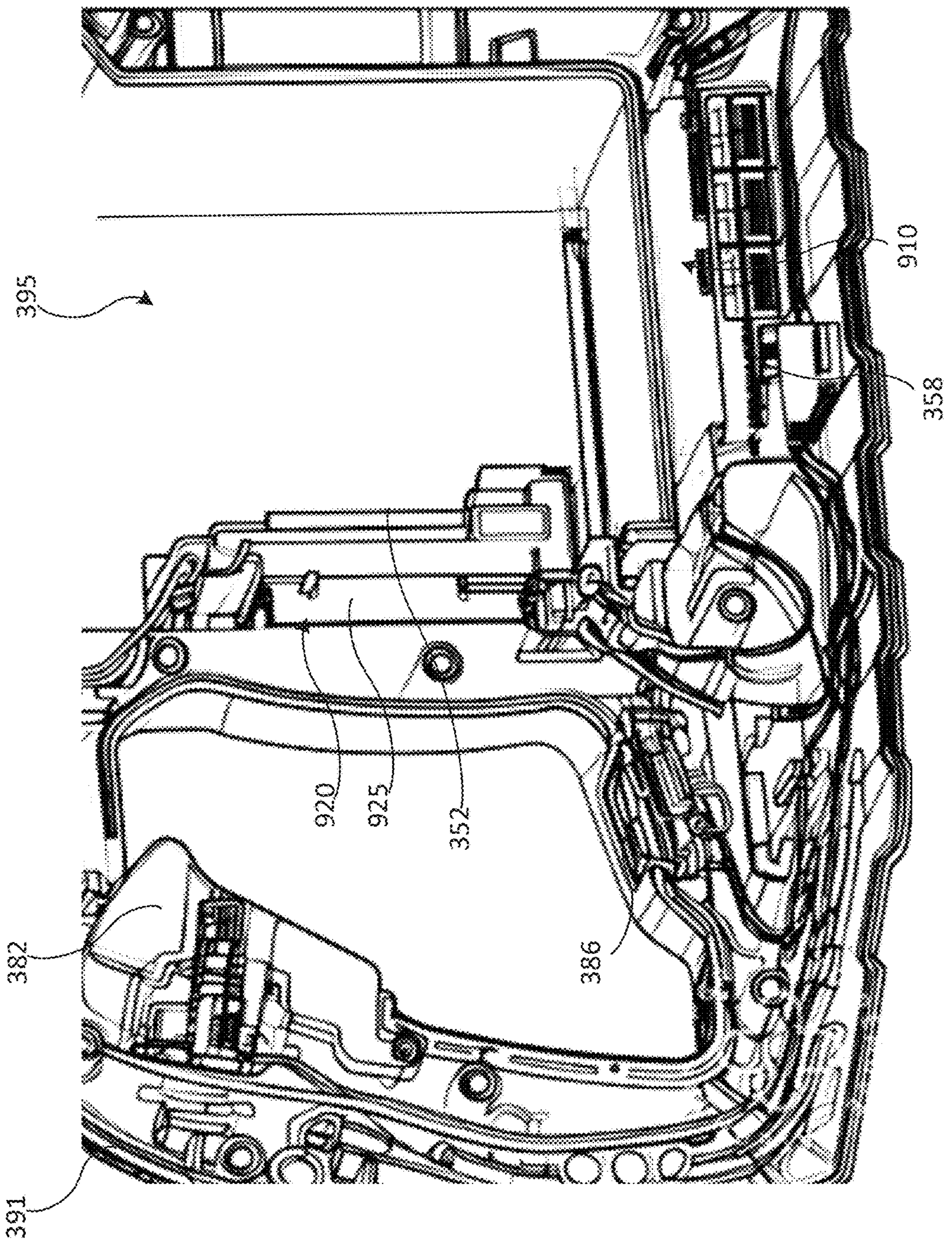
FIG. 9C is a cross-sectional view of the of the first handle portion and the battery receptacle of the example power-driven rotary impact tool shown in FIG. 9A.
Figure 9D:
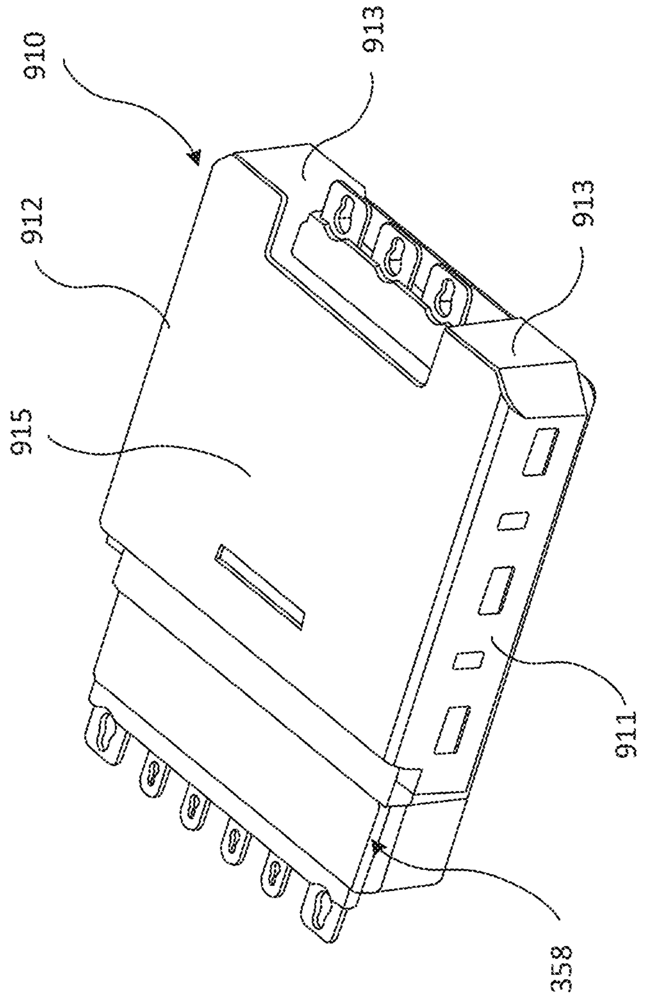
FIG. 9D is an assembled top perspective view of an isolation member providing for vibration isolation of a control module of the example power-driven rotary impact tool shown in FIGS. 9A-9C.
Figure 9E:
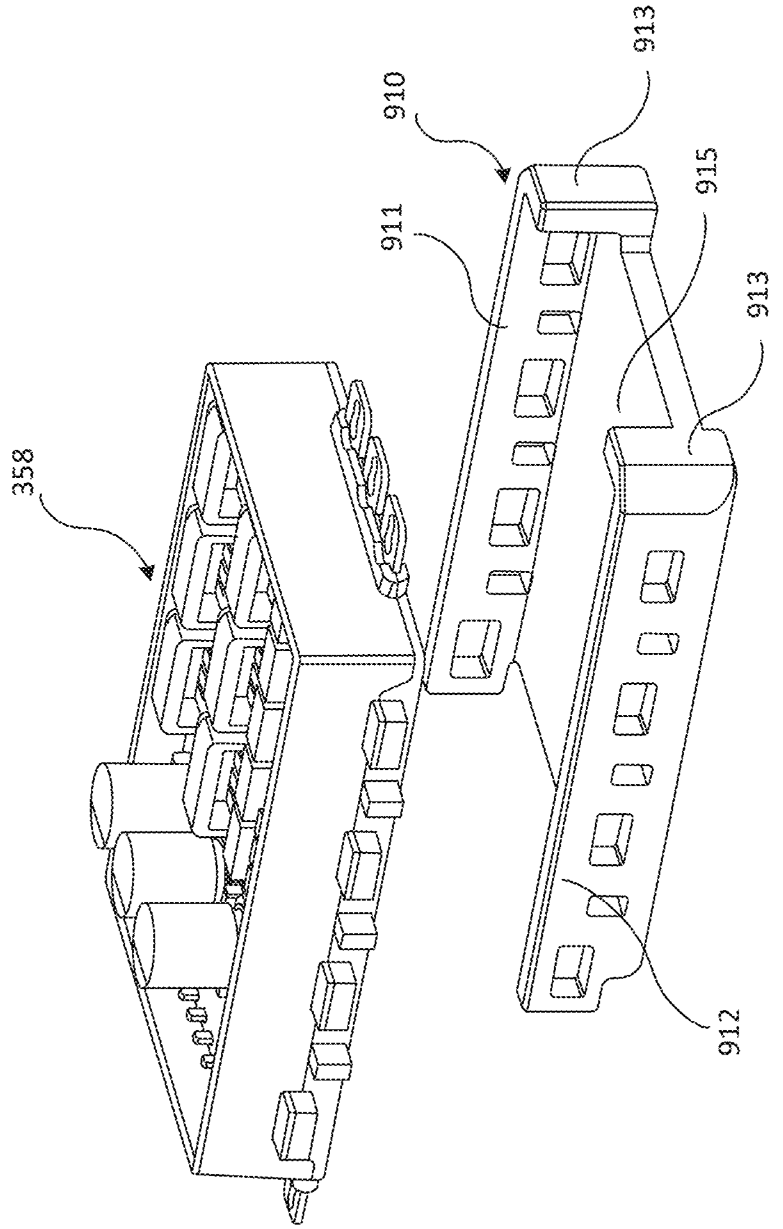
FIG. 9E is a disassembled bottom perspective view of the isolation member providing for vibration isolation of the control module of the example power-driven rotary impact tool shown in FIGS. 9A-9D.
Figure 9F:
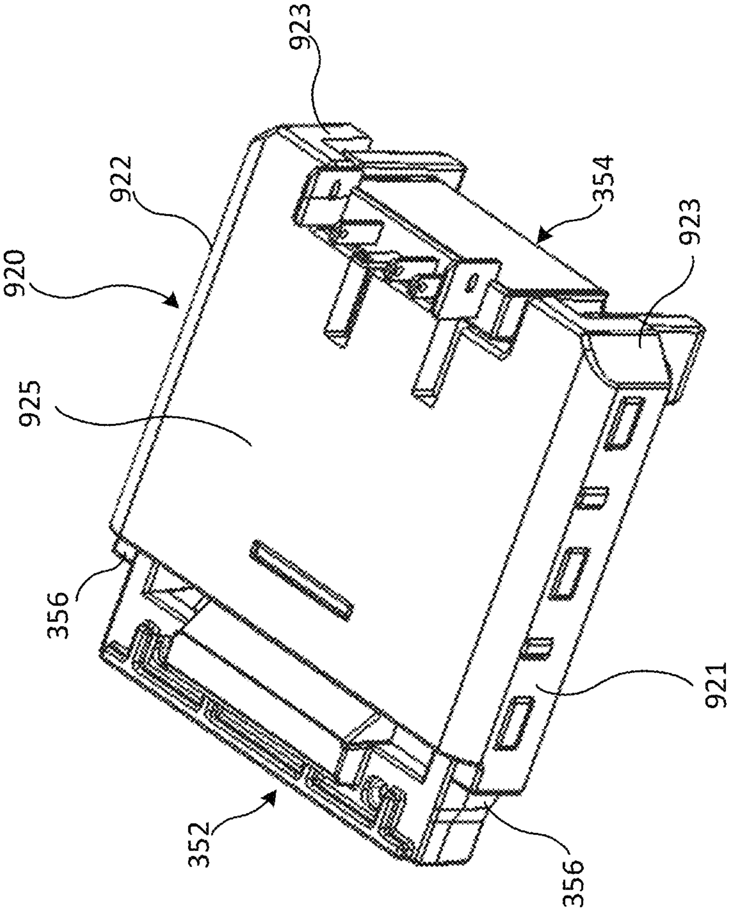
FIG. 9F is an assembled top perspective view of an isolation member providing for vibration isolation of a terminal block of the example power-driven rotary impact tool shown in FIGS. 9A-9C.
Figure 9G:
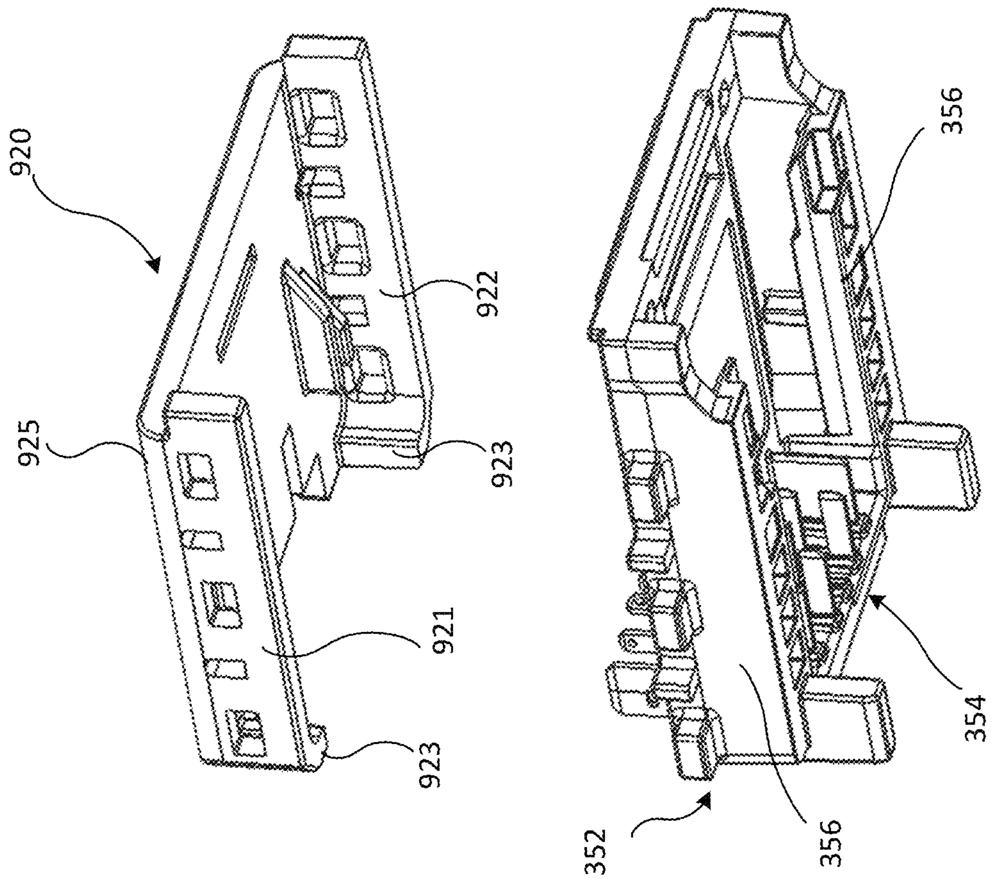
FIG. 9G is a disassembled bottom perspective view of the isolation member providing for vibration isolation of the terminal block of the example power-driven rotary impact tool shown in FIGS. 9A-9C and 9F.

FIGS. 9A-9G illustrate example vibration isolation members which can be incorporated into the example impact tool 100 and/or the example impact tool 300 described above, or another power-driven tool not explicitly described herein. Hereinafter, simply for purposes of discussion, the example encapsulation system will be described with respect to the example rotary impact tool 300. The principles described herein are applicable to the example rotary impact tool 100, and/or other power-driven tools not explicitly described herein, In particular, FIG. 9A is a first perspective view of the first handle portion 391 and the battery receptacle 395 of the example impact tool 300, with a portion of the tool housing 390 removed. FIG. 9B is a second perspective view of the first handle portion 391 and the battery receptacle 395 of the example impact tool 300, with the tool housing 390 removed. FIG. 9C is a cross-sectional view of the of the first handle portion 391 and the battery receptacle 395 of the example impact tool 300 shown in FIG. 9A. FIG. 9D is an assembled top perspective view, and FIG. 9E is a bottom disassembled bottom perspective view, of a first vibration isolation member 910 providing for vibration isolation of the control module 358. FIG. 9F is an assembled top perspective view, and FIG. 9G is a bottom disassembled bottom perspective view, of a second isolation member 920 providing for vibration isolation of the terminal block 352.

As shown in FIGS. 9A-9E, a first vibration isolation member 910 may be fitted to the control module 358, to provide for vibration isolation of the control module 358 during operation of the impact tool 300. In some examples, the first vibration isolation member 910 may be made of a resilient, deformable material, such as, for example, an elastomer material, a rubber material, or another complaint material that absorbs shock and vibration generated due to operation of the impact tool 300. The first vibration isolation member 910 may protect the components of the control module 358, for example, switching and control circuitry and the like, from damage due to excessive shocks and/or impacts and/or vibration during operation of the impact tool 300. In some examples, the first vibration isolation member 910 includes a base wall 915 that is positioned between the base wall 355 of the cavity 359 defining the battery receptacle 395 and the control module 358, aligned along the tool axis X together with the control module 358 and the base wall 355 of the cavity 359. In some examples, the first vibration isolation member 910 includes a plurality of side walls, wrapping around corresponding sides of the control module 358. In the example shown in FIGS. 9A-9E, the first vibration isolation member 910 includes a first side wall 911 extending along a first lateral side of the base wall 915, including openings corresponding to connection points of the control module 358. In the example shown in FIGS. 9A-9E, the first vibration isolation member 910 includes a second side wall 912 extending along a second lateral side of the base wall 915, including openings corresponding to connection points of the control module 358. In the example shown in FIGS. 9A-9E, the first vibration isolation member 910 includes a third side wall 913 partially extending along a third lateral side of the base wall 915, including a gap corresponding to terminal connections of the control module 358.

As shown in FIGS. 9A-9C, 9F, and 9G, a second vibration isolation member 920 may be fitted to the terminal block 352 received in the battery receptacle 395, to provide for vibration isolation of the connection between a battery connected to terminals of the terminal block 352 during operation of the impact tool 300. In some examples, the second vibration isolation member 920 may be made of a resilient, deformable material, such as, for example, an elastomer material, a rubber material, or another complaint material that absorbs shock and vibration generated due to operation of the impact tool 300. The second vibration isolation member 920 may protect the components of the terminal block 352, for example, terminals and terminal connection points with a battery received in the battery receptacle 395 and connected to the terminal block 352, from damage due to excessive shocks and/or impacts and/or vibration during operation of the impact tool 300. In some examples, the second vibration isolation member 920 includes a base wall 925 that is positioned between a side wall of the of the cavity 359 defining the battery receptacle 395 and the terminal block 352, aligned along the insertion axis Y together with the terminal block 352 and the side wall of the cavity 359. In some examples, the second vibration isolation member 920 includes a plurality of side walls, wrapping around corresponding sides of the terminal block 352. In the example shown in FIGS. 9A-9C, 9E, and 9F, the second vibration isolation member 920 includes a first side wall 921 extending along a first lateral side of the base wall 925, corresponding to a first guide rail 356 of the terminal block 352, including openings corresponding to connection points of the terminal block 352. In the example shown in FIGS. 9A-9C, 9E, and 9F, the second vibration isolation member 920 includes a second side wall 922 extending along a second lateral side of the base wall 925, corresponding to a second guide rail 356 of the terminal block 352, including openings corresponding to connection points of the terminal block 352. In the example shown in FIGS. 9A-9C, 9E, and 9F, the second vibration isolation member 950 includes a third side wall 923 partially extending along a third lateral side of the base wall 925, including a gap corresponding to terminal connections of the terminal block 352.

The foregoing description has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. Additional and/or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "bottom," "lower," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A powered rotary impact tool, comprising:

a housing;

a handle coupled to a first end portion of the housing;

an output shaft at least partially received in the housing and oriented along a longitudinal axis;

a rotary impact mechanism received in a second end portion of the housing, the rotary impact mechanism including a hammer and an anvil coupled to the output shaft; and a multi-motor drive unit received in the housing, the multi-motor drive unit including a plurality of motors configured to cooperatively drive the rotary impact mechanism, wherein in response to a torque at the output shaft that is less than or equal to a threshold torque value, the hammer continuously engages the anvil such that the hammer and the anvil rotate together, wherein in response to a torque at the output shaft that is greater than the threshold torque value, the hammer applies intermittent rotational impacts to the anvil; and wherein a maximum fastening torque to length ratio of the multi-motor drive unit and the rotary impact mechanism is at least 50 ft-lbs/mm.

2. The powered rotary impact tool of claim 1, wherein the multi-motor drive unit and the rotary impact mechanism are configured to generate an output torque enabling a tool holder coupled to the output shaft to tighten a threaded fastener to a fastening torque of greater than or equal to 3600 ft-lbs within 10 seconds of initiation of application of the intermittent rotational impacts on the anvil by the hammer.

3. The powered rotary impact tool of claim 2, wherein the multi-motor drive unit and the rotary impact mechanism are configured to generate an output torque enabling the tool holder to loosen a fastener with a breakaway torque of greater than or equal to 4000 ft-lbs.

4. The powered rotary impact tool of claim 1, further comprising a transmission operably coupled between the multi-motor drive unit and the rotary impact mechanism, the transmission being configured to reduce a speed output by the multi-motor drive unit transmitted to the rotary impact mechanism.

5. The powered rotary impact tool of claim 4, wherein a speed reduction ratio of the transmission is between 3:1 and 13:1 while the rotary impact mechanism provides a fastening torque of greater than or equal to 3600 ft-lbs.

6. The powered rotary impact tool of claim 1, wherein the multi-motor drive unit also includes:

a plurality of pinion gears, a pinion gear of the plurality of pinion gears being provided on and driven by each of the plurality of motors; and a master gear that engages the plurality of pinion gears to provide a first speed reduction.

7. The powered rotary impact tool of claim 1, wherein a power to mass ratio of the multi-motor drive unit is in a range of 3 W/g to 10 W/g.

8. A powered rotary impact tool, comprising:

a housing;

a handle coupled to a first end portion of the housing;

an output spindle at least partially received in the housing and extending along a longitudinal axis;

a tool holder coupled to and configured to rotate with the output spindle;

a motor drive unit disposed in the housing and including an output shaft extending along a motor axis;

a transmission coupled to the output shaft; and a rotary impact mechanism including:

a cam shaft rotatably driven by an output member of the transmission, the cam shaft extending along a transmission axis;

a hammer received over the cam shaft;

an anvil coupled to the output spindle; and a spring biasing the hammer toward the anvil, wherein, in response to a torque on the output spindle is less than or equal to a threshold torque value, the hammer continuously engages the anvil so that the hammer and the anvil rotate together, and in response to a torque on the output spindle is greater than the threshold torque value, the hammer applies intermittent rotational impacts to the anvil, and wherein a length of the motor drive unit along the motor axis is less than 70 mm, a cross-sectional area of the motor drive unit in a plane transverse to the motor axis is less than 130 cmˆ2 and a length of the transmission along the transmission axis is less than 10 mm, the transmission providing a speed reduction within a range of 1:1 to 8:1, and wherein the motor drive unit, the transmission, and the rotary impact mechanism are configured to generate an output torque enabling the tool holder to tighten a threaded fastener to a fastening torque of greater than or equal to 3600 ft-lbs. within 10 seconds of initiation of the intermittent rotational impacts imparted on the anvil by the hammer.

9. The powered rotary impact tool of claim 7, wherein the motor drive unit, the transmission, and the rotary impact mechanism are configured to generate an output torque enabling the tool holder to loosen a fastener with a breakaway torque of greater than or equal to 4000 ft-lbs.

10. The powered rotary impact tool of claim 8, wherein a maximum fastening torque to length ratio of the motor drive unit is at least 50 ft-lbs/mm.

11. The powered rotary impact tool of claim 8, wherein the motor drive unit comprises a plurality of motors configured to cooperatively drive the transmission.

12. The powered rotary impact tool of claim 11, wherein the motor drive unit also includes:

a plurality of pinion gears, a pinion gear of the plurality of pinion gears being provided on and driven by each of the plurality of motors; and a master gear that engages the plurality of pinion gears to provide an additional speed reduction.

13. The powered rotary impact tool of claim 12, wherein the additional speed reduction is between 1:1 and 8:1, and the speed reduction provided by the transmission is between 3:1 and 13:1.

14. A powered rotary impact tool, comprising:

a housing;

a handle coupled to the housing;

an output spindle at least partially received in the housing and extending along an output axis;

a tool holder coupled to the output spindle and configured to rotate in response to rotation of the output spindle;

a motor drive unit disposed in the housing, the motor drive unit having a first axial length along a motor axis and a first width transverse to the motor axis;

a transmission coupled to the motor drive unit and configured to provide a speed reduction, the transmission having a second axial length along a transmission axis and a second width transverse to the transmission axis; and a rotary impact mechanism, including:

a cam shaft rotatably driven by an output member of the transmission, the cam shaft extending along a cam shaft axis;

a hammer received over the cam shaft;

an anvil coupled to the output spindle; and a spring biasing the hammer toward the anvil, wherein, in response to a torque on the output spindle is less than or equal to a threshold torque value, the hammer continuously engages the anvil so that the hammer and the anvil rotate together, and in response to a torque on the output spindle that is greater than the threshold torque value, the hammer applies intermittent rotational impacts to the anvil, the hammer having a moment of inertia;

wherein the motor drive unit, the transmission, and the rotary impact mechanism are configured to generate an output torque enabling the tool holder to tighten a threaded fastener to a fastening torque within 10 seconds of initiation of the intermittent rotational impacts imparted on the anvil by the hammer, and wherein a ratio of the fastening torque to a product of the first axial length of the motor drive unit and a cross-sectional area of the motor drive unit transverse to the motor axis is between 4 ft-lbs/cm^3 and 11 ft-lbs/cm^3.

15. The powered rotary impact tool of claim 14, wherein the hammer has a moment of inertia and a ratio of the fastening torque to the moment of inertia is between 0.5 kg-mm^2/ft-lbs and 2 kg-mm^2/ft-lbs.

16. The powered rotary impact tool of claim 14, wherein the motor drive unit, the transmission, and the rotary impact mechanism are configured to generate an output torque enabling the tool holder to loosen a fastener with a breakaway torque, wherein a ratio of the breakaway torque to a product of the first axial length of the motor drive unit and the cross-sectional area of the motor drive unit is between 4 ft-lbs/cm^3 and 12 ft-lbs/cm^3.

17. The powered rotary impact tool of claim 14, wherein the motor drive unit comprises a plurality of motors configured to cooperatively drive the transmission.

18. The powered rotary impact tool of claim 17, wherein the motor drive unit also includes:

a plurality of pinion gears, a pinion gear of the plurality of pinion gears being provided on and driven by each of the plurality of motors; and a master gear that engages the plurality of pinion gears.

19. The powered rotary impact tool of claim 18, wherein the plurality of pinion gears and the master gear provide a first speed reduction between 1:1 and 8:1, and the transmission provides a second speed reduction between 3:1 and 13:1.

* * * * *